(12) United States Patent
Volvovski et al.

(10) Patent No.: US 9,424,132 B2
(45) Date of Patent: Aug. 23, 2016

(54) ADJUSTING DISPERSED STORAGE NETWORK TRAFFIC DUE TO REBUILDING

(71) Applicant: CLEVERSAFE, INC., Chicago, IL (US)

(72) Inventors: Ilya Volvovski, Chicago, IL (US); S. Christopher Gladwin, Chicago, IL (US); Gary W. Grube, Barrington Hills, IL (US); Timothy W. Markison, Mesa, AZ (US); Jason K. Resch, Chicago, IL (US); Thomas Franklin Shirley, Jr., Wauwatosa, WI (US); Greg Dhuse, Chicago, IL (US); Manish Motwani, Chicago, IL (US); Andrew Baptist, Mt. Pleasant, WI (US); Wesley Leggette, Chicago, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 142 days.

(21) Appl. No.: 14/256,205

(22) Filed: Apr. 18, 2014

(65) Prior Publication Data

US 2014/0359348 A1 Dec. 4, 2014

Related U.S. Application Data

(60) Provisional application No. 61/828,883, filed on May 30, 2013.

(51) Int. Cl.
*G06F 11/00* (2006.01)
*G06F 11/10* (2006.01)
*G06F 11/30* (2006.01)
*G06F 3/06* (2006.01)

(52) U.S. Cl.
CPC .......... *G06F 11/1092* (2013.01); *G06F 3/06* (2013.01); *G06F 11/3034* (2013.01); *G06F 2211/1028* (2013.01)

(58) Field of Classification Search
CPC ............... G06F 11/3034; H04L 2012/5636; H04L 2012/5631; H04L 2012/5632
See application file for complete search history.

(56) References Cited

U.S. PATENT DOCUMENTS

| 4,092,732 | A | 5/1978 | Ouchi |
| 5,454,101 | A | 9/1995 | Mackay et al. |
| 5,485,474 | A | 1/1996 | Rabin |
| 5,774,643 | A | 6/1998 | Lubbers et al. |
| 5,802,364 | A | 9/1998 | Senator et al. |

(Continued)

OTHER PUBLICATIONS

International Searching Authority; International Search Report and Written Opinion; International Application No. PCT/US2014/040217; Oct. 10, 2014; 7 pgs.

(Continued)

*Primary Examiner* — Charles Ehne
(74) *Attorney, Agent, or Firm* — Garlick & Markison; Timothy W. Markison

(57) ABSTRACT

A method begins by a dispersed storage (DS) processing module of a dispersed storage network (DSN) monitoring network traffic within the DSN. When the network traffic compares unfavorably to a desired network traffic function, the method continues with the DS processing module reducing a portion of the network traffic due to rebuilding flagged encoded data slices by at least one of changing rebuilding criteria for the flagged encoded data slices and changing rebuilding network traffic protocols.

18 Claims, 53 Drawing Sheets

(56) References Cited

U.S. PATENT DOCUMENTS

| | | |
|---|---|---|
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 7,773,509 B2 * | 8/2010 | Rahman ............... H04L 12/2805 370/230 |
| 8,090,820 B2 * | 1/2012 | Harmel ............... H04L 12/2602 709/224 |
| 8,528,091 B2 * | 9/2013 | Bowen .................. G06F 21/566 713/168 |
| 2001/0008556 A1 * | 7/2001 | Bauer .................. H04L 12/6418 379/265.06 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0266148 A1 * | 11/2007 | Ruiz ................... H04L 12/2697 709/224 |
| 2007/0283167 A1 | 12/2007 | Venters, III et al. |
| 2009/0040926 A1 | 2/2009 | Li et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2011/0029711 A1 | 2/2011 | Dhuse et al. |
| 2011/0107027 A1 | 5/2011 | Grube et al. |
| 2011/0185141 A1 | 7/2011 | Dhuse et al. |
| 2011/0286594 A1 * | 11/2011 | Resch .................... H04L 9/085 380/46 |
| 2012/0054500 A1 | 3/2012 | Dhuse et al. |
| 2013/0124669 A1 * | 5/2013 | Anderson ........... G06F 11/3006 709/217 |
| 2014/0098671 A1 * | 4/2014 | Raleigh ................. H04M 15/80 370/235 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

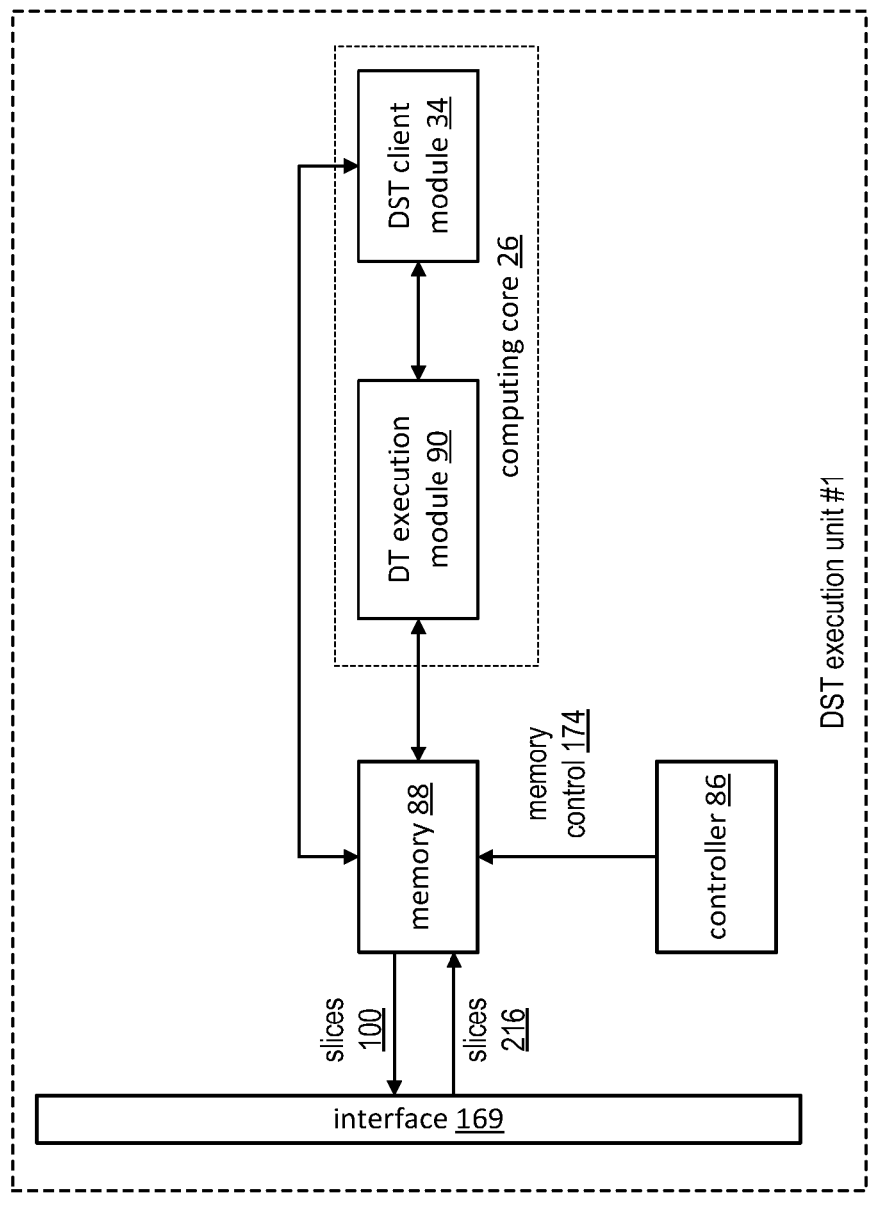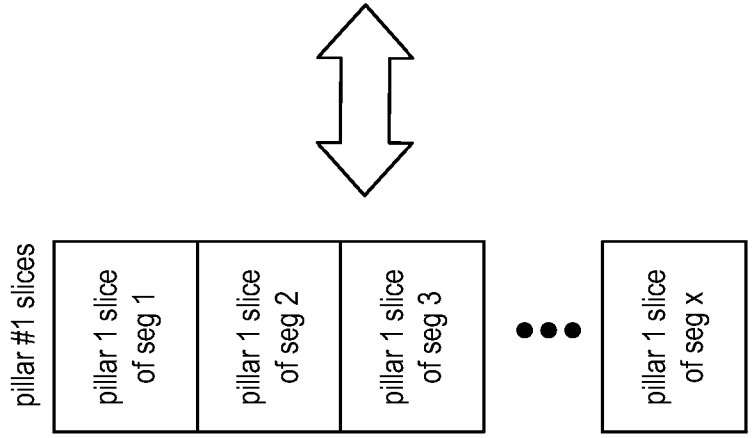
FIG. 24

| DST allocation info 242 | data partition info 320: data ID; | data partition info 320: data ID; No. of partitions; | Addr. info for each partition; | format conversion indication | | |
|---|---|---|---|---|---|---|
| | task execution info 322 | | | intermediate result info 324 | | |
| task 326 | task ordering 328 | data partition 330 | set of DT EX mods 332 | Name 334 | interm. result processing 336 | scratch pad storage 338 | intermediate result storage 340 |
| 1_1 | none | 2_1 - 2_z | 1_1, 2_1, 3_1, 4_1, & 5_1 | R1-1 | DST unit 1 | DST unit 1 | DST units 1-5 |
| 1_2 | none | 2_1 - 2_4 | 1_1, 2_1, 3_1, 4_1, & 5_1 | R1-2 | DST unit 1 | DST unit 1 | DST units 1-5 |
| 1_3 | none | 2_1 - 2_4 2_5 - 2_z | 1_1, 2_1, 3_1, 4_1, & 5_1 1_2, 2_2, 3_2, 4_2, & 5_2 | R1-3 | DST unit 2 | DST unit 2 | DST units 2-6 |
| 1_4 | after 1_3 | R1-3_1 - R1-3_4 R1-3_5 - R1-3_z | 1_1, 2_1, 3_1, 4_1, & 5_1 1_2, 2_2, 6_1, 7_1, & 7_2 | R1_4 | DST unit 3 | DST unit 3 | DST units 3-7 |
| 1_5 | after 1_4 | R1-4_1 - R1-4_z & 2_1 - 2_z | 1_1, 2_1, 3_1, 4_1, & 5_1 | R1-5 | DST unit 1 | DST unit 1 | DST units 1-5 |
| 1_6 | after 1_1 & 1_5 | R1-1_1 - R1-1_z & R1-5_1 - R1-5_z | 1_2, 2_2, 3_2, 4_2, & 5_2 | R1-6 | DST unit 2 | DST unit 2 | DST units 2-6 |
| 1_7 | after 1_2 & 1_5 | R1-2_1 - R1-2_z & R1-5_1 - R1-5_z | 1_2, 2_2, 3_2, 4_2, & 5_2 | R1-7 | DST unit 3 | DST unit 3 | DST units 3-7 |
| 2 | none | 2_1 - 2_z | 3_1, 4_1, 5_1, 6_1, & 7_1 | R2 | DST unit 7 | DST unit 7 | DST units 7, 1-4 |
| 3_1 | none (same as 1_3) | use R1_3 | | R1-1 | | | |
| 3_2 | after 3_1 | R1-3_1 - R1-3_z | 1_2, 2_2, 3_2, 4_2, & 5_2 | R3-2 | DST unit 5 | DST unit 5 | DST units 5,6, 1-3 |

FIG. 32

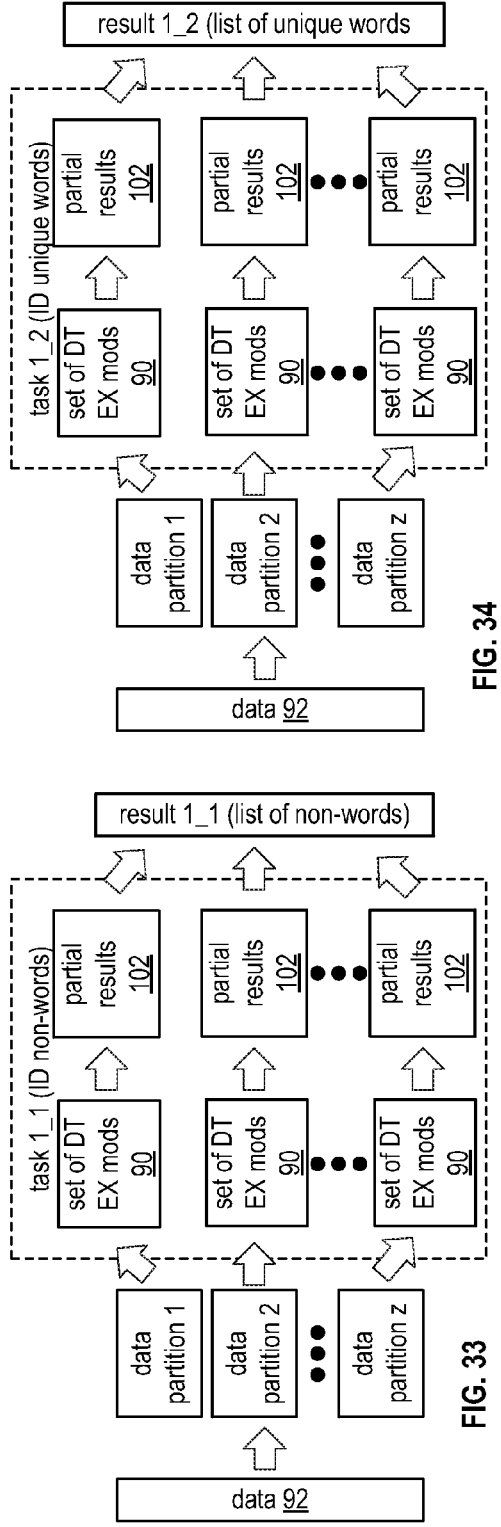
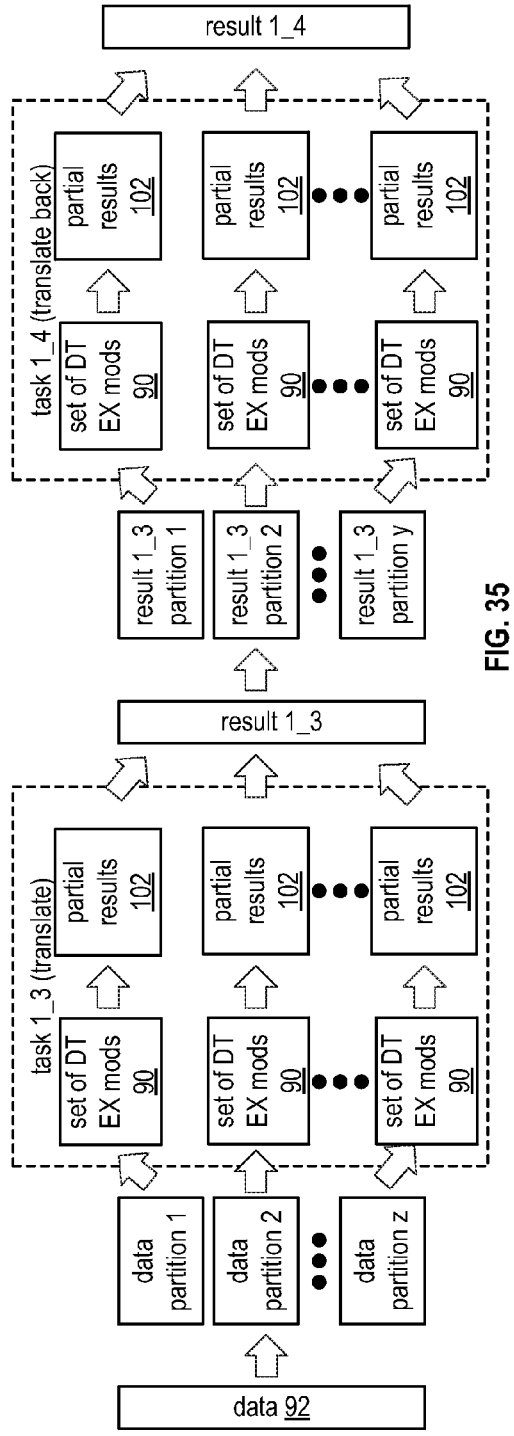
FIG. 33
FIG. 34
FIG. 35

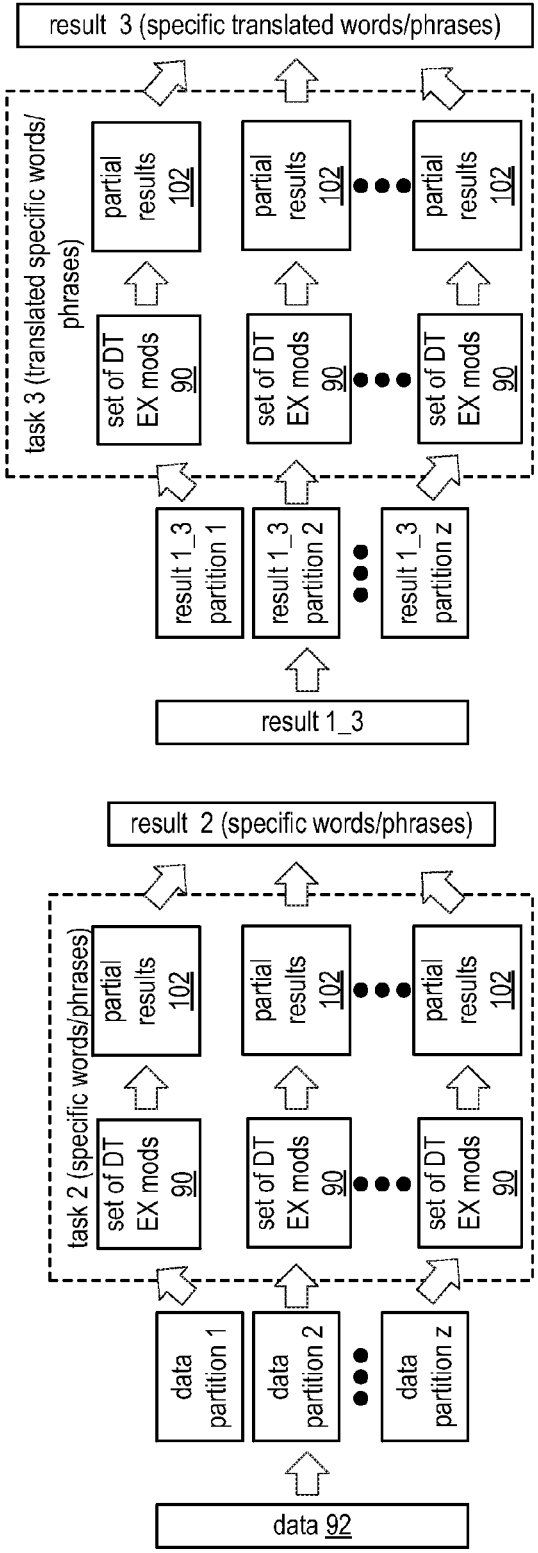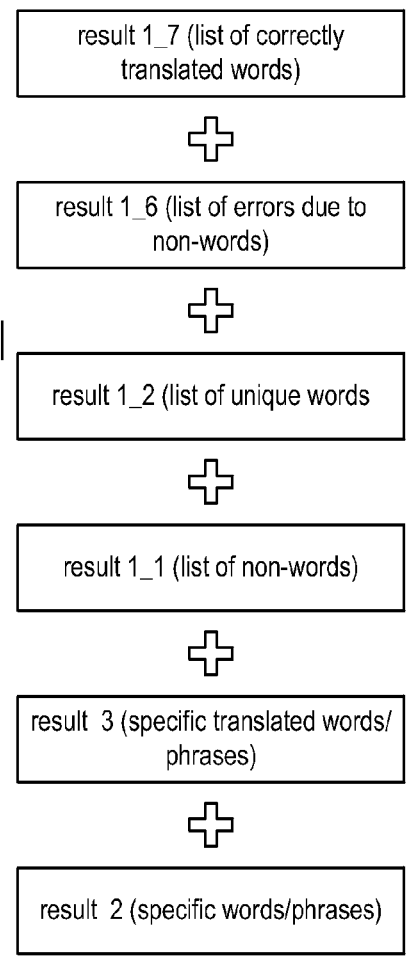

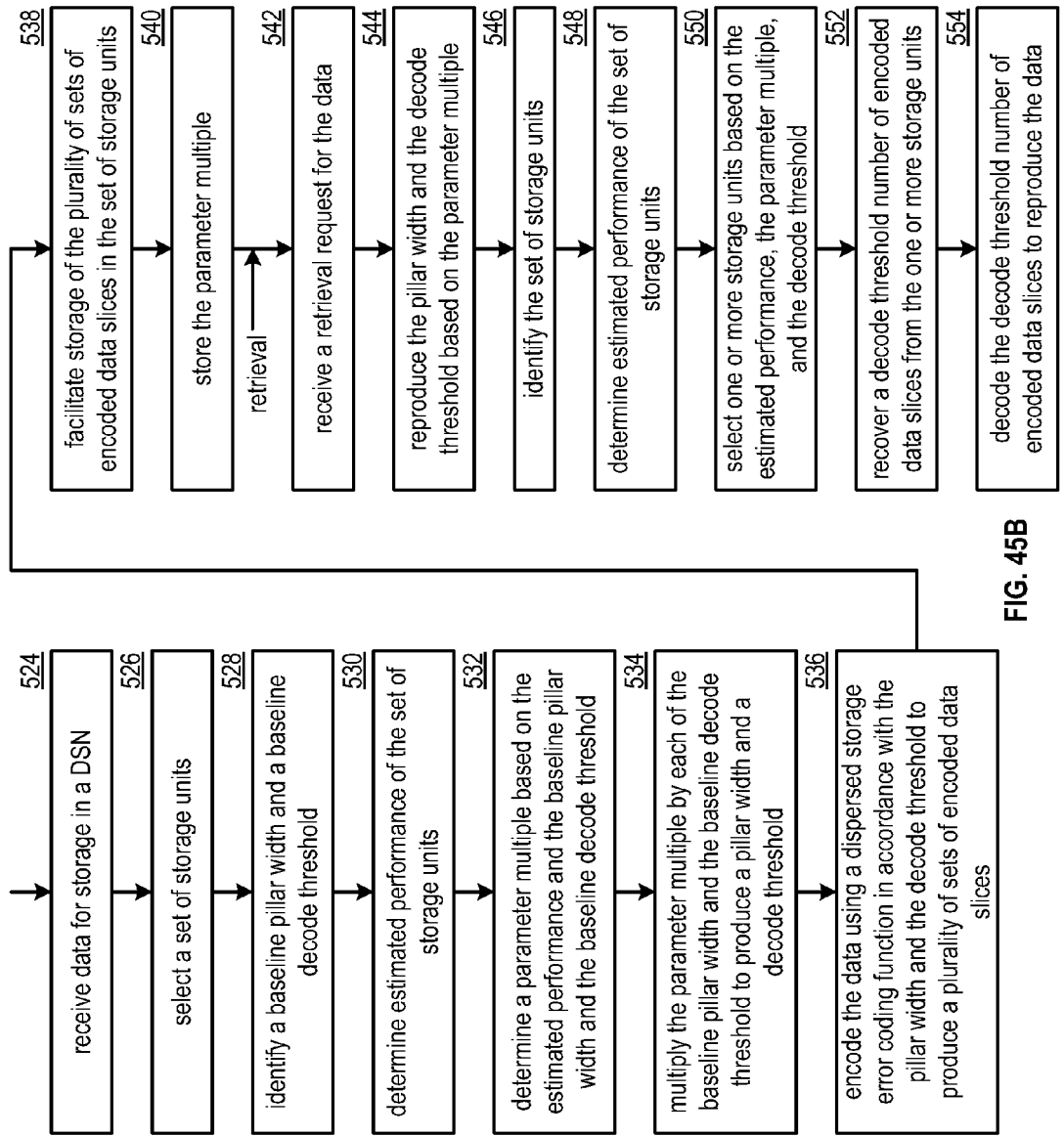

ADJUSTING DISPERSED STORAGE NETWORK TRAFFIC DUE TO REBUILDING

CROSS REFERENCE TO RELATED PATENTS

The present U.S. Utility patent application claims priority pursuant to 35 U.S.C. §119(e) to U.S. Provisional Application No. 61/828,883, entitled "ACCESSING DATA IN A DISPERSED STORAGE NETWORK", filed May 30, 2013, which is hereby incorporated herein by reference in its entirety and made part of the present U.S. Utility patent application for all purposes.

STATEMENT REGARDING FEDERALLY SPONSORED RESEARCH OR DEVELOPMENT-NOT APPLICABLE

INCORPORATION-BY-REFERENCE OF MATERIAL SUBMITTED ON A COMPACT DISC-NOT APPLICABLE

BACKGROUND OF THE INVENTION

1. Technical Field of the Invention

This invention relates generally to computer networks and more particularly to dispersed storage of data and distributed task processing of data.

2. Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 24 is a schematic block diagram of an example of a storage operation of a DST execution unit in accordance with the present invention;

FIG. 32 is a diagram of an example of DST allocation information for the example of FIG. 30 in accordance with the present invention;

FIGS. 33-38 are schematic block diagrams of the DSTN module performing the example of FIG. 30 in accordance with the present invention;

FIG. 39 is a diagram of an example of combining result information into final results for the example of FIG. 30 in accordance with the present invention;

Figure 44A:
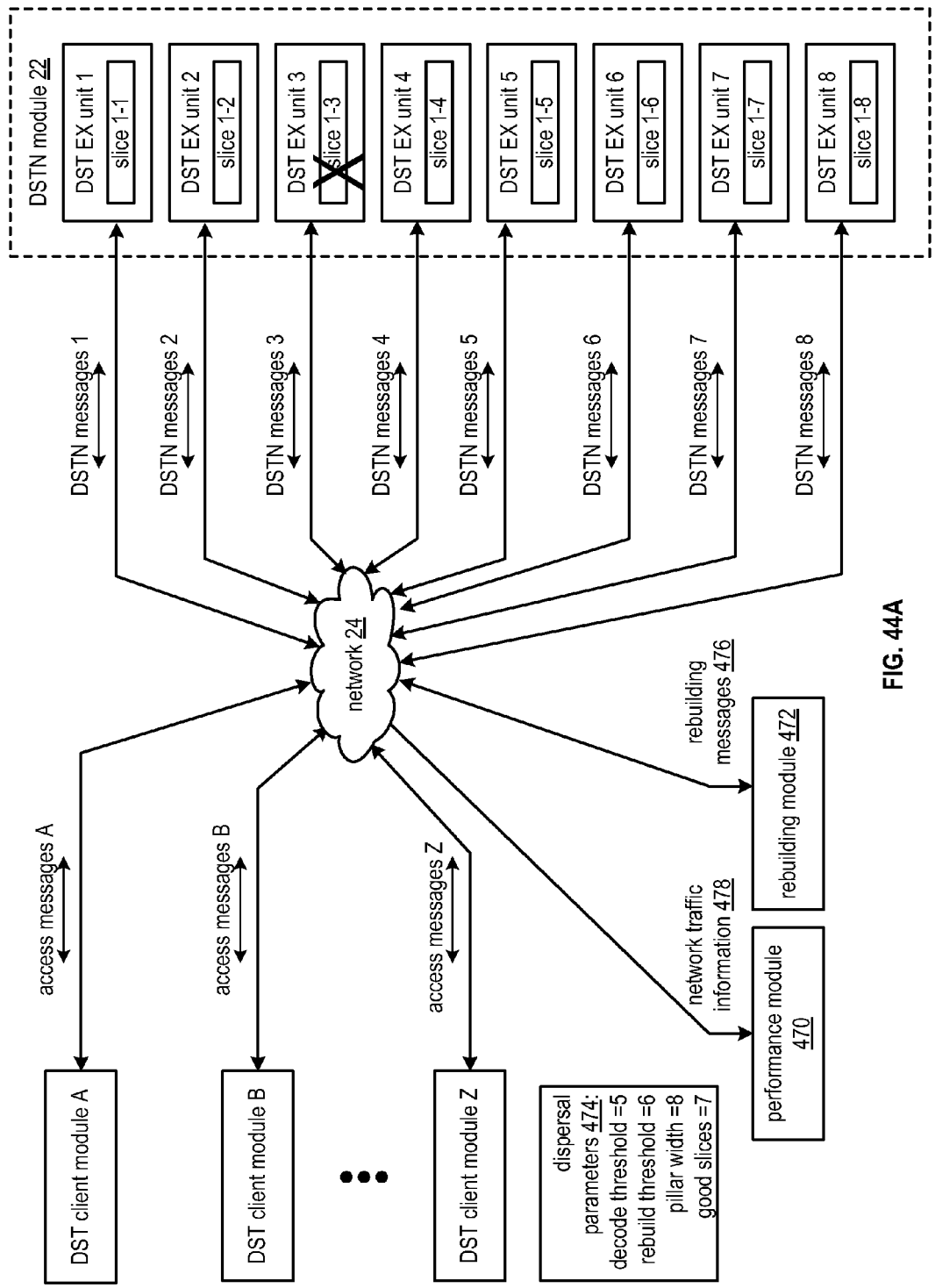
Figure 44B:
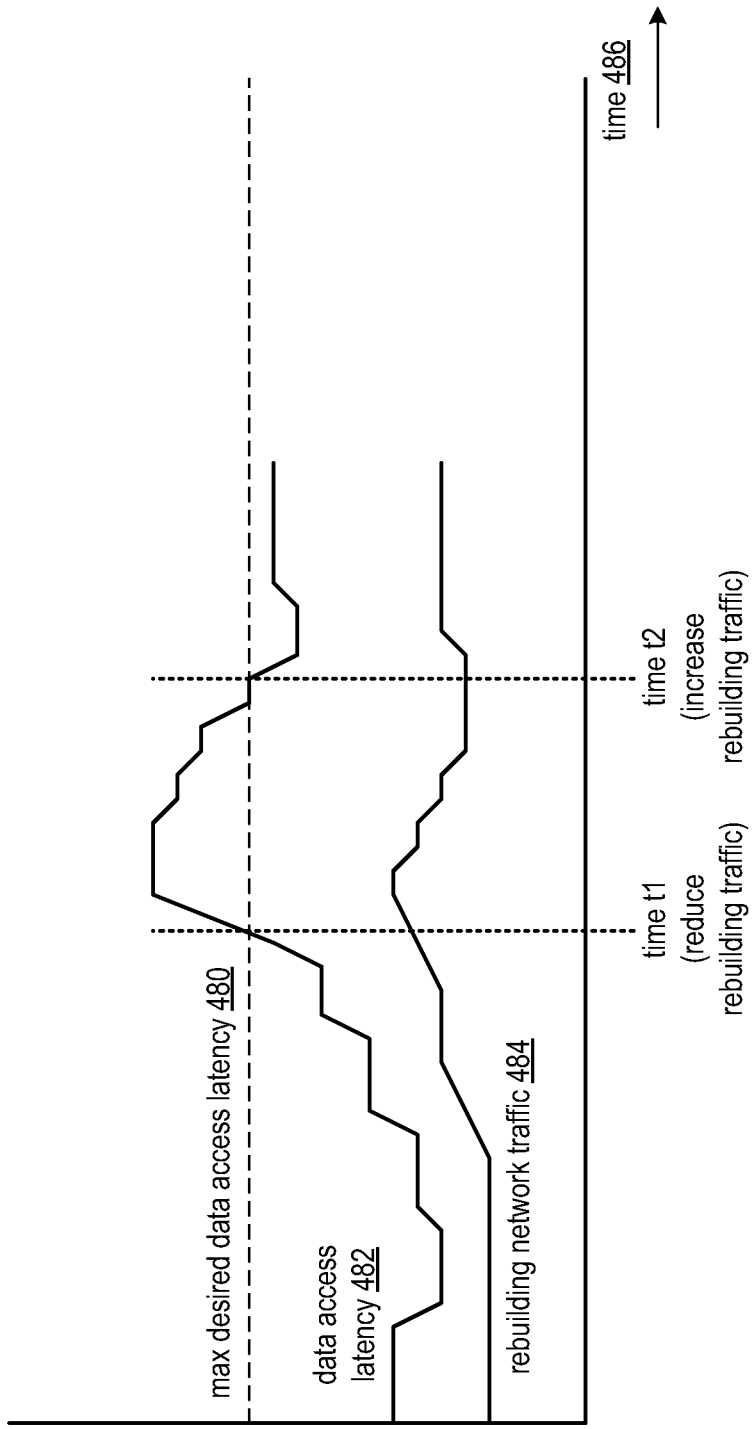
Figure 44C:
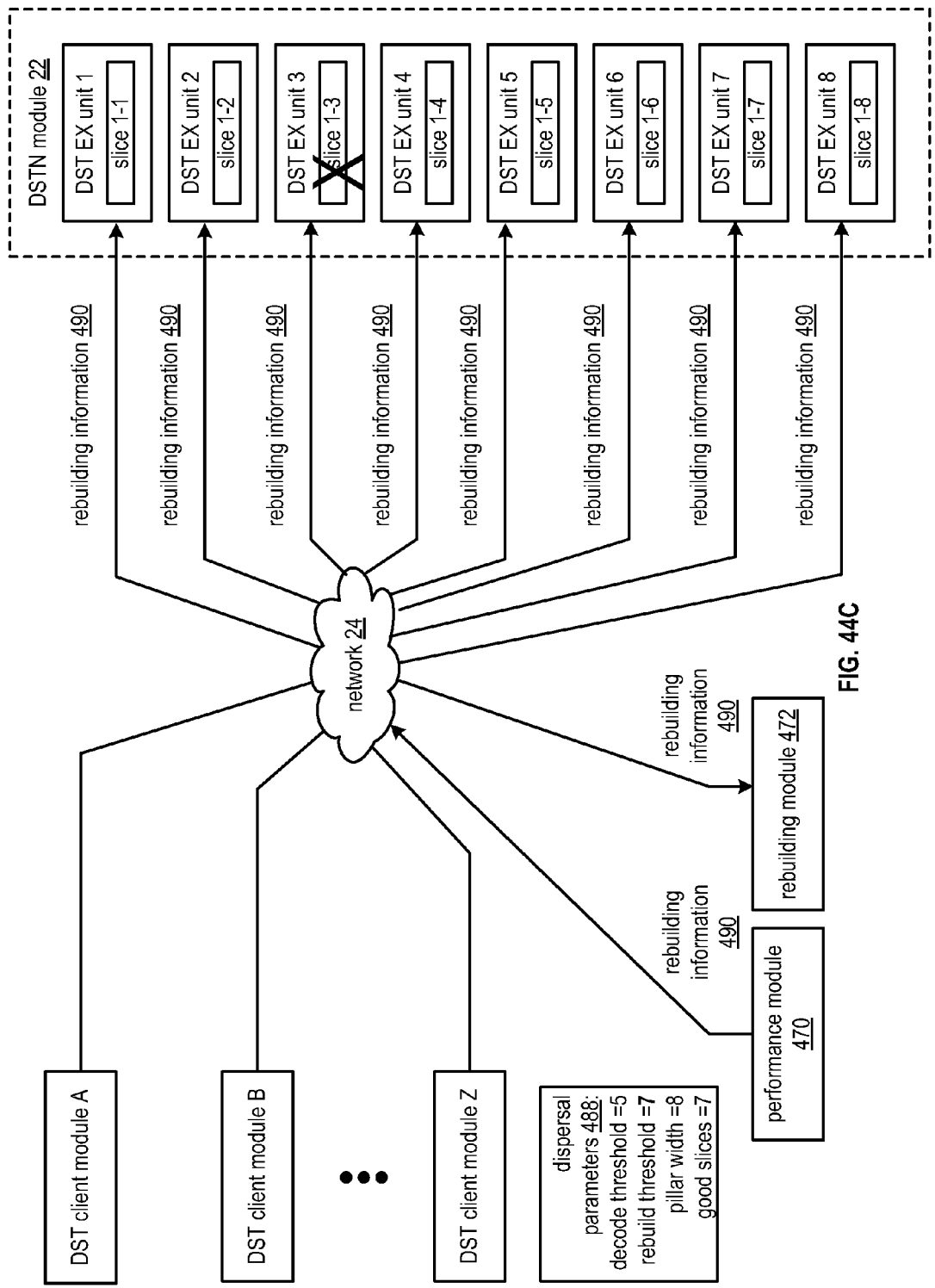
Figure 44D:
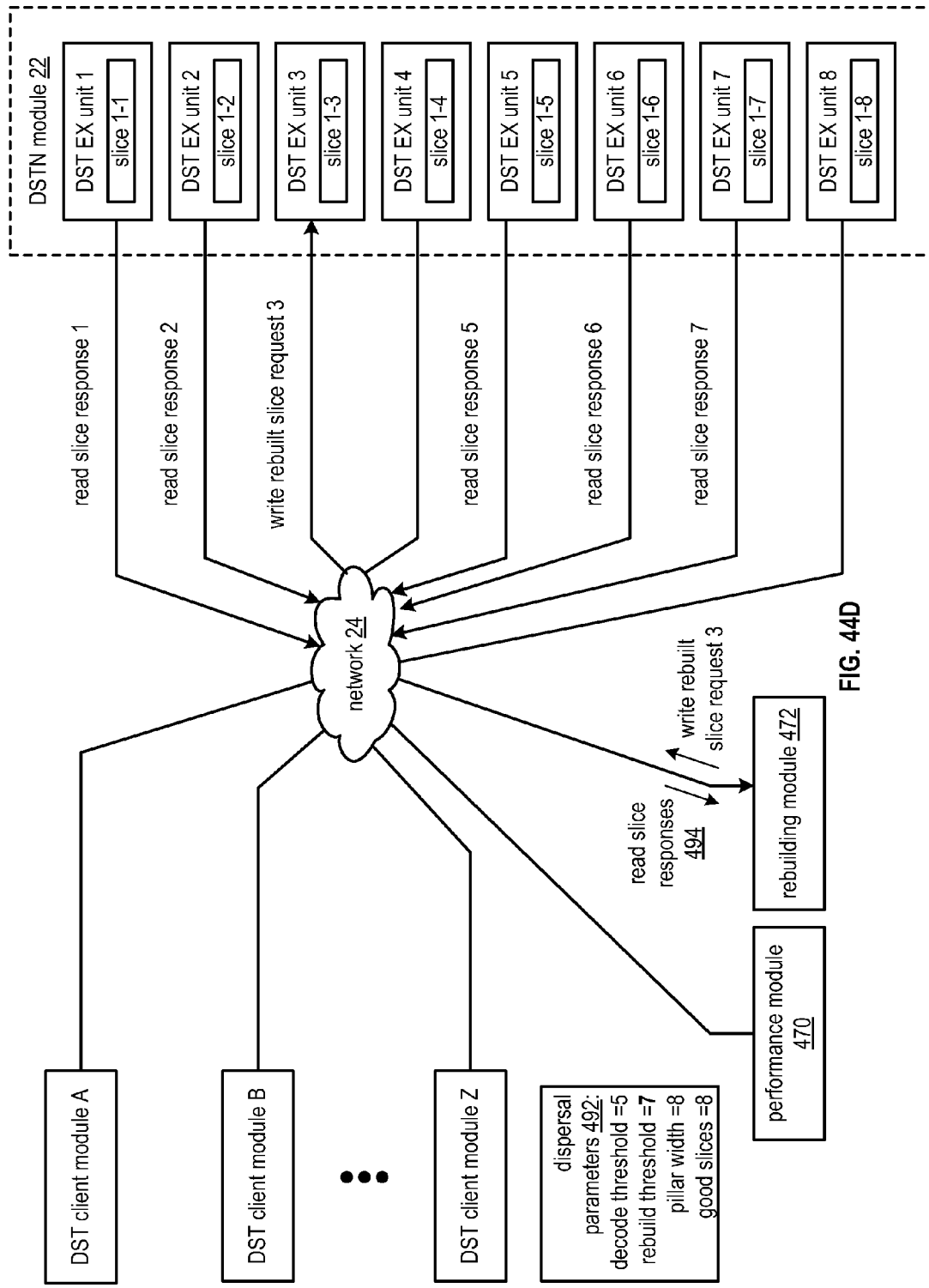
Figure 44E:
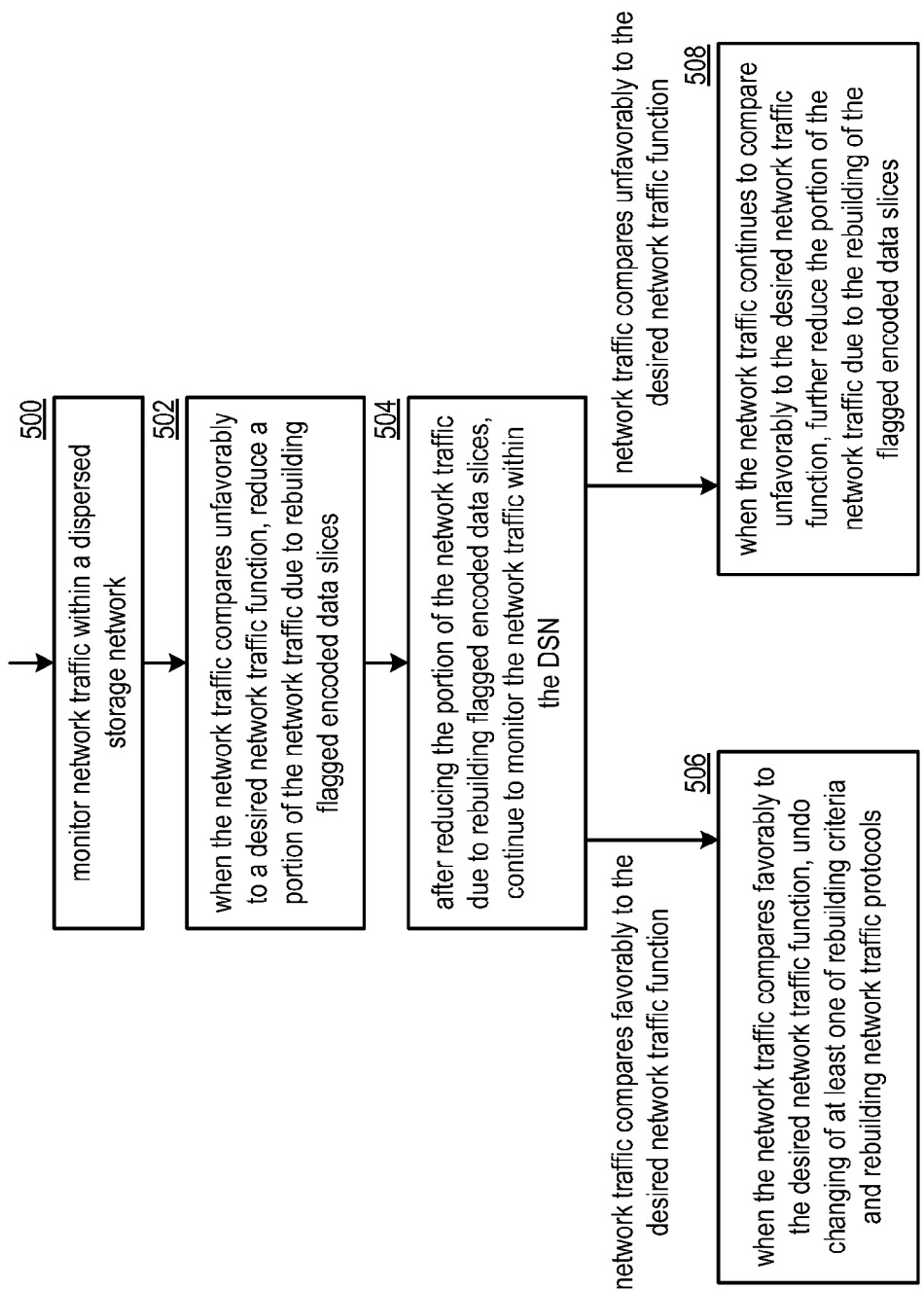
Figure 45A:
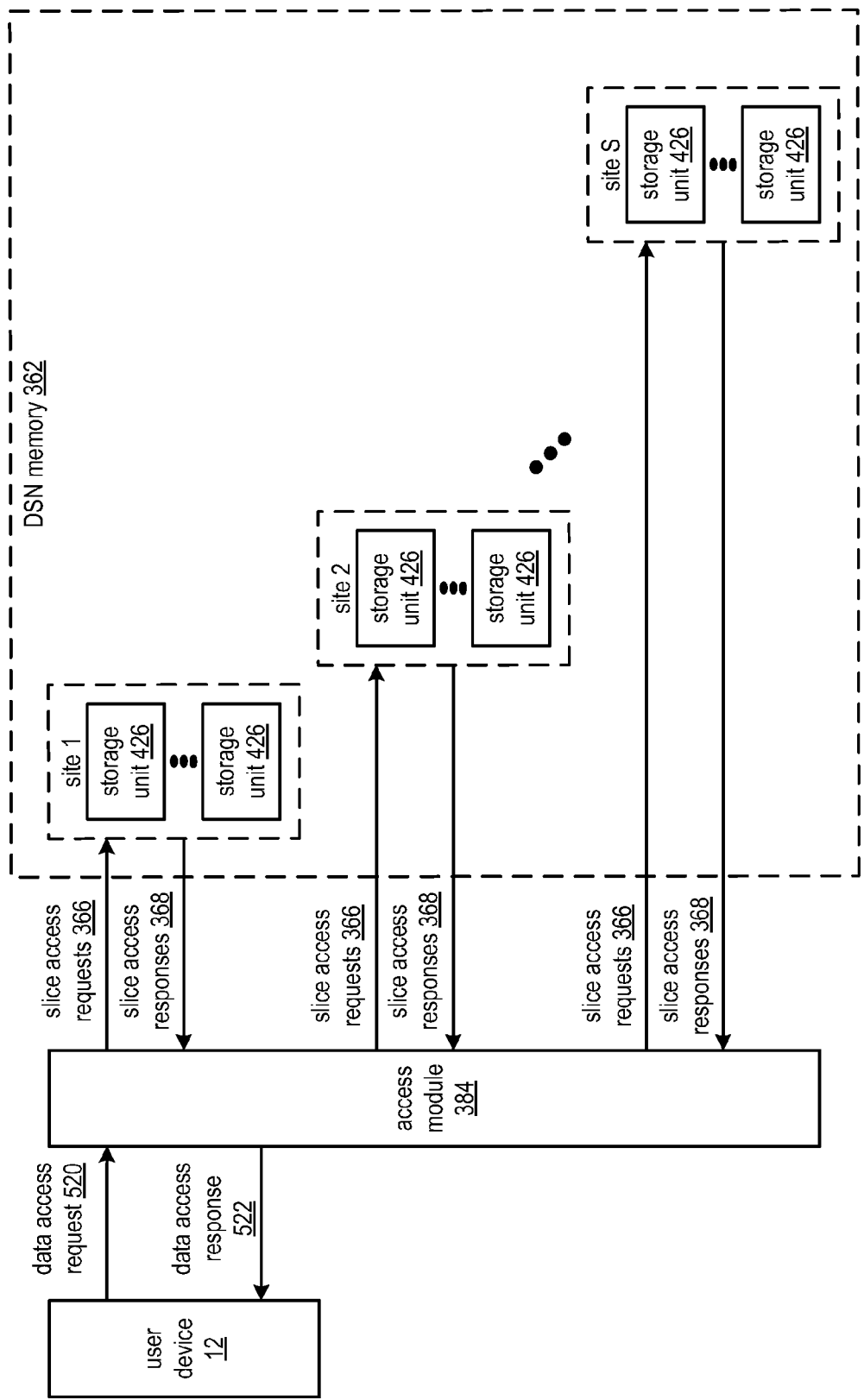
Figure 46A:
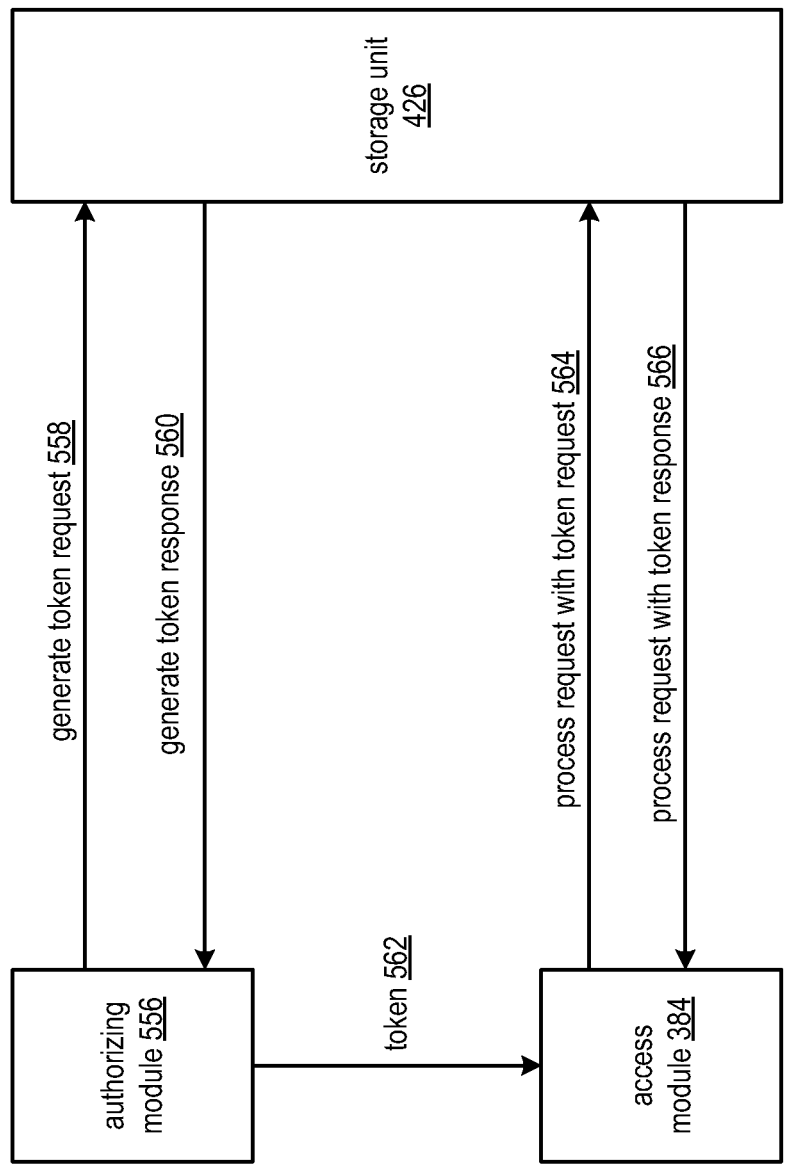
Figure 46B:
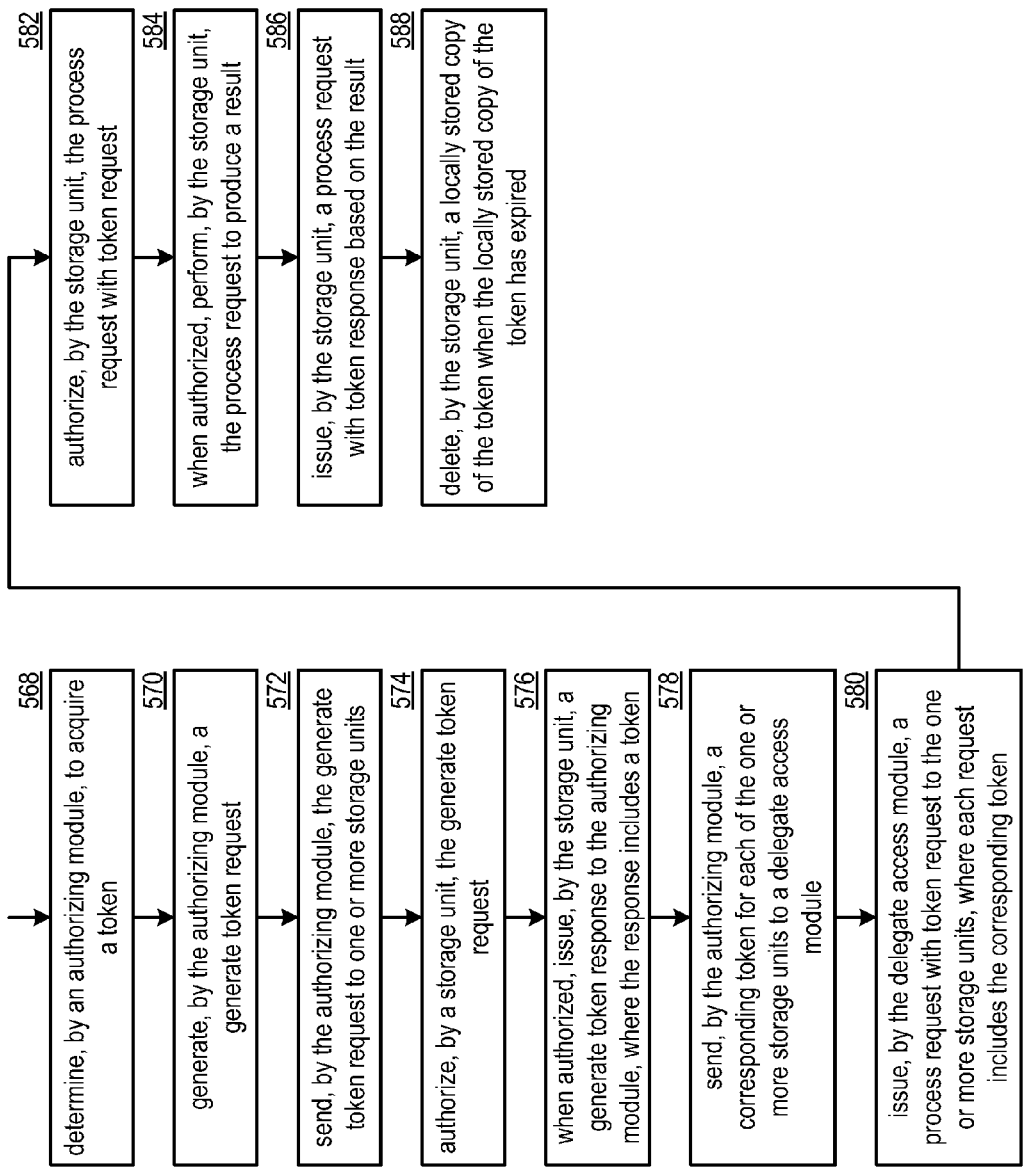

FIGS. 44A, C, D are schematic block diagrams of another embodiment of a dispersed storage network (DSN) illustrating an example of adjusting dispersed storage network traffic due to rebuilding in accordance with the present invention;

FIG. 44B is a timing diagram illustrating an example of adjusting rebuilding network traffic in accordance with the present invention;

FIG. 44E is a flowchart illustrating an example of adjusting dispersed storage network (DSN) traffic due to rebuilding in accordance with the present invention;

FIG. 45A is a schematic block diagram of another embodiment of a dispersed storage network (DSN) system in accordance with the present invention;

FIG. 45B is a flowchart illustrating an example of accessing data in accordance with the present invention;

FIG. 46A is a schematic block diagram of another embodiment of a dispersed storage network (DSN) system in accordance with the present invention; and FIG. 46B is a flowchart illustrating an example of authorizing access in accordance with the present invention.

DETAILED DESCRIPTION OF THE INVENTION

Figure 1:
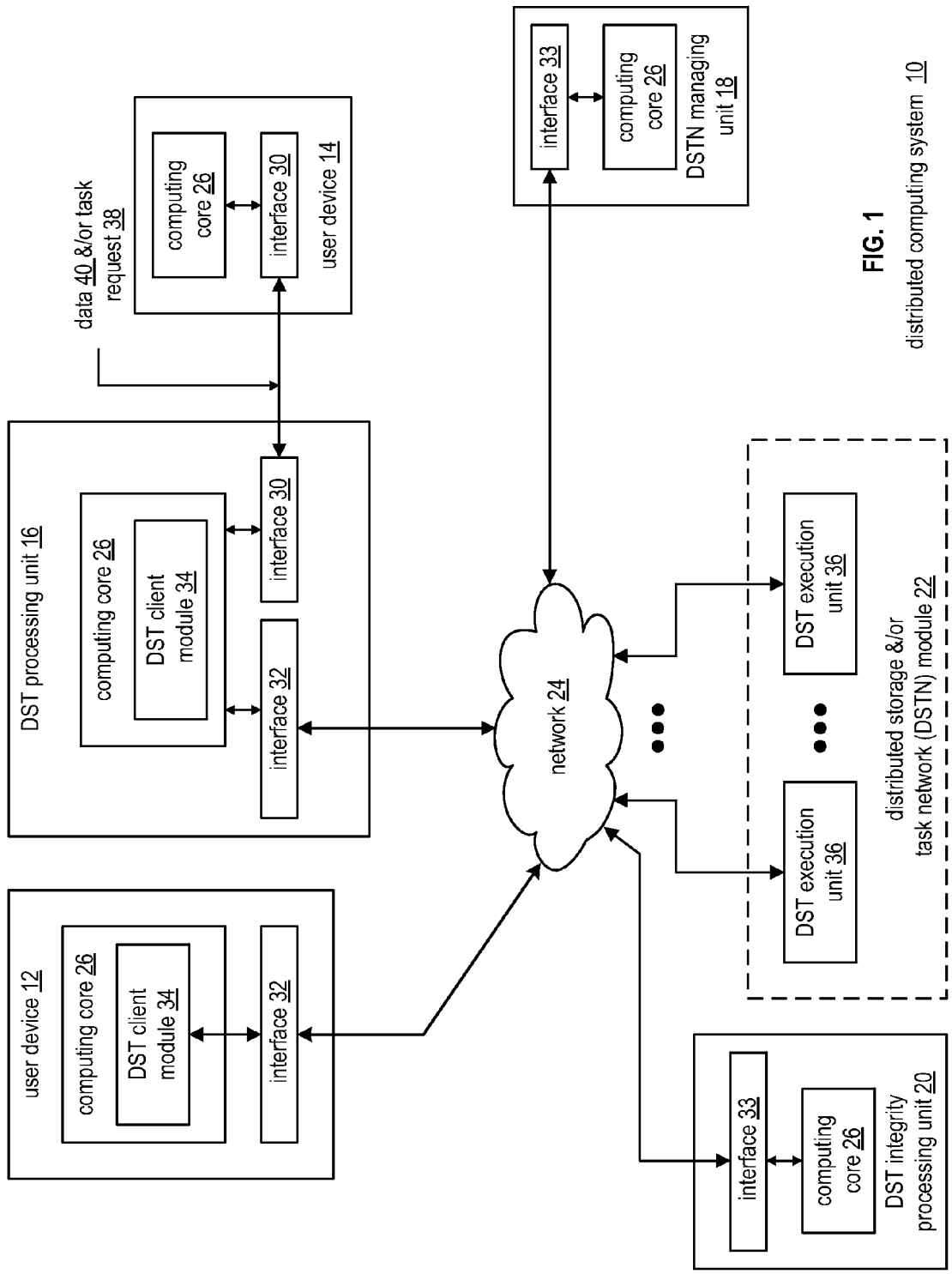
FIG. 1 is a schematic block diagram of an embodiment of a distributed computing system in accordance with the present invention.

FIG. 1 is a schematic block diagram of an embodiment of a distributed computing system 10 that includes a user device 12 and/or a user device 14, a distributed storage and/or task (DST) processing unit 16, a distributed storage and/or task network (DSTN) managing unit 18, a DST integrity processing unit 20, and a distributed storage and/or task network (DSTN) module 22. The components of the distributed computing system 10 are coupled via a network 24, which may include one or more wireless and/or wire lined communication systems; one or more private intranet systems and/or public internet systems; and/or one or more local area networks (LAN) and/or wide area networks (WAN).

The DSTN module 22 includes a plurality of distributed storage and/or task (DST) execution units 36 that may be located at geographically different sites (e.g., one in Chicago, one in Milwaukee, etc.). Each of the DST execution units is operable to store dispersed error encoded data and/or to execute, in a distributed manner, one or more tasks on data. The tasks may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc.

Each of the user devices 12-14, the DST processing unit 16, the DSTN managing unit 18, and the DST integrity processing unit 20 include a computing core 26 and may be a portable computing device and/or a fixed computing device. A portable computing device may be a social networking device, a gaming device, a cell phone, a smart phone, a personal digital assistant, a digital music player, a digital video player, a laptop computer, a handheld computer, a tablet, a video game controller, and/or any other portable device that includes a computing core. A fixed computing device may be a personal computer (PC), a computer server, a cable set-top box, a satellite receiver, a television set, a printer, a fax machine, home entertainment equipment, a video game console, and/or any type of home or office computing equipment. User device 12 and DST processing unit 16 are configured to include a DST client module 34.

With respect to interfaces, each interface 30, 32, and 33 includes software and/or hardware to support one or more communication links via the network 24 indirectly and/or directly. For example, interface 30 supports a communication link (e.g., wired, wireless, direct, via a LAN, via the network 24, etc.) between user device 14 and the DST processing unit 16. As another example, interface 32 supports communication links (e.g., a wired connection, a wireless connection, a LAN connection, and/or any other type of connection to/from the network 24) between user device 12 and the DSTN module 22 and between the DST processing unit 16 and the DSTN module 22. As yet another example, interface 33 supports a communication link for each of the DSTN managing unit 18 and DST integrity processing unit 20 to the network 24.

The distributed computing system 10 is operable to support dispersed storage (DS) error encoded data storage and retrieval, to support distributed task processing on received data, and/or to support distributed task processing on stored data. In general and with respect to DS error encoded data storage and retrieval, the distributed computing system 10 supports three primary operations: storage management, data storage and retrieval (an example of which will be discussed with reference to FIGS. 20-26), and data storage integrity verification. In accordance with these three primary functions, data can be encoded, distributedly stored in physically different locations, and subsequently retrieved in a reliable and secure manner. Such a system is tolerant of a significant number of failures (e.g., up to a failure level, which may be greater than or equal to a pillar width minus a decode threshold minus one) that may result from individual storage device failures and/or network equipment failures without loss of data and without the need for a redundant or backup copy. Further, the system allows the data to be stored for an indefinite period of time without data loss and does so in a secure manner (e.g., the system is very resistant to attempts at hacking the data).

The second primary function (i.e., distributed data storage and retrieval) begins and ends with a user device 12-14. For instance, if a second type of user device 14 has data 40 to store in the DSTN module 22, it sends the data 40 to the DST processing unit 16 via its interface 30. The interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data 40.

To support storage management, the DSTN managing unit 18 performs DS management services. One such DS management service includes the DSTN managing unit 18 establishing distributed data storage parameters (e.g., vault creation, distributed storage parameters, security parameters, billing information, user profile information, etc.) for a user device 12-14 individually or as part of a group of user devices. For example, the DSTN managing unit 18 coordinates creation of a vault (e.g., a virtual memory block) within memory of the DSTN module 22 for a user device, a group of devices, or for public access and establishes per vault dispersed storage (DS) error encoding parameters for a vault. The DSTN managing unit 18 may facilitate storage of DS error encoding parameters for each vault of a plurality of vaults by updating registry information for the distributed computing system 10. The facilitating includes storing updated registry information in one or more of the DSTN module 22, the user device 12, the DST processing unit 16, and the DST integrity processing unit 20.

The DS error encoding parameters (e.g., or dispersed storage error coding parameters) include data segmenting information (e.g., how many segments data (e.g., a file, a group of files, a data block, etc.) is divided into), segment security information (e.g., per segment encryption, compression, integrity checksum, etc.), error coding information (e.g., pillar width, decode threshold, read threshold, write threshold, etc.), slicing information (e.g., the number of encoded data slices that will be created for each data segment); and slice security information (e.g., per encoded data slice encryption, compression, integrity checksum, etc.).

The DSTN managing unit 18 creates and stores user profile information (e.g., an access control list (ACL)) in local memory and/or within memory of the DSTN module 22. The user profile information includes authentication information, permissions, and/or the security parameters. The security parameters may include encryption/decryption scheme, one or more encryption keys, key generation scheme, and/or data encoding/decoding scheme.

The DSTN managing unit 18 creates billing information for a particular user, a user group, a vault access, public vault access, etc. For instance, the DSTN managing unit 18 tracks the number of times a user accesses a private vault and/or public vaults, which can be used to generate a per-access billing information. In another instance, the DSTN managing unit 18 tracks the amount of data stored and/or retrieved by a user device and/or a user group, which can be used to generate a per-data-amount billing information.

Another DS management service includes the DSTN managing unit 18 performing network operations, network administration, and/or network maintenance. Network operations includes authenticating user data allocation requests (e.g., read and/or write requests), managing creation of vaults, establishing authentication credentials for user devices, adding/deleting components (e.g., user devices, DST execution units, and/or DST processing units) from the distributed computing system 10, and/or establishing authentication credentials for DST execution units 36. Network administration includes monitoring devices and/or units for failures, maintaining vault information, determining device and/or unit activation status, determining device and/or unit loading, and/or determining any other system level operation that affects the performance level of the system 10. Network maintenance includes facilitating replacing, upgrading, repairing, and/or expanding a device and/or unit of the system 10.

To support data storage integrity verification within the distributed computing system 10, the DST integrity processing unit 20 performs rebuilding of 'bad' or missing encoded data slices. At a high level, the DST integrity processing unit 20 performs rebuilding by periodically attempting to retrieve/list encoded data slices, and/or slice names of the encoded data slices, from the DSTN module 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in memory of the DSTN module 22. Note that the DST integrity processing unit 20 may be a separate unit as shown, it may be included in the DSTN module 22, it may be included in the DST processing unit 16, and/or distributed among the DST execution units 36.

To support distributed task processing on received data, the distributed computing system 10 has two primary operations: DST (distributed storage and/or task processing) management and DST execution on received data (an example of which will be discussed with reference to FIGS. 3-19). With respect to the storage portion of the DST management, the DSTN managing unit 18 functions as previously described. With respect to the tasking processing of the DST management, the DSTN managing unit 18 performs distributed task processing (DTP) management services. One such DTP management service includes the DSTN managing unit 18 establishing DTP parameters (e.g., user-vault affiliation information, billing information, user-task information, etc.) for a user device 12-14 individually or as part of a group of user devices.

Another DTP management service includes the DSTN managing unit 18 performing DTP network operations, network administration (which is essentially the same as described above), and/or network maintenance (which is essentially the same as described above). Network operations include, but are not limited to, authenticating user task processing requests (e.g., valid request, valid user, etc.), authenticating results and/or partial results, establishing DTP authentication credentials for user devices, adding/deleting components (e.g., user devices, DST execution units, and/or DST processing units) from the distributed computing system, and/or establishing DTP authentication credentials for DST execution units.

To support distributed task processing on stored data, the distributed computing system 10 has two primary operations: DST (distributed storage and/or task) management and DST execution on stored data. With respect to the DST execution on stored data, if the second type of user device 14 has a task request 38 for execution by the DSTN module 22, it sends the task request 38 to the DST processing unit 16 via its interface 30. An example of DST execution on stored data will be discussed in greater detail with reference to FIGS. 27-39. With respect to the DST management, it is substantially similar to the DST management to support distributed task processing on received data.

Figure 2:
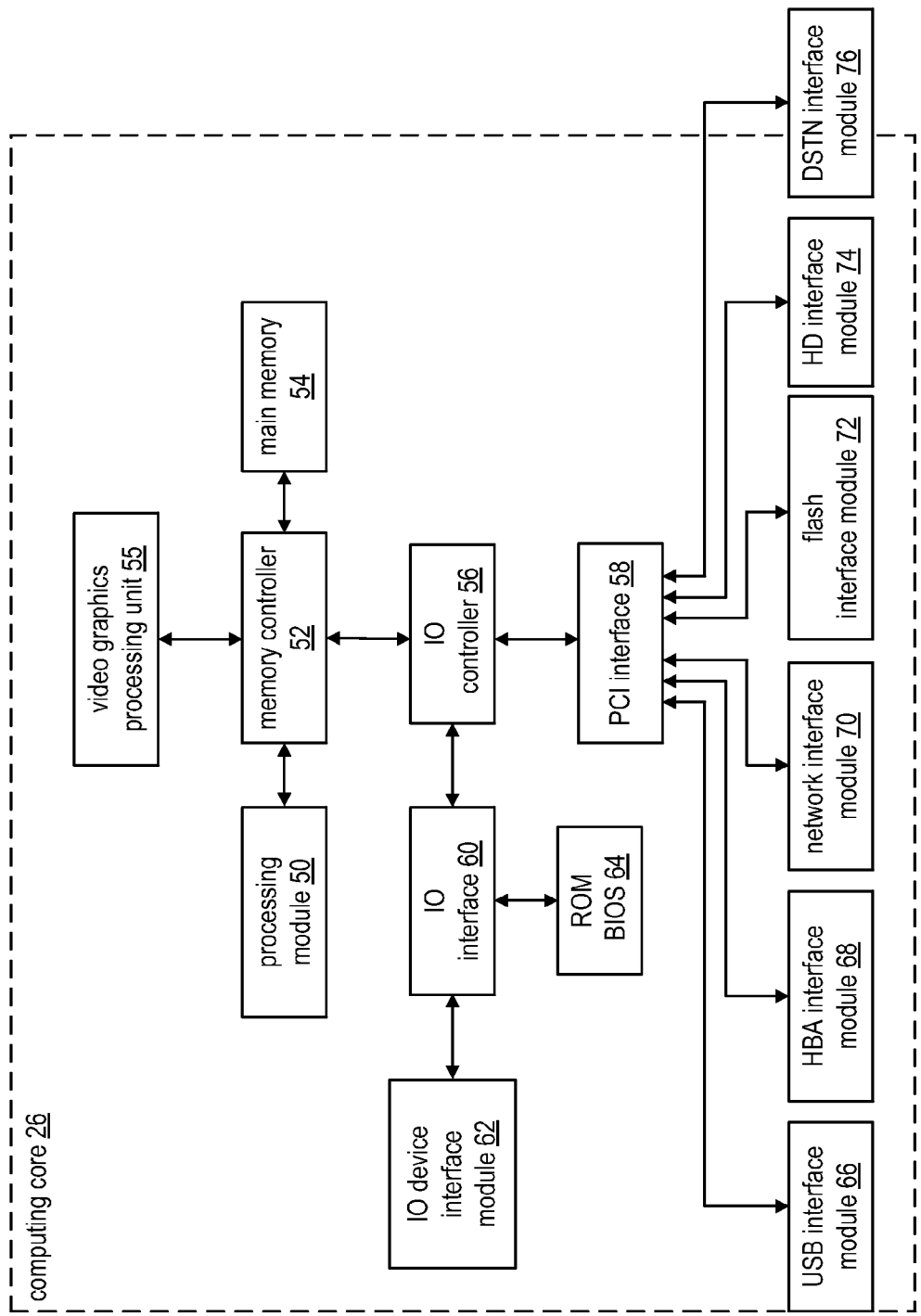
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSTN interface module 76.

The DSTN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSTN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
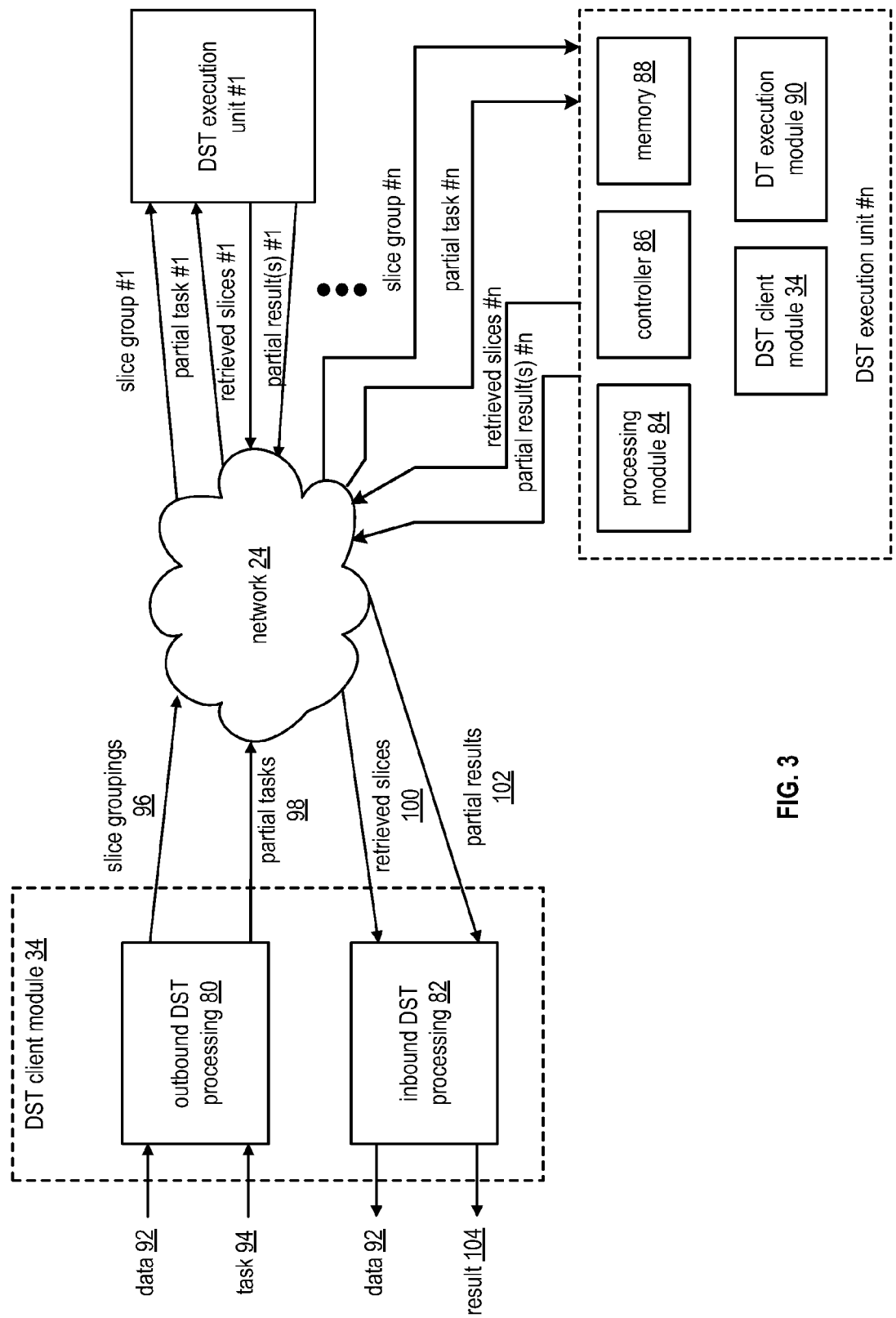
FIG. 3 is a diagram of an example of a distributed storage and task processing in accordance with the present invention.

FIG. 3 is a diagram of an example of the distributed computing system performing a distributed storage and task processing operation. The distributed computing system includes a DST (distributed storage and/or task) client module 34 (which may be in user device 14 and/or in DST processing unit 16 of FIG. 1), a network 24, a plurality of DST execution units 1-n that includes two or more DST execution units 36 of FIG. 1 (which form at least a portion of DSTN module 22 of FIG. 1), a DST managing module (not shown), and a DST integrity verification module (not shown). The DST client module 34 includes an outbound DST processing section 80 and an inbound DST processing section 82. Each of the DST execution units 1-n includes a controller 86, a processing module 84, memory 88, a DT (distributed task) execution module 90, and a DST client module 34.

In an example of operation, the DST client module 34 receives data 92 and one or more tasks 94 to be performed upon the data 92. The data 92 may be of any size and of any content, where, due to the size (e.g., greater than a few Terra-Bytes), the content (e.g., secure data, etc.), and/or task(s) (e.g., MIPS intensive), distributed processing of the task(s) on the data is desired. For example, the data 92 may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

Within the DST client module 34, the outbound DST processing section 80 receives the data 92 and the task(s) 94. The outbound DST processing section 80 processes the data 92 to produce slice groupings 96. As an example of such processing, the outbound DST processing section 80 partitions the data 92 into a plurality of data partitions. For each data partition, the outbound DST processing section 80 dispersed storage (DS) error encodes the data partition to produce encoded data slices and groups the encoded data slices into a slice grouping 96. In addition, the outbound DST processing section 80 partitions the task 94 into partial tasks 98, where the number of partial tasks 98 may correspond to the number of slice groupings 96.

The outbound DST processing section 80 then sends, via the network 24, the slice groupings 96 and the partial tasks 98 to the DST execution units 1-n of the DSTN module 22 of FIG. 1. For example, the outbound DST processing section 80 sends slice group 1 and partial task 1 to DST execution unit 1. As another example, the outbound DST processing section 80 sends slice group #n and partial task #n to DST execution unit #n.

Each DST execution unit performs its partial task 98 upon its slice group 96 to produce partial results 102. For example, DST execution unit #1 performs partial task #1 on slice group #1 to produce a partial result #1, for results. As a more specific example, slice group #1 corresponds to a data partition of a series of digital books and the partial task #1 corresponds to searching for specific phrases, recording where the phrase is found, and establishing a phrase count. In this more specific example, the partial result #1 includes information as to where the phrase was found and includes the phrase count.

Upon completion of generating their respective partial results 102, the DST execution units send, via the network 24, their partial results 102 to the inbound DST processing section 82 of the DST client module 34. The inbound DST processing section 82 processes the received partial results 102 to produce a result 104. Continuing with the specific example of the preceding paragraph, the inbound DST processing section 82 combines the phrase count from each of the DST execution units 36 to produce a total phrase count. In addition, the inbound DST processing section 82 combines the 'where the phrase was found' information from each of the DST execution units 36 within their respective data partitions to produce 'where the phrase was found' information for the series of digital books.

In another example of operation, the DST client module 34 requests retrieval of stored data within the memory of the DST execution units 36 (e.g., memory of the DSTN module). In this example, the task 94 is retrieve data stored in the memory of the DSTN module. Accordingly, the outbound DST processing section 80 converts the task 94 into a plurality of partial tasks 98 and sends the partial tasks 98 to the respective DST execution units 1-n.

In response to the partial task 98 of retrieving stored data, a DST execution unit 36 identifies the corresponding encoded data slices 100 and retrieves them. For example, DST execution unit #1 receives partial task #1 and retrieves, in response thereto, retrieved slices #1. The DST execution units 36 send their respective retrieved slices 100 to the inbound DST processing section 82 via the network 24.

The inbound DST processing section 82 converts the retrieved slices 100 into data 92. For example, the inbound DST processing section 82 de-groups the retrieved slices 100 to produce encoded slices per data partition. The inbound DST processing section 82 then DS error decodes the encoded slices per data partition to produce data partitions. The inbound DST processing section 82 de-partitions the data partitions to recapture the data 92.

Figure 4:
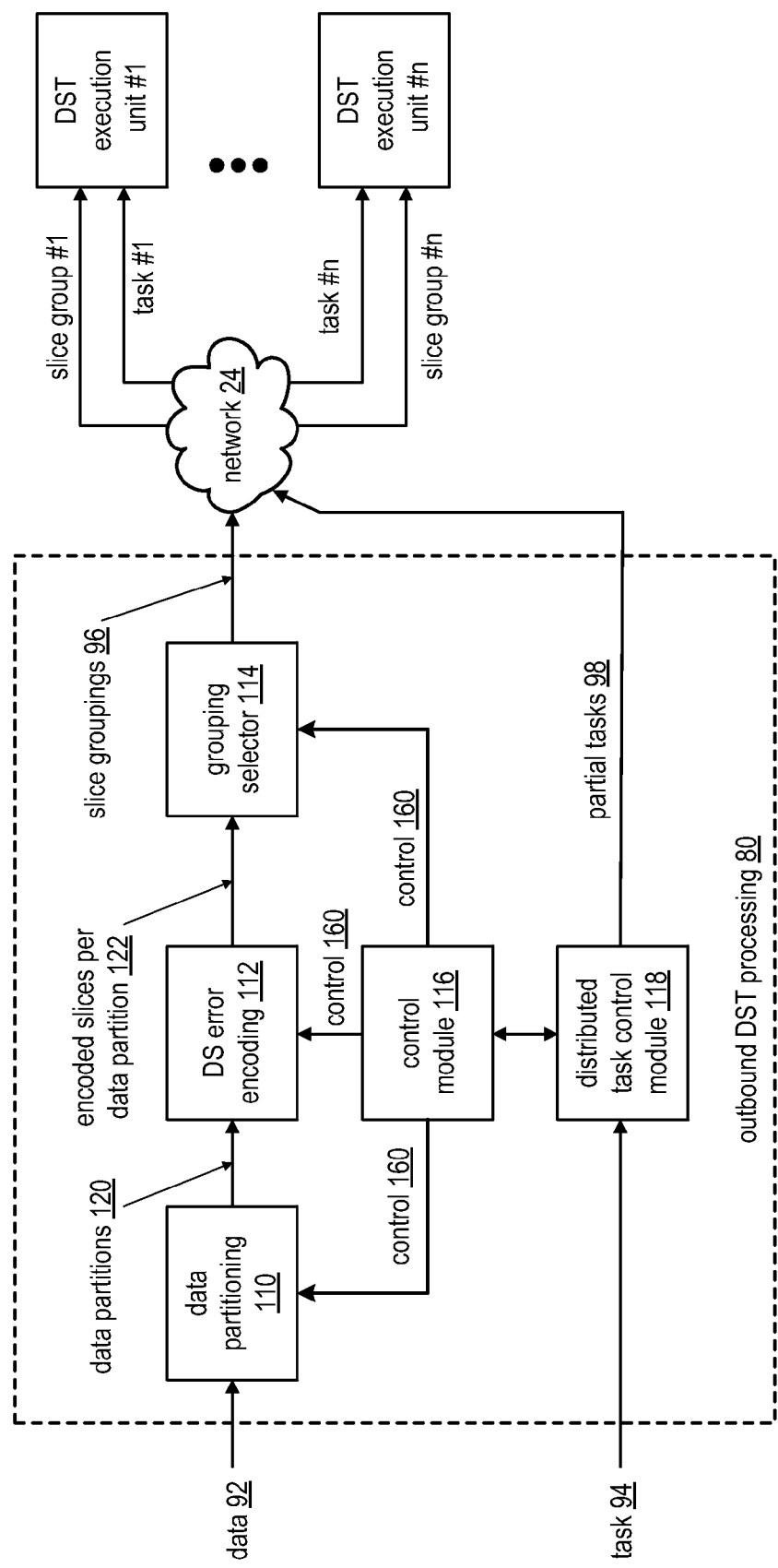
FIG. 4 is a schematic block diagram of an embodiment of an outbound distributed storage and/or task (DST) processing in accordance with the present invention.

FIG. 4 is a schematic block diagram of an embodiment of an outbound distributed storage and/or task (DST) processing section 80 of a DST client module 34 FIG. 1 coupled to a DSTN module 22 of a FIG. 1 (e.g., a plurality of n DST execution units 36) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 partitions data 92 into a plurality of data partitions 120. The number of partitions and the size of the partitions may be selected by the control module 116 via control 160 based on the data 92 (e.g., its size, its content, etc.), a corresponding task 94 to be performed (e.g., simple, complex, single step, multiple steps, etc.), DS encoding parameters (e.g., pillar width, decode threshold, write threshold, segment security parameters, slice security parameters, etc.), capabilities of the DST execution units 36 (e.g., processing resources, availability of processing recourses, etc.), and/or as may be inputted by a user, system administrator, or other operator (human or automated). For example, the data partitioning module 110 partitions the data 92 (e.g., 100 Terra-Bytes) into 100,000 data segments, each being 1 Giga-Byte in size. Alternatively, the data partitioning module 110 partitions the data 92 into a plurality of data segments, where some of data segments are of a different size, are of the same size, or a combination thereof.

The DS error encoding module 112 receives the data partitions 120 in a serial manner, a parallel manner, and/or a combination thereof. For each data partition 120, the DS error encoding module 112 DS error encodes the data partition 120 in accordance with control information 160 from the control module 116 to produce encoded data slices 122. The DS error encoding includes segmenting the data partition into data segments, segment security processing (e.g., encryption, compression, watermarking, integrity check (e.g., CRC), etc.), error encoding, slicing, and/or per slice security processing (e.g., encryption, compression, watermarking, integrity check (e.g., CRC), etc.). The control information 160 indicates which steps of the DS error encoding are active for a given data partition and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 122 of a data partition into a set of slice groupings 96. The number of slice groupings corresponds to the number of DST execution units 36 identified for a particular task 94. For example, if five DST execution units 36 are identified for the particular task 94, the grouping selector module groups the encoded slices 122 of a data partition into five slice groupings 96. The grouping selector module 114 outputs the slice groupings 96 to the corresponding DST execution units 36 via the network 24.

The distributed task control module 118 receives the task 94 and converts the task 94 into a set of partial tasks 98. For example, the distributed task control module 118 receives a task to find where in the data (e.g., a series of books) a phrase occurs and a total count of the phrase usage in the data. In this example, the distributed task control module 118 replicates the task 94 for each DST execution unit 36 to produce the partial tasks 98. In another example, the distributed task control module 118 receives a task to find where in the data a first phrase occurs, where in the data a second phrase occurs, and a total count for each phrase usage in the data. In this example, the distributed task control module 118 generates a first set of partial tasks 98 for finding and counting the first phrase and a second set of partial tasks for finding and counting the second phrase. The distributed task control module 118 sends respective first and/or second partial tasks 98 to each DST execution unit 36.

Figure 5:
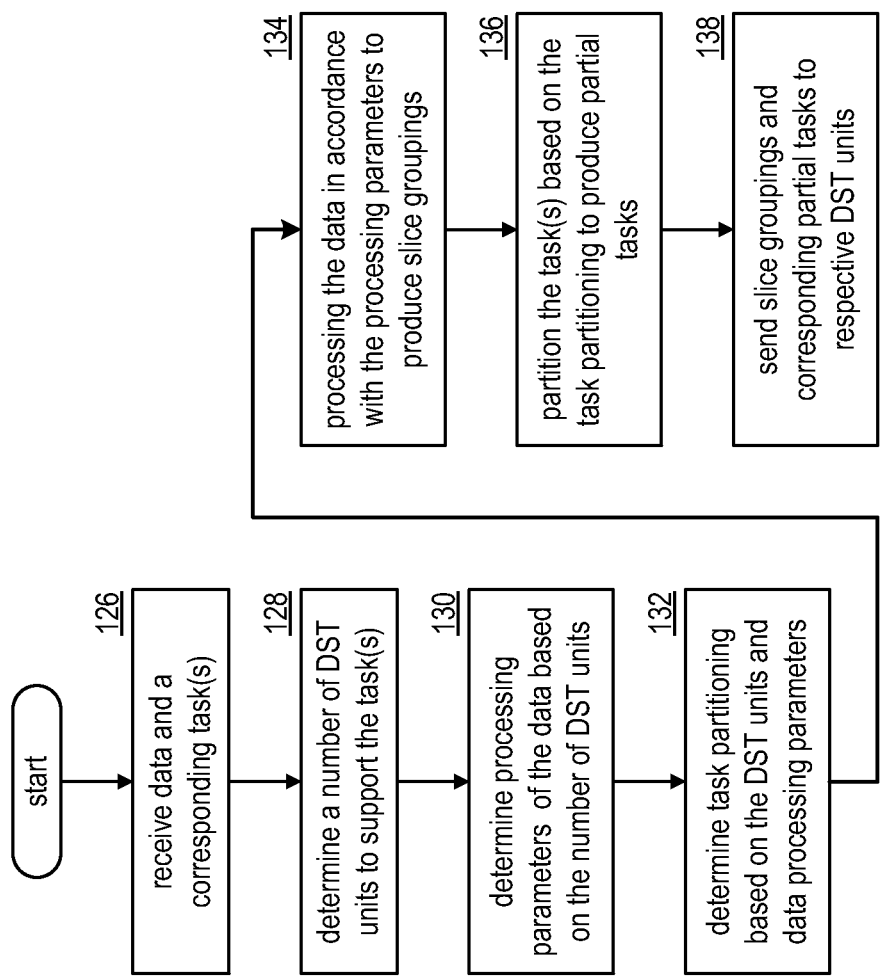
FIG. 5 is a logic diagram of an example of a method for outbound DST processing in accordance with the present invention.

FIG. 5 is a logic diagram of an example of a method for outbound distributed storage and task (DST) processing that begins at step 126 where a DST client module receives data and one or more corresponding tasks. The method continues at step 128 where the DST client module determines a number of DST units to support the task for one or more data partitions. For example, the DST client module may determine the number of DST units to support the task based on the size of the data, the requested task, the content of the data, a predetermined number (e.g., user indicated, system administrator determined, etc.), available DST units, capability of the DST units, and/or any other factor regarding distributed task processing of the data. The DST client module may select the same DST units for each data partition, may select different DST units for the data partitions, or a combination thereof.

The method continues at step 130 where the DST client module determines processing parameters of the data based on the number of DST units selected for distributed task processing. The processing parameters include data partitioning information, DS encoding parameters, and/or slice grouping information. The data partitioning information includes a number of data partitions, size of each data partition, and/or organization of the data partitions (e.g., number of data blocks in a partition, the size of the data blocks, and arrangement of the data blocks). The DS encoding parameters include segmenting information, segment security information, error encoding information (e.g., dispersed storage error encoding function parameters including one or more of pillar width, decode threshold, write threshold, read threshold, generator matrix), slicing information, and/or per slice security information. The slice grouping information includes information regarding how to arrange the encoded data slices into groups for the selected DST units. As a specific example, if the DST client module determines that five DST units are needed to support the task, then it determines that the error encoding parameters include a pillar width of five and a decode threshold of three.

The method continues at step 132 where the DST client module determines task partitioning information (e.g., how to partition the tasks) based on the selected DST units and data processing parameters. The data processing parameters include the processing parameters and DST unit capability information. The DST unit capability information includes the number of DT (distributed task) execution units, execution capabilities of each DT execution unit (e.g., MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.)), and/or any information germane to executing one or more tasks.

The method continues at step 134 where the DST client module processes the data in accordance with the processing parameters to produce slice groupings. The method continues at step 136 where the DST client module partitions the task based on the task partitioning information to produce a set of partial tasks. The method continues at step 138 where the DST client module sends the slice groupings and the corresponding partial tasks to respective DST units.

Figure 6:
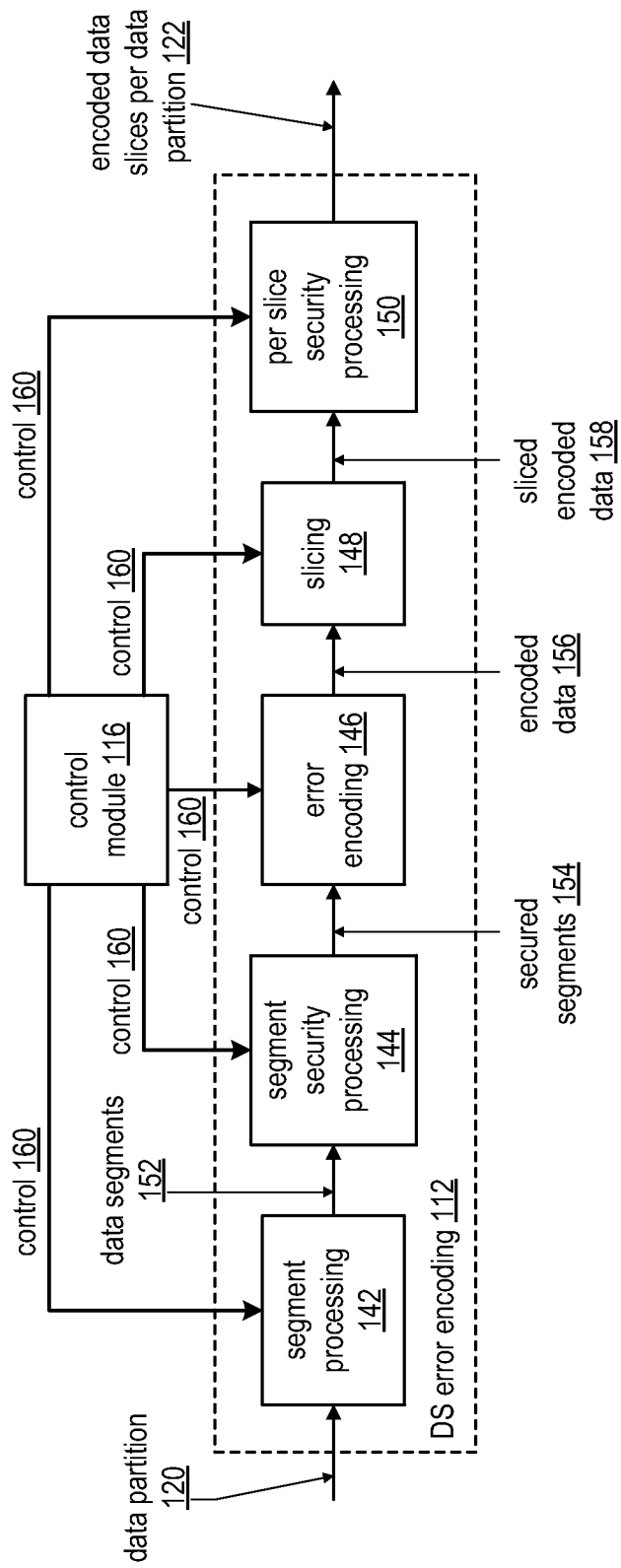
FIG. 6 is a schematic block diagram of an embodiment of a dispersed error encoding in accordance with the present invention.

FIG. 6 is a schematic block diagram of an embodiment of the dispersed storage (DS) error encoding module 112 of an outbound distributed storage and task (DST) processing section. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives a data partition 120 from a data partitioning module and receives segmenting information as the control information 160 from the control module 116. The segmenting information indicates how the segment processing module 142 is to segment the data partition 120. For example, the segmenting information indicates how many rows to segment the data based on a decode threshold of an error encoding scheme, indicates how many columns to segment the data into based on a number and size of data blocks within the data partition 120, and indicates how many columns to include in a data segment 152. The segment processing module 142 segments the data 120 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., cyclic redundancy check (CRC), etc.), and/or any other type of digital security. For example, when the segment security processing module 144 is enabled, it may compress a data segment 152, encrypt the compressed data segment, and generate a CRC value for the encrypted data segment to produce a secure data segment 154. When the segment security processing module 144 is not enabled, it passes the data segments 152 to the error encoding module 146 or is bypassed such that the data segments 152 are provided to the error encoding module 146.

The error encoding module 146 encodes the secure data segments 154 in accordance with error correction encoding parameters received as control information 160 from the control module 116. The error correction encoding parameters (e.g., also referred to as dispersed storage error coding parameters) include identifying an error correction encoding scheme (e.g., forward error correction algorithm, a Reed-Solomon based algorithm, an online coding algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment 154 to produce an encoded data segment 156.

The slicing module 148 slices the encoded data segment 156 in accordance with the pillar width of the error correction encoding parameters received as control information 160. For example, if the pillar width is five, the slicing module 148 slices an encoded data segment 156 into a set of five encoded data slices. As such, for a plurality of encoded data segments 156 for a given data partition, the slicing module outputs a plurality of sets of encoded data slices 158.

The per slice security processing module 150, when enabled by the control module 116, secures each encoded data slice 158 based on slice security information received as control information 160 from the control module 116. The slice security information includes data compression, encryption, watermarking, integrity check (e.g., CRC, etc.), and/or any other type of digital security. For example, when the per slice security processing module 150 is enabled, it compresses an encoded data slice 158, encrypts the compressed encoded data slice, and generates a CRC value for the encrypted encoded data slice to produce a secure encoded data slice 122. When the per slice security processing module 150 is not enabled, it passes the encoded data slices 158 or is bypassed such that the encoded data slices 158 are the output of the DS error encoding module 112. Note that the control module 116 may be omitted and each module stores its own parameters.

Figure 7:
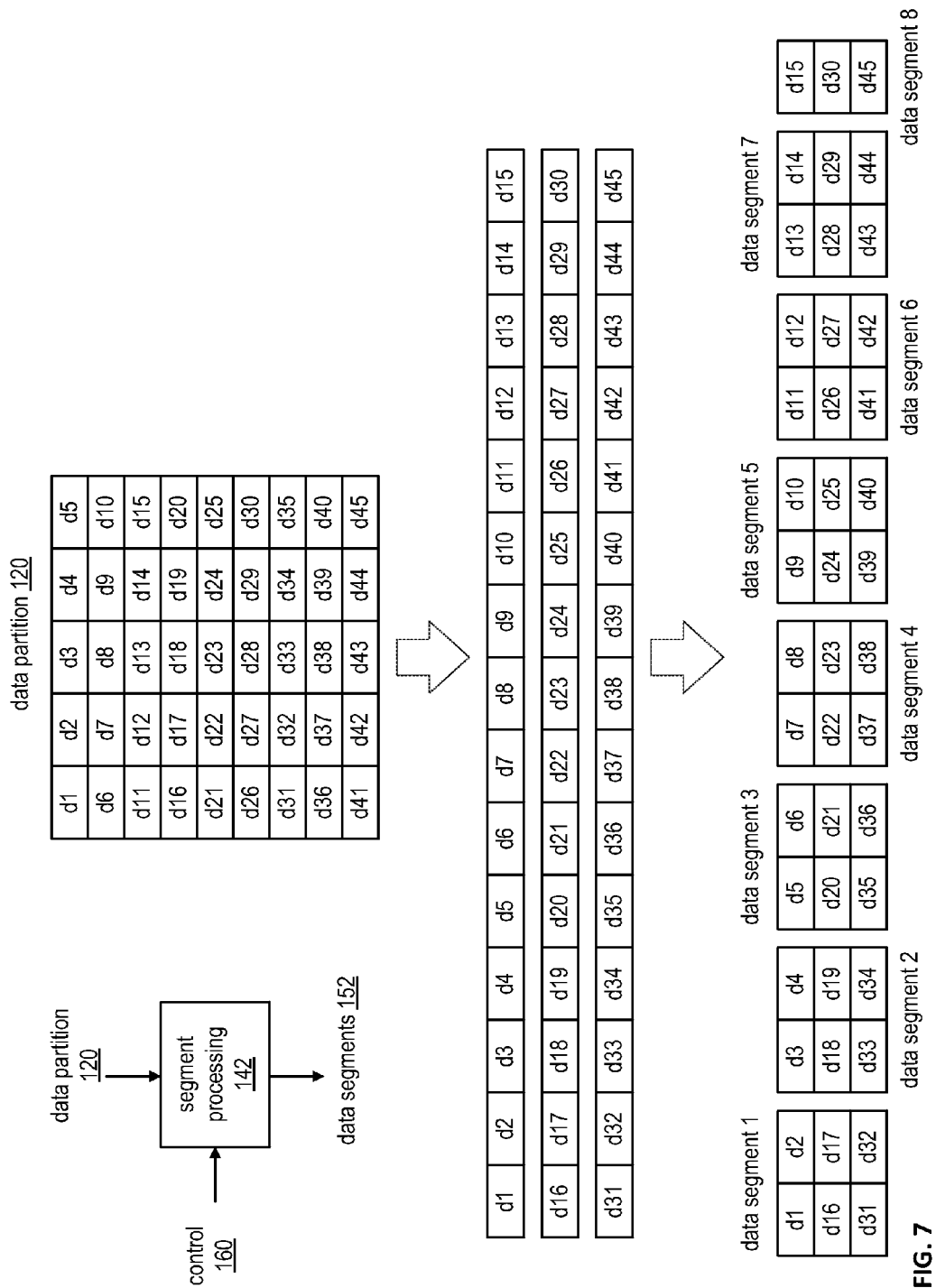
FIG. 7 is a diagram of an example of a segment processing of the dispersed error encoding in accordance with the present invention.

FIG. 7 is a diagram of an example of a segment processing of a dispersed storage (DS) error encoding module. In this example, a segment processing module 142 receives a data partition 120 that includes 45 data blocks (e.g., d1 -d45), receives segmenting information (i.e., control information 160) from a control module, and segments the data partition 120 in accordance with the control information 160 to produce data segments 152. Each data block may be of the same size as other data blocks or of a different size. In addition, the size of each data block may be a few bytes to megabytes of data. As previously mentioned, the segmenting information indicates how many rows to segment the data partition into, indicates how many columns to segment the data partition into, and indicates how many columns to include in a data segment.

In this example, the decode threshold of the error encoding scheme is three; as such the number of rows to divide the data partition into is three. The number of columns for each row is set to 15, which is based on the number and size of data blocks. The data blocks of the data partition are arranged in rows and columns in a sequential order (i.e., the first row includes the first 15 data blocks; the second row includes the second 15 data blocks; and the third row includes the last 15 data blocks).

With the data blocks arranged into the desired sequential order, they are divided into data segments based on the segmenting information. In this example, the data partition is divided into 8 data segments; the first 7 include 2 columns of three rows and the last includes 1 column of three rows. Note that the first row of the 8 data segments is in sequential order of the first 15 data blocks; the second row of the 8 data segments in sequential order of the second 15 data blocks; and the third row of the 8 data segments in sequential order of the last 15 data blocks. Note that the number of data blocks, the grouping of the data blocks into segments, and size of the data blocks may vary to accommodate the desired distributed task processing function.

Figure 8:
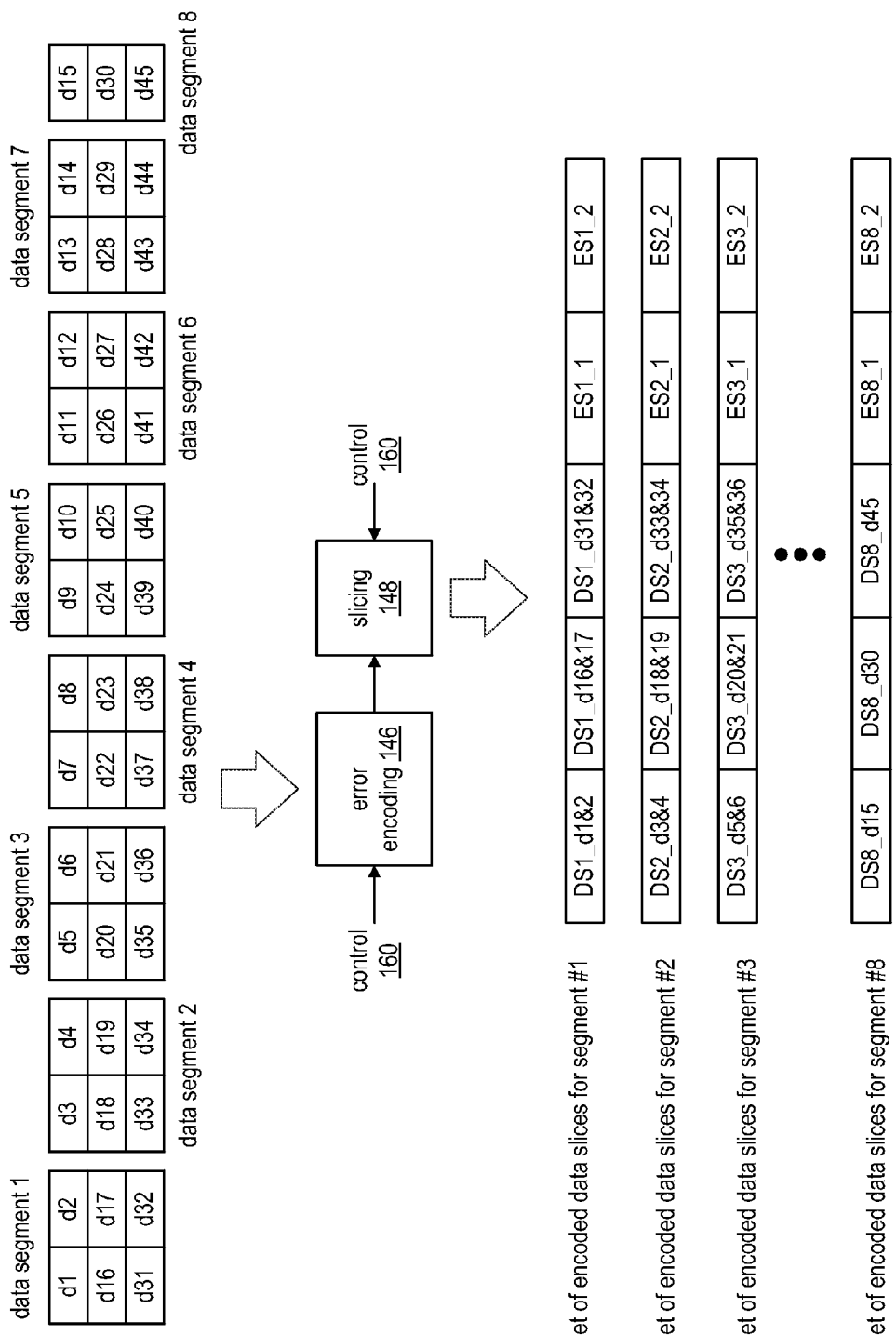
FIG. 8 is a diagram of an example of error encoding and slicing processing of the dispersed error encoding in accordance with the present invention.

FIG. 8 is a diagram of an example of error encoding and slicing processing of the dispersed error encoding processing the data segments of FIG. 7. In this example, data segment 1 includes 3 rows with each row being treated as one word for encoding. As such, data segment 1 includes three words for encoding: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

In operation, an error encoding module 146 and a slicing module 148 convert each data segment into a set of encoded data slices in accordance with error correction encoding parameters as control information 160. More specifically, when the error correction encoding parameters indicate a unity matrix Reed-Solomon based encoding algorithm, 5 pillars, and decode threshold of 3, the first three encoded data slices of the set of encoded data slices for a data segment are substantially similar to the corresponding word of the data segment. For instance, when the unity matrix Reed-Solomon based encoding algorithm is applied to data segment 1, the content of the first encoded data slice (DS1_d1 & 2) of the first set of encoded data slices (e.g., corresponding to data segment 1) is substantially similar to content of the first word (e.g., d1 & d); the content of the second encoded data slice (DS1_d16 & 17) of the first set of encoded data slices is substantially similar to content of the second word (e.g., d16 & d17); and the content of the third encoded data slice (DS1_d31 & 32) of the first set of encoded data slices is substantially similar to content of the third word (e.g., d31 & d32).

The content of the fourth and fifth encoded data slices (e.g., ES1_1 and ES1_2) of the first set of encoded data slices include error correction data based on the first-third words of the first data segment. With such an encoding and slicing scheme, retrieving any three of the five encoded data slices allows the data segment to be accurately reconstructed.

The encoding and slicing of data segments 2-7 yield sets of encoded data slices similar to the set of encoded data slices of data segment 1. For instance, the content of the first encoded data slice (DS2_d3&4) of the second set of encoded data slices (e.g., corresponding to data segment 2) is substantially similar to content of the first word (e.g., d3 & d4); the content of the second encoded data slice (DS2_d18 & 19) of the second set of encoded data slices is substantially similar to content of the second word (e.g., d18 & d19); and the content of the third encoded data slice (DS2_d33 & 34) of the second set of encoded data slices is substantially similar to content of the third word (e.g., d33 & d34). The content of the fourth and fifth encoded data slices (e.g., ES1_1 and ES1_2) of the second set of encoded data slices includes error correction data based on the first-third words of the second data segment.

Figure 9:
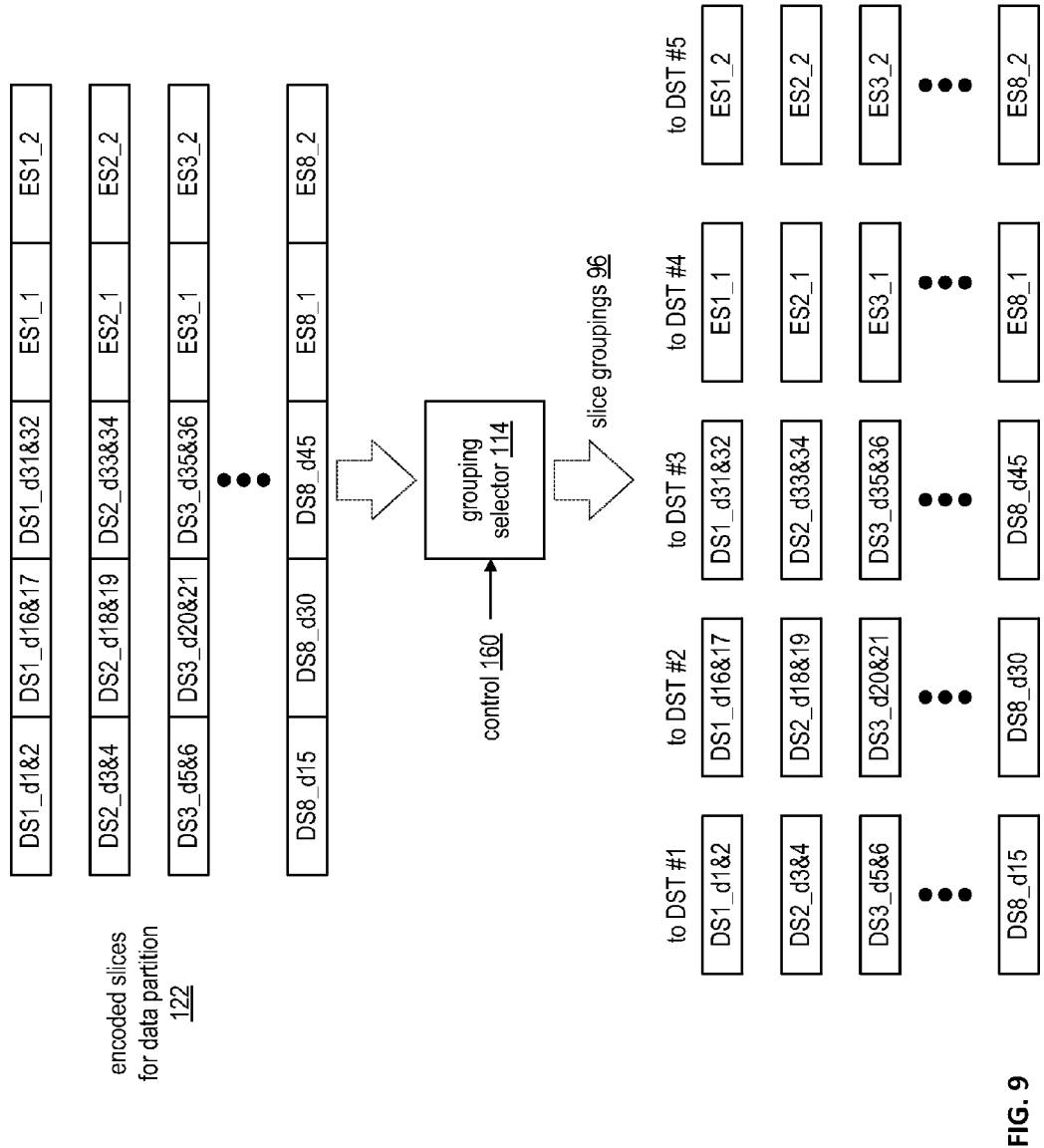
FIG. 9 is a diagram of an example of grouping selection processing of the outbound DST processing in accordance with the present invention.

FIG. 9 is a diagram of an example of grouping selection processing of an outbound distributed storage and task (DST) processing in accordance with grouping selector information as control information 160 from a control module. Encoded slices for data partition 122 are grouped in accordance with the control information 160 to produce slice groupings 96. In this example, a grouping selector module 114 organizes the encoded data slices into five slice groupings (e.g., one for each DST execution unit of a distributed storage and task network (DSTN) module). As a specific example, the grouping selector module 114 creates a first slice grouping for a DST execution unit #1, which includes first encoded slices of each of the sets of encoded slices. As such, the first DST execution unit receives encoded data slices corresponding to data blocks 1-15 (e.g., encoded data slices of contiguous data).

The grouping selector module 114 also creates a second slice grouping for a DST execution unit #2, which includes second encoded slices of each of the sets of encoded slices. As such, the second DST execution unit receives encoded data slices corresponding to data blocks 16-30. The grouping selector module 114 further creates a third slice grouping for DST execution unit #3, which includes third encoded slices of each of the sets of encoded slices. As such, the third DST execution unit receives encoded data slices corresponding to data blocks 31-45.

The grouping selector module 114 creates a fourth slice grouping for DST execution unit #4, which includes fourth encoded slices of each of the sets of encoded slices. As such, the fourth DST execution unit receives encoded data slices corresponding to first error encoding information (e.g., encoded data slices of error coding (EC) data). The grouping selector module 114 further creates a fifth slice grouping for DST execution unit #5, which includes fifth encoded slices of each of the sets of encoded slices. As such, the fifth DST execution unit receives encoded data slices corresponding to second error encoding information.

Figure 10:
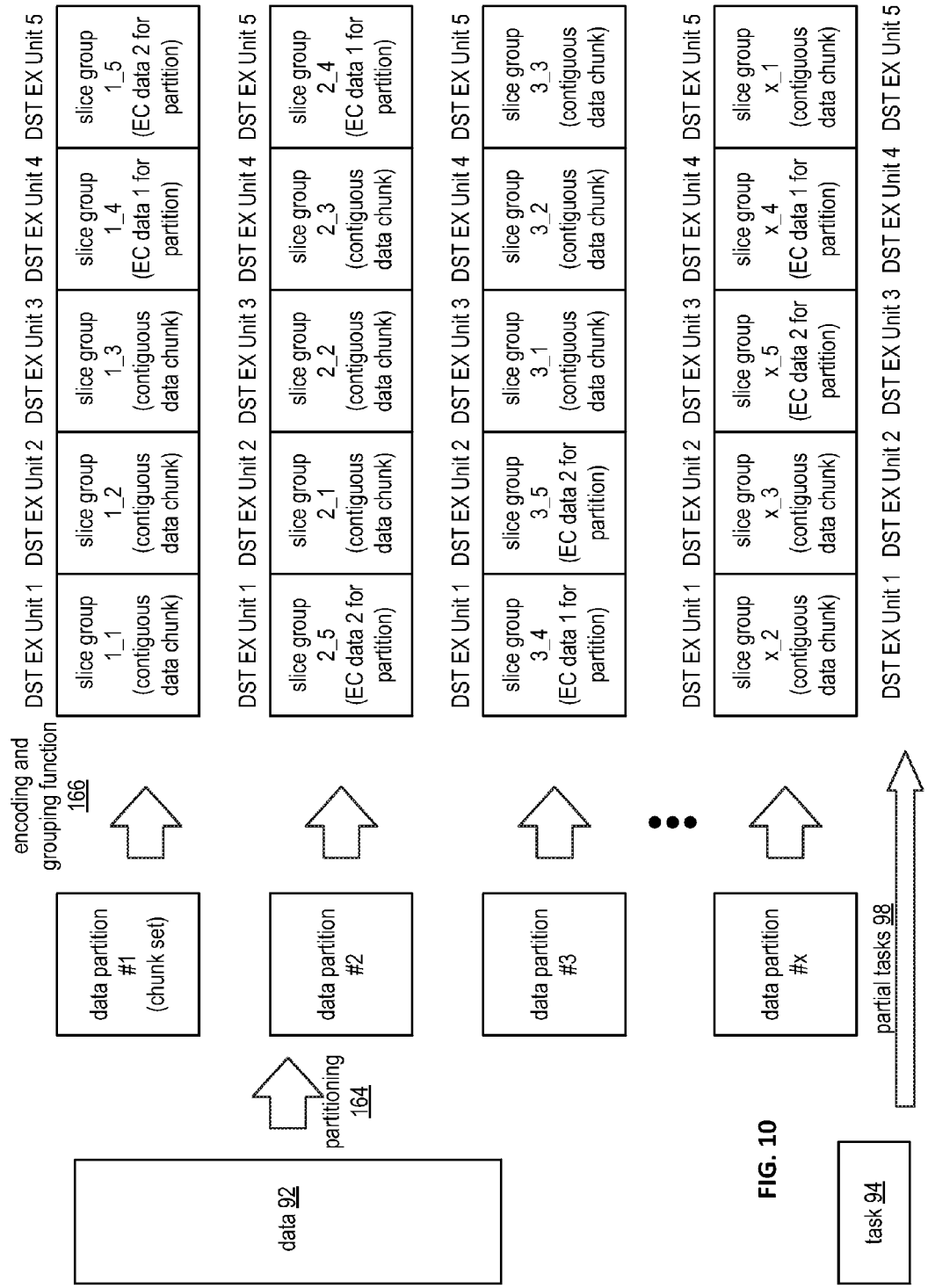
FIG. 10 is a diagram of an example of converting data into slice groups in accordance with the present invention.

FIG. 10 is a diagram of an example of converting data 92 into slice groups that expands on the preceding figures. As shown, the data 92 is partitioned in accordance with a partitioning function 164 into a plurality of data partitions (1-x, where x is an integer greater than 4). Each data partition (or chunkset of data) is encoded and grouped into slice groupings as previously discussed by an encoding and grouping function 166. For a given data partition, the slice groupings are sent to distributed storage and task (DST) execution units. From data partition to data partition, the ordering of the slice groupings to the DST execution units may vary.

For example, the slice groupings of data partition #1 is sent to the DST execution units such that the first DST execution receives first encoded data slices of each of the sets of encoded data slices, which corresponds to a first continuous data chunk of the first data partition (e.g., refer to FIG. 9), a second DST execution receives second encoded data slices of each of the sets of encoded data slices, which corresponds to a second continuous data chunk of the first data partition, etc.

For the second data partition, the slice groupings may be sent to the DST execution units in a different order than it was done for the first data partition. For instance, the first slice grouping of the second data partition (e.g., slice group 2_1) is sent to the second DST execution unit; the second slice grouping of the second data partition (e.g., slice group 2_2) is sent to the third DST execution unit; the third slice grouping of the second data partition (e.g., slice group 2_3) is sent to the fourth DST execution unit; the fourth slice grouping of the second data partition (e.g., slice group 2_4, which includes first error coding information) is sent to the fifth DST execution unit; and the fifth slice grouping of the second data partition (e.g., slice group 2_5, which includes second error coding information) is sent to the first DST execution unit.

The pattern of sending the slice groupings to the set of DST execution units may vary in a predicted pattern, a random pattern, and/or a combination thereof from data partition to data partition. In addition, from data partition to data partition, the set of DST execution units may change. For example, for the first data partition, DST execution units 1-5 may be used; for the second data partition, DST execution units 6-10 may be used; for the third data partition, DST execution units 3-7 may be used; etc. As is also shown, the task is divided into partial tasks that are sent to the DST execution units in conjunction with the slice groupings of the data partitions.

Figure 11:
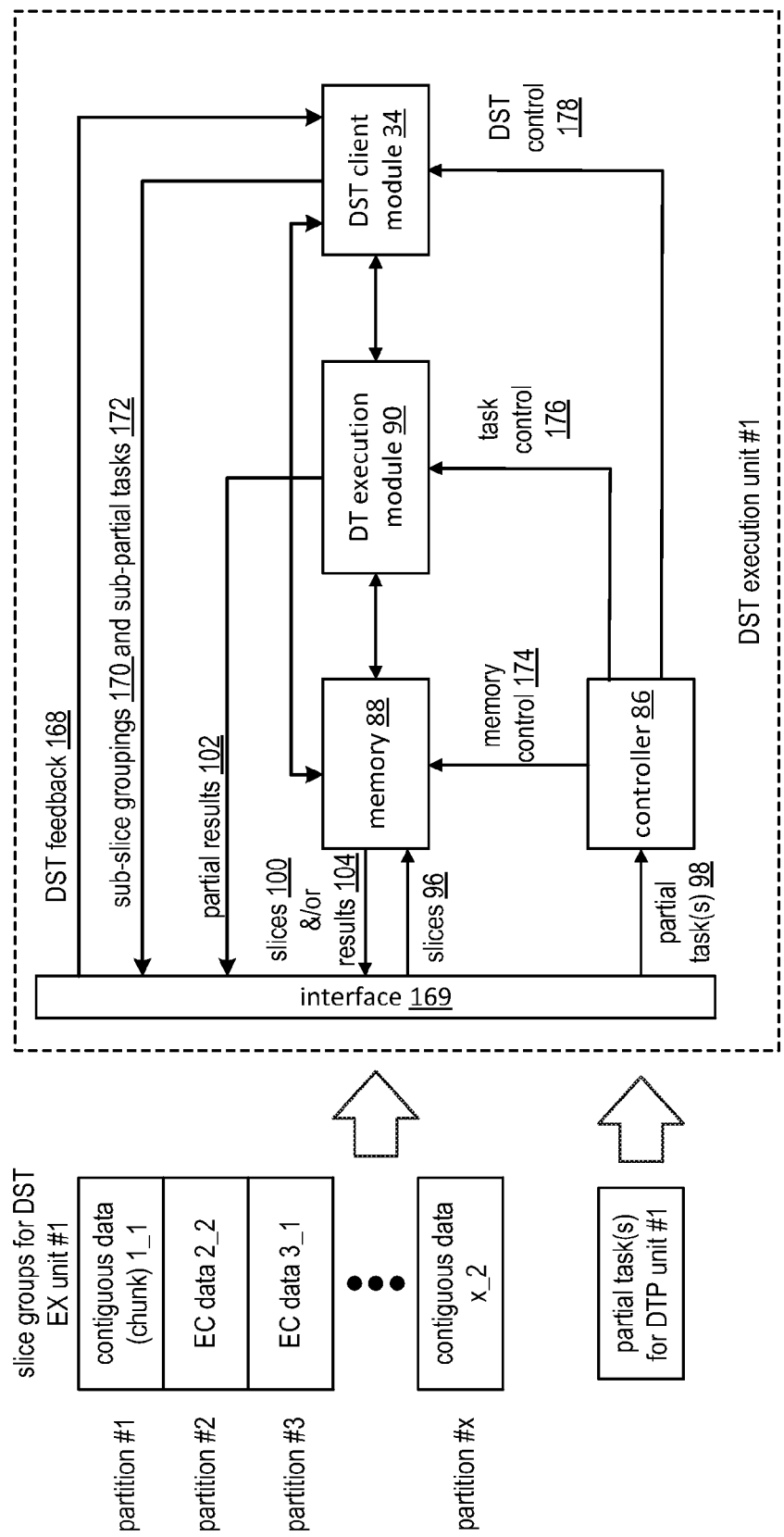
FIG. 11 is a schematic block diagram of an embodiment of a DST execution unit in accordance with the present invention.

FIG. 11 is a schematic block diagram of an embodiment of a DST (distributed storage and/or task) execution unit that includes an interface 169, a controller 86, memory 88, one or more DT (distributed task) execution modules 90, and a DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a slice group, the DST execution module receives a slice grouping 96 (e.g., slice group #1) via interface 169. The slice grouping 96 includes, per partition, encoded data slices of contiguous data or encoded data slices of error coding (EC) data. For slice group #1, the DST execution module receives encoded data slices of contiguous data for partitions #1 and #x (and potentially others between 3 and x) and receives encoded data slices of EC data for partitions #2 and #3 (and potentially others between 3 and x). Examples of encoded data slices of contiguous data and encoded data slices of error coding (EC) data are discussed with reference to FIG. 9. The memory 88 stores the encoded data slices of slice groupings 96 in accordance with memory control information 174 it receives from the controller 86.

The controller 86 (e.g., a processing module, a CPU, etc.) generates the memory control information 174 based on a partial task(s) 98 and distributed computing information (e.g., user information (e.g., user ID, distributed computing permissions, data access permission, etc.), vault information (e.g., virtual memory assigned to user, user group, temporary storage for task processing, etc.), task validation information, etc.). For example, the controller 86 interprets the partial task(s) 98 in light of the distributed computing information to determine whether a requestor is authorized to perform the task 98, is authorized to access the data, and/or is authorized to perform the task on this particular data. When the requestor is authorized, the controller 86 determines, based on the task 98 and/or another input, whether the encoded data slices of the slice grouping 96 are to be temporarily stored or permanently stored. Based on the foregoing, the controller 86 generates the memory control information 174 to write the encoded data slices of the slice grouping 96 into the memory 88 and to indicate whether the slice grouping 96 is permanently stored or temporarily stored.

With the slice grouping 96 stored in the memory 88, the controller 86 facilitates execution of the partial task(s) 98. In an example, the controller 86 interprets the partial task 98 in light of the capabilities of the DT execution module(s) 90. The capabilities include one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, etc. If the controller 86 determines that the DT execution module(s) 90 have sufficient capabilities, it generates task control information 176.

The task control information 176 may be a generic instruction (e.g., perform the task on the stored slice grouping) or a series of operational codes. In the former instance, the DT execution module 90 includes a co-processor function specifically configured (fixed or programmed) to perform the desired task 98. In the latter instance, the DT execution module 90 includes a general processor topology where the controller stores an algorithm corresponding to the particular task 98. In this instance, the controller 86 provides the operational codes (e.g., assembly language, source code of a programming language, object code, etc.) of the algorithm to the DT execution module 90 for execution.

Depending on the nature of the task 98, the DT execution module 90 may generate intermediate partial results 102 that are stored in the memory 88 or in a cache memory (not shown) within the DT execution module 90. In either case, when the DT execution module 90 completes execution of the partial task 98, it outputs one or more partial results 102. The partial results 102 may also be stored in memory 88.

If, when the controller 86 is interpreting whether capabilities of the DT execution module(s) 90 can support the partial task 98, the controller 86 determines that the DT execution module(s) 90 cannot adequately support the task 98 (e.g., does not have the right resources, does not have sufficient available resources, available resources would be too slow, etc.), it then determines whether the partial task 98 should be fully offloaded or partially offloaded.

If the controller 86 determines that the partial task 98 should be fully offloaded, it generates DST control information 178 and provides it to the DST client module 34. The DST control information 178 includes the partial task 98, memory storage information regarding the slice grouping 96, and distribution instructions. The distribution instructions instruct the DST client module 34 to divide the partial task 98 into sub-partial tasks 172, to divide the slice grouping 96 into sub-slice groupings 170, and identify other DST execution units. The DST client module 34 functions in a similar manner as the DST client module 34 of FIGS. 3-10 to produce the sub-partial tasks 172 and the sub-slice groupings 170 in accordance with the distribution instructions.

The DST client module 34 receives DST feedback 168 (e.g., sub-partial results), via the interface 169, from the DST execution units to which the task was offloaded. The DST client module 34 provides the sub-partial results to the DST execution unit, which processes the sub-partial results to produce the partial result(s) 102.

If the controller 86 determines that the partial task 98 should be partially offloaded, it determines what portion of the task 98 and/or slice grouping 96 should be processed locally and what should be offloaded. For the portion that is being locally processed, the controller 86 generates task control information 176 as previously discussed. For the portion that is being offloaded, the controller 86 generates DST control information 178 as previously discussed.

When the DST client module 34 receives DST feedback 168 (e.g., sub-partial results) from the DST executions units to which a portion of the task was offloaded, it provides the sub-partial results to the DT execution module 90. The DT execution module 90 processes the sub-partial results with the sub-partial results it created to produce the partial result(s) 102.

The memory 88 may be further utilized to retrieve one or more of stored slices 100, stored results 104, partial results 102 when the DT execution module 90 stores partial results 102 and/or results 104 in the memory 88. For example, when the partial task 98 includes a retrieval request, the controller 86 outputs the memory control 174 to the memory 88 to facilitate retrieval of slices 100 and/or results 104.

Figure 12:
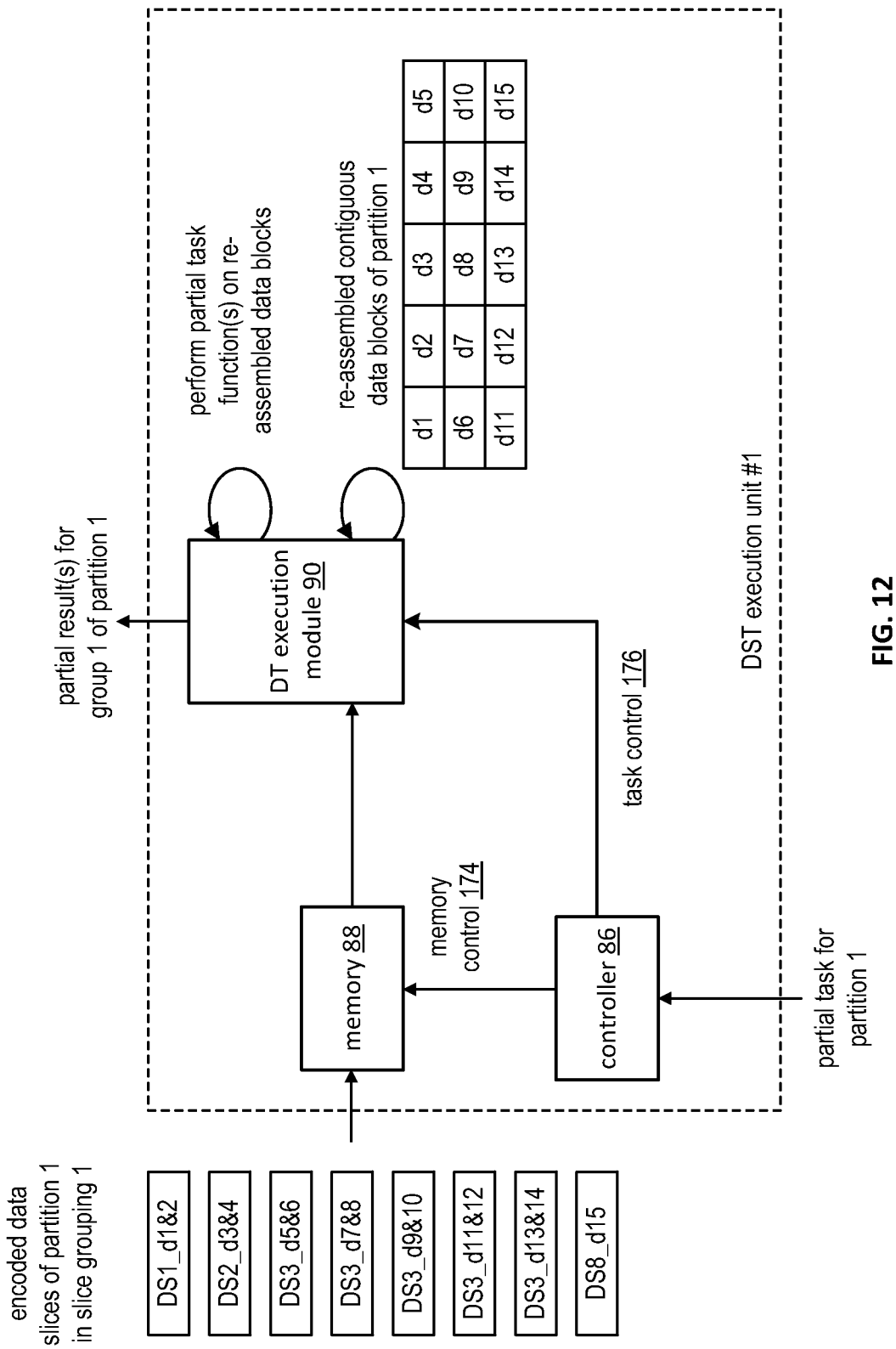
FIG. 12 is a schematic block diagram of an example of operation of a DST execution unit in accordance with the present invention.

FIG. 12 is a schematic block diagram of an example of operation of a distributed storage and task (DST) execution unit storing encoded data slices and executing a task thereon. To store the encoded data slices of a partition 1 of slice grouping 1, a controller 86 generates write commands as memory control information 174 such that the encoded slices are stored in desired locations (e.g., permanent or temporary) within memory 88.

Once the encoded slices are stored, the controller 86 provides task control information 176 to a distributed task (DT) execution module 90. As a first step of executing the task in accordance with the task control information 176, the DT execution module 90 retrieves the encoded slices from memory 88. The DT execution module 90 then reconstructs contiguous data blocks of a data partition. As shown for this example, reconstructed contiguous data blocks of data partition 1 include data blocks 1-15 (e.g., d1-d15).

With the contiguous data blocks reconstructed, the DT execution module 90 performs the task on the reconstructed contiguous data blocks. For example, the task may be to search the reconstructed contiguous data blocks for a particular word or phrase, identify where in the reconstructed contiguous data blocks the particular word or phrase occurred, and/or count the occurrences of the particular word or phrase on the reconstructed contiguous data blocks. The DST execution unit continues in a similar manner for the encoded data slices of other partitions in slice grouping 1. Note that with using the unity matrix error encoding scheme previously discussed, if the encoded data slices of contiguous data are uncorrupted, the decoding of them is a relatively straightforward process of extracting the data.

If, however, an encoded data slice of contiguous data is corrupted (or missing), it can be rebuilt by accessing other DST execution units that are storing the other encoded data slices of the set of encoded data slices of the corrupted encoded data slice. In this instance, the DST execution unit having the corrupted encoded data slices retrieves at least three encoded data slices (of contiguous data and of error coding data) in the set from the other DST execution units (recall for this example, the pillar width is 5 and the decode threshold is 3). The DST execution unit decodes the retrieved data slices using the DS error encoding parameters to recapture the corresponding data segment. The DST execution unit then re-encodes the data segment using the DS error encoding parameters to rebuild the corrupted encoded data slice. Once the encoded data slice is rebuilt, the DST execution unit functions as previously described.

Figure 13:
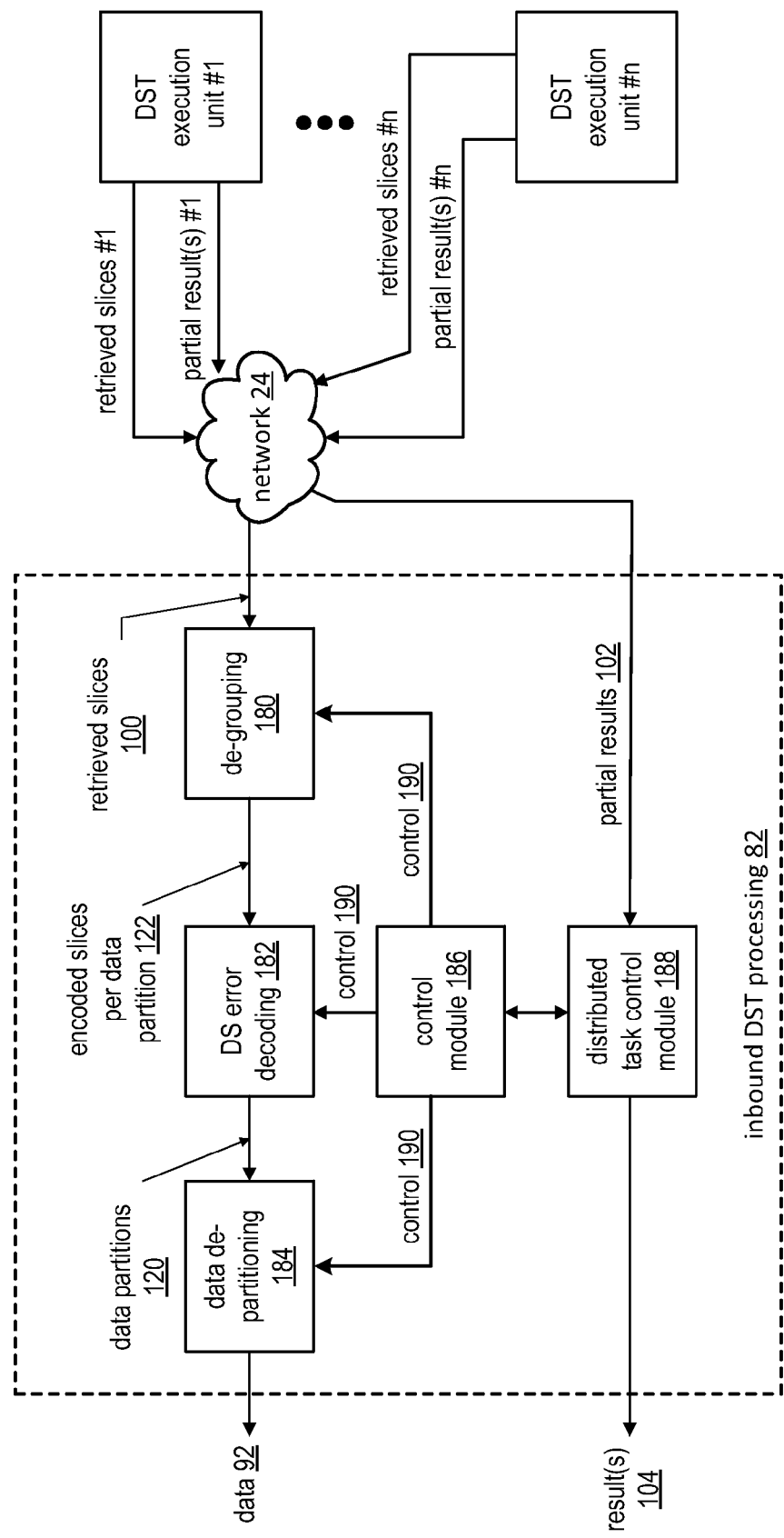
FIG. 13 is a schematic block diagram of an embodiment of an inbound distributed storage and/or task (DST) processing in accordance with the present invention.

FIG. 13 is a schematic block diagram of an embodiment of an inbound distributed storage and/or task (DST) processing section 82 of a DST client module coupled to DST execution units of a distributed storage and task network (DSTN) module via a network 24. The inbound DST processing section 82 includes a de-grouping module 180, a DS (dispersed storage) error decoding module 182, a data de-partitioning module 184, a control module 186, and a distributed task control module 188. Note that the control module 186 and/or the distributed task control module 188 may be separate modules from corresponding ones of outbound DST processing section or may be the same modules.

In an example of operation, the DST execution units have completed execution of corresponding partial tasks on the corresponding slice groupings to produce partial results 102. The inbound DST processing section 82 receives the partial results 102 via the distributed task control module 188. The inbound DST processing section 82 then processes the partial results 102 to produce a final result, or results 104. For example, if the task was to find a specific word or phrase within data, the partial results 102 indicate where in each of the prescribed portions of the data the corresponding DST execution units found the specific word or phrase. The distributed task control module 188 combines the individual partial results 102 for the corresponding portions of the data into a final result 104 for the data as a whole.

In another example of operation, the inbound DST processing section 82 is retrieving stored data from the DST execution units (i.e., the DSTN module). In this example, the DST execution units output encoded data slices 100 corresponding to the data retrieval requests. The de-grouping module 180 receives retrieved slices 100 and de-groups them to produce encoded data slices per data partition 122. The DS error decoding module 182 decodes, in accordance with DS error encoding parameters, the encoded data slices per data partition 122 to produce data partitions 120.

The data de-partitioning module 184 combines the data partitions 120 into the data 92. The control module 186 controls the conversion of retrieved slices 100 into the data 92 using control signals 190 to each of the modules. For instance, the control module 186 provides de-grouping information to the de-grouping module 180, provides the DS error encoding parameters to the DS error decoding module 182, and provides de-partitioning information to the data de-partitioning module 184.

Figure 14:
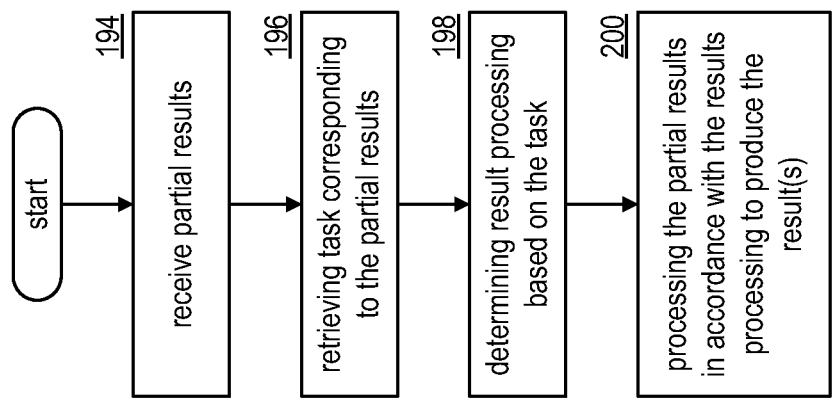
FIG. 14 is a logic diagram of an example of a method for inbound DST processing in accordance with the present invention.

FIG. 14 is a logic diagram of an example of a method that is executable by distributed storage and task (DST) client module regarding inbound DST processing. The method begins at step 194 where the DST client module receives partial results. The method continues at step 196 where the DST client module retrieves the task corresponding to the partial results. For example, the partial results include header information that identifies the requesting entity, which correlates to the requested task.

The method continues at step 198 where the DST client module determines result processing information based on the task. For example, if the task were to identify a particular word or phrase within the data, the result processing information would indicate to aggregate the partial results for the corresponding portions of the data to produce the final result. As another example, if the task were to count the occurrences of a particular word or phrase within the data, results of processing the information would indicate to add the partial results to produce the final results. The method continues at step 200 where the DST client module processes the partial results in accordance with the result processing information to produce the final result or results.

Figure 15:
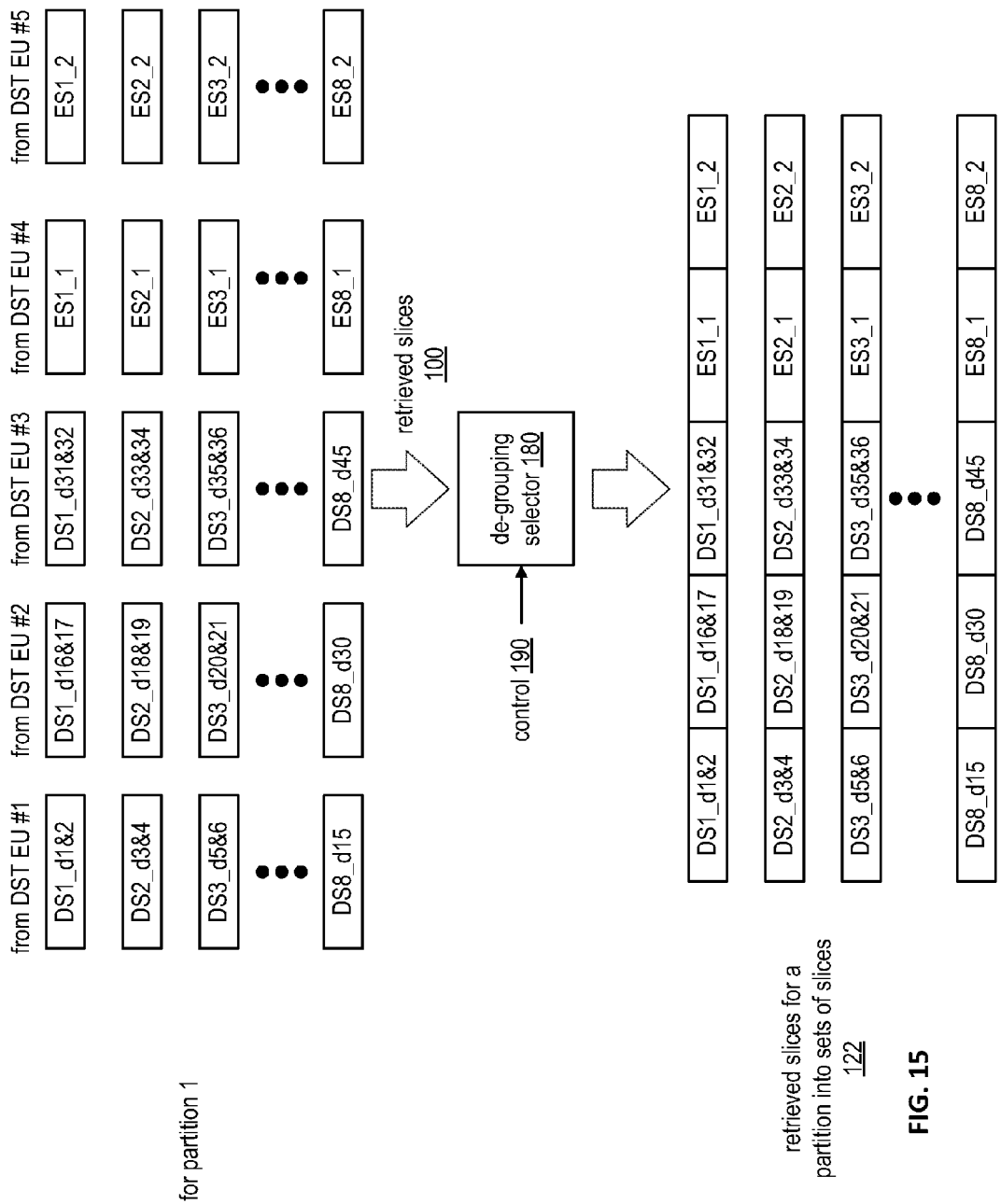
FIG. 15 is a diagram of an example of de-grouping selection processing of the inbound DST processing in accordance with the present invention.

FIG. 15 is a diagram of an example of de-grouping selection processing of an inbound distributed storage and task (DST) processing section of a DST client module. In general, this is an inverse process of the grouping module of the outbound DST processing section of FIG. 9. Accordingly, for each data partition (e.g., partition #1), the de-grouping module retrieves the corresponding slice grouping from the DST execution units (EU) (e.g., DST 1-5).

As shown, DST execution unit #1 provides a first slice grouping, which includes the first encoded slices of each of the sets of encoded slices (e.g., encoded data slices of contiguous data of data blocks 1-15); DST execution unit #2 provides a second slice grouping, which includes the second encoded slices of each of the sets of encoded slices (e.g., encoded data slices of contiguous data of data blocks 16-30); DST execution unit #3 provides a third slice grouping, which includes the third encoded slices of each of the sets of encoded slices (e.g., encoded data slices of contiguous data of data blocks 31-45); DST execution unit #4 provides a fourth slice grouping, which includes the fourth encoded slices of each of the sets of encoded slices (e.g., first encoded data slices of error coding (EC) data); and DST execution unit #5 provides a fifth slice grouping, which includes the fifth encoded slices of each of the sets of encoded slices (e.g., first encoded data slices of error coding (EC) data).

The de-grouping module de-groups the slice groupings (e.g., received slices 100) using a de-grouping selector 180 controlled by a control signal 190 as shown in the example to produce a plurality of sets of encoded data slices (e.g., retrieved slices for a partition into sets of slices 122). Each set corresponding to a data segment of the data partition.

Figure 16:
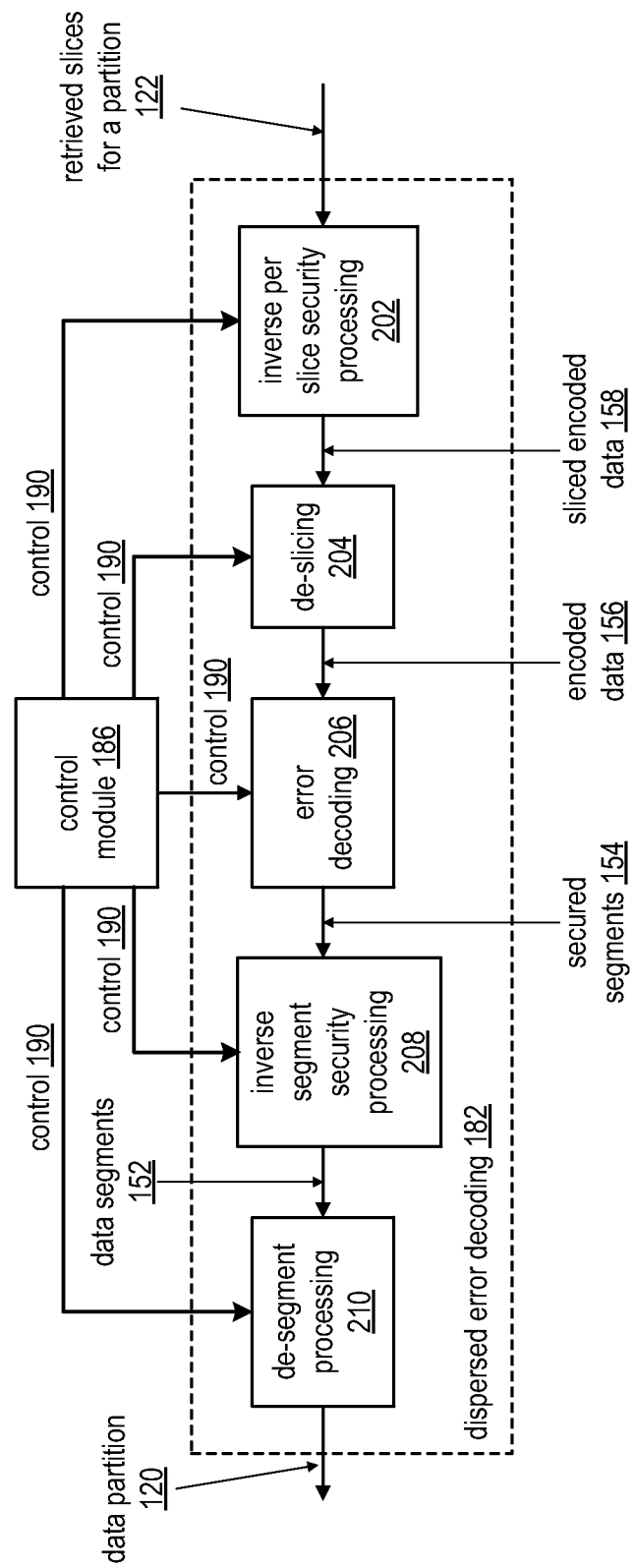
FIG. 16 is a schematic block diagram of an embodiment of a dispersed error decoding in accordance with the present invention.

FIG. 16 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, a de-segmenting processing module 210, and a control module 186.

In an example of operation, the inverse per slice security processing module 202, when enabled by the control module 186, unsecures each encoded data slice 122 based on slice de-security information received as control information 190 (e.g., the compliment of the slice security information discussed with reference to FIG. 6) received from the control module 186. The slice security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 122, it decrypts each verified encoded data slice, and decompresses each decrypted encoded data slice to produce sliced encoded data 158. When the inverse per slice security processing module 202 is not enabled, it passes the encoded data slices 122 as the sliced encoded data 158 or is bypassed such that the retrieved encoded data slices 122 are provided as the sliced encoded data 158.

The de-slicing module 204 de-slices the sliced encoded data 158 into encoded data segments 156 in accordance with a pillar width of the error correction encoding parameters received as control information 190 from the control module 186. For example, if the pillar width is five, the de-slicing module 204 de-slices a set of five encoded data slices into an encoded data segment 156. The error decoding module 206 decodes the encoded data segments 156 in accordance with error correction decoding parameters received as control information 190 from the control module 186 to produce secure data segments 154. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments 154 based on segment security information received as control information 190 from the control module 186. The segment security information includes data decompression, decryption, de-watermarking, integrity check (e.g., CRC, etc.) verification, and/or any other type of digital security. For example, when the inverse segment security processing module 208 is enabled, it verifies integrity information (e.g., a CRC value) of each secure data segment 154, it decrypts each verified secured data segment, and decompresses each decrypted secure data segment to produce a data segment 152. When the inverse segment security processing module 208 is not enabled, it passes the decoded data segment 154 as the data segment 152 or is bypassed.

The de-segment processing module 210 receives the data segments 152 and receives de-segmenting information as control information 190 from the control module 186. The de-segmenting information indicates how the de-segment processing module 210 is to de-segment the data segments 152 into a data partition 120. For example, the de-segmenting information indicates how the rows and columns of data segments are to be rearranged to yield the data partition 120.

Figure 17:
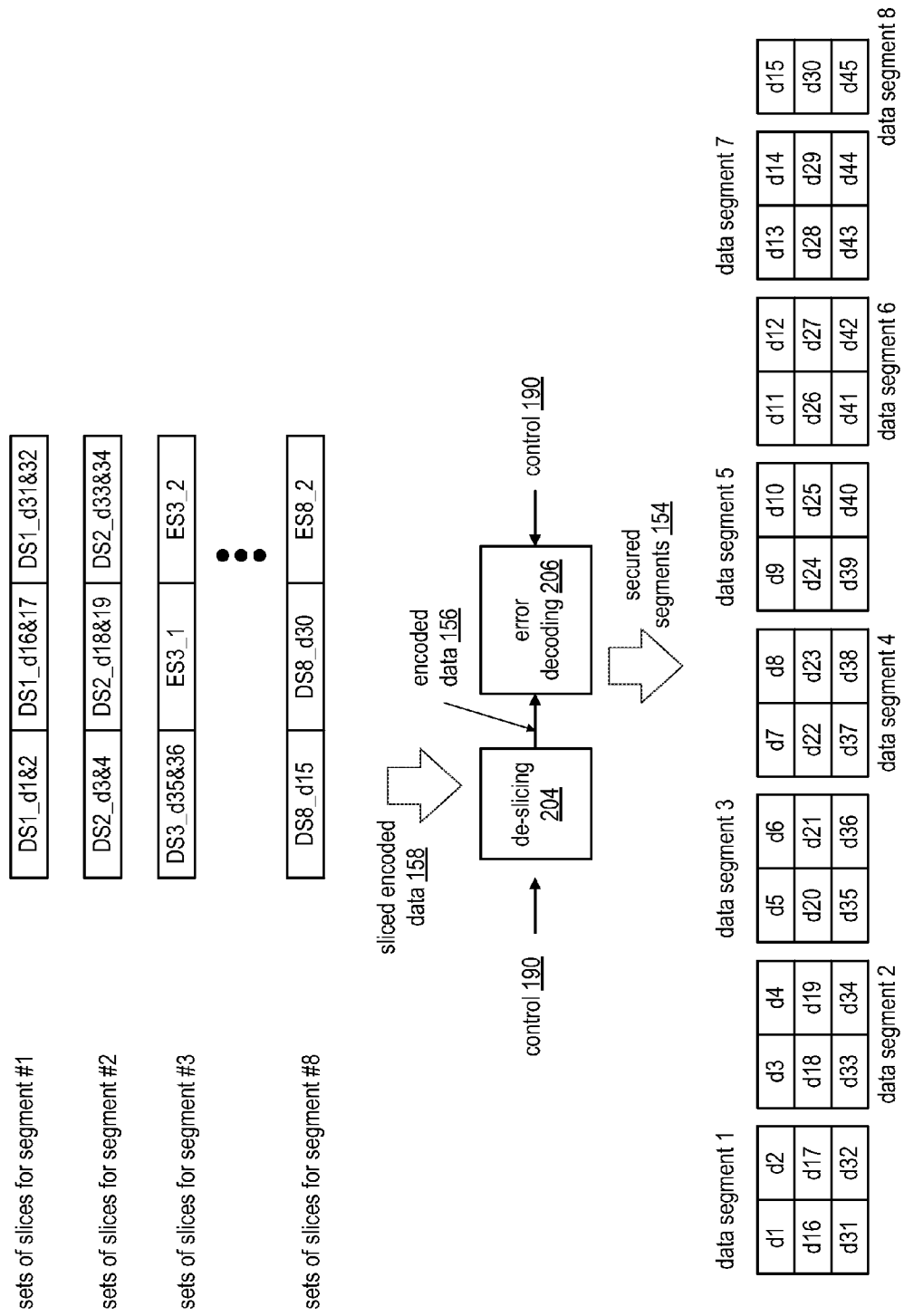
FIG. 17 is a diagram of an example of de-slicing and error decoding processing of the dispersed error decoding in accordance with the present invention.

FIG. 17 is a diagram of an example of de-slicing and error decoding processing of a dispersed error decoding module. A de-slicing module 204 receives at least a decode threshold number of encoded data slices 158 for each data segment in accordance with control information 190 and provides encoded data 156. In this example, a decode threshold is three. As such, each set of encoded data slices 158 is shown to have three encoded data slices per data segment. The de-slicing module 204 may receive three encoded data slices per data segment because an associated distributed storage and task (DST) client module requested retrieving only three encoded data slices per segment or selected three of the retrieved encoded data slices per data segment. As shown, which is based on the unity matrix encoding previously discussed with reference to FIG. 8, an encoded data slice may be a data-based encoded data slice (e.g., DS1_d1 &d2) or an error code based encoded data slice (e.g., ES3_1).

An error decoding module 206 decodes the encoded data 156 of each data segment in accordance with the error correction decoding parameters of control information 190 to produce secured segments 154. In this example, data segment 1 includes 3 rows with each row being treated as one word for encoding. As such, data segment 1 includes three words: word 1 including data blocks d1 and d2, word 2 including data blocks d16 and d17, and word 3 including data blocks d31 and d32. Each of data segments 2-7 includes three words where each word includes two data blocks. Data segment 8 includes three words where each word includes a single data block (e.g., d15, d30, and d45).

Figure 18:
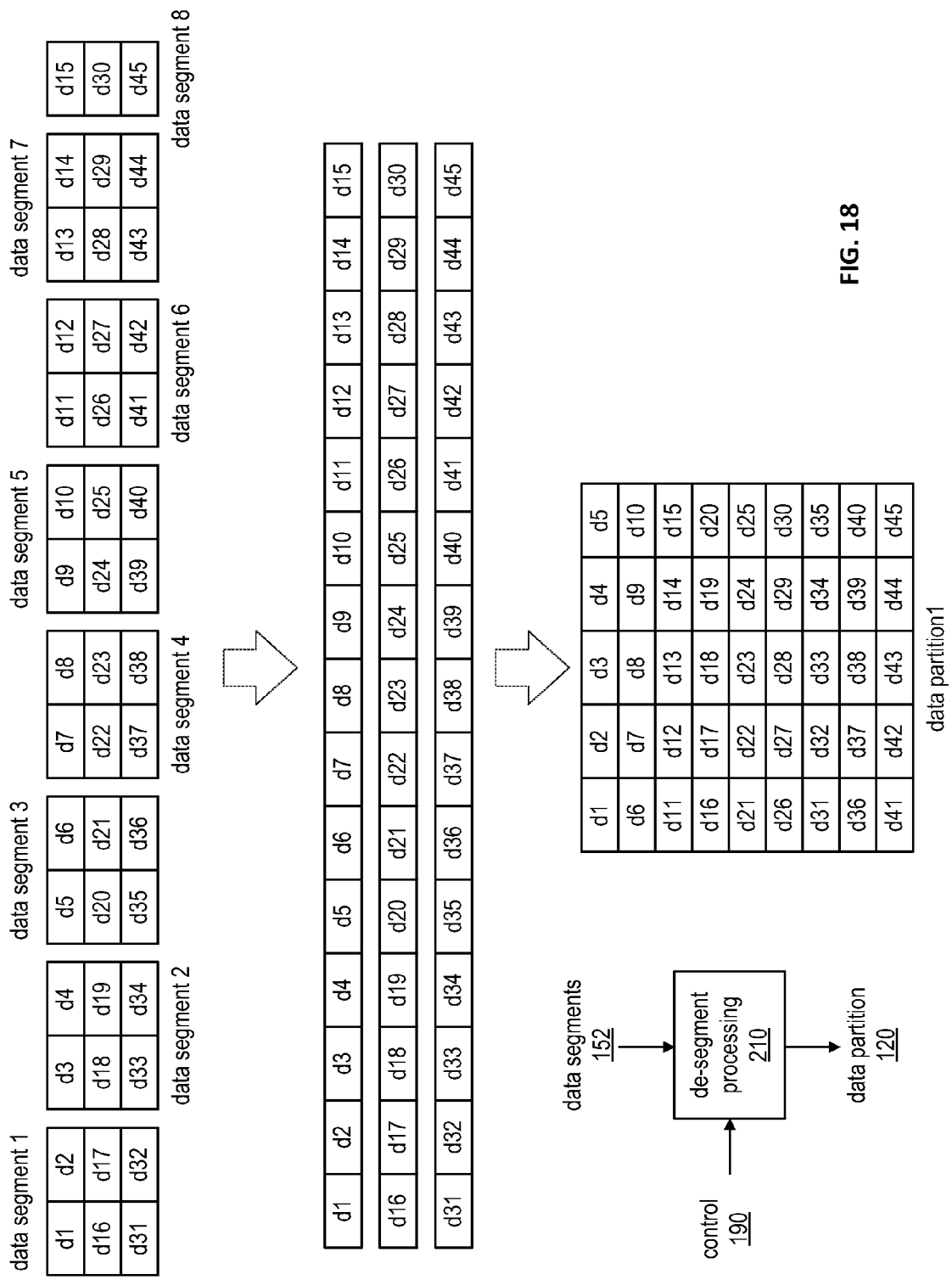
FIG. 18 is a diagram of an example of a de-segment processing of the dispersed error decoding in accordance with the present invention.

FIG. 18 is a diagram of an example of a de-segment processing of an inbound distributed storage and task (DST) processing. In this example, a de-segment processing module 210 receives data segments 152 (e.g., 1-8) and rearranges the data blocks of the data segments into rows and columns in accordance with de-segmenting information of control information 190 to produce a data partition 120. Note that the number of rows is based on the decode threshold (e.g., 3 in this specific example) and the number of columns is based on the number and size of the data blocks.

The de-segmenting module 210 converts the rows and columns of data blocks into the data partition 120. Note that each data block may be of the same size as other data blocks or of a different size. In addition, the size of each data block may be a few bytes to megabytes of data.

Figure 19:
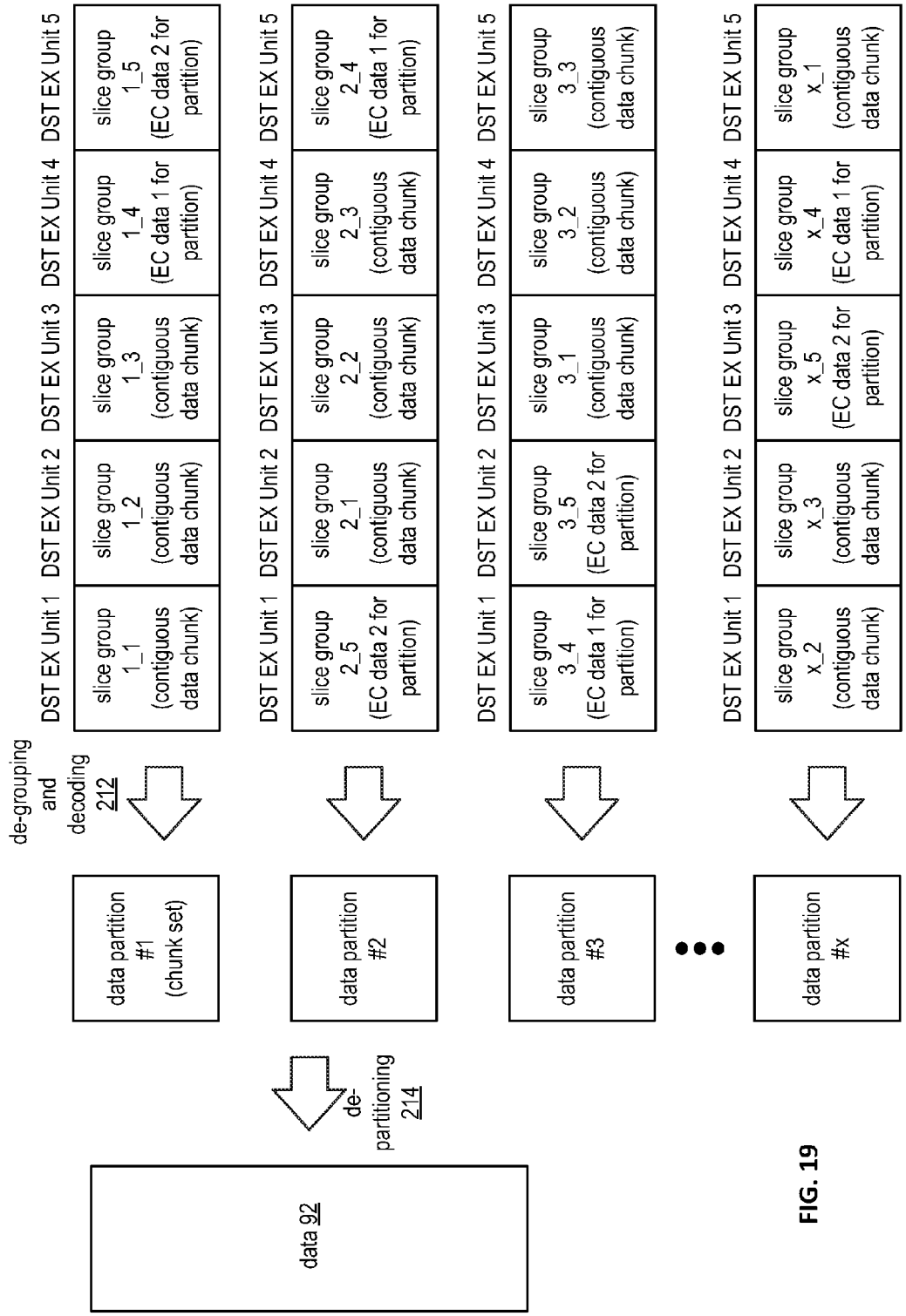
FIG. 19 is a diagram of an example of converting slice groups into data in accordance with the present invention.

FIG. 19 is a diagram of an example of converting slice groups into data 92 within an inbound distributed storage and task (DST) processing section. As shown, the data 92 is reconstructed from a plurality of data partitions (1-x, where x is an integer greater than 4). Each data partition (or chunk set of data) is decoded and re-grouped using a de-grouping and decoding function 212 and a de-partition function 214 from slice groupings as previously discussed. For a given data partition, the slice groupings (e.g., at least a decode threshold per data segment of encoded data slices) are received from DST execution units. From data partition to data partition, the ordering of the slice groupings received from the DST execution units may vary as discussed with reference to FIG. 10.

Figure 20:
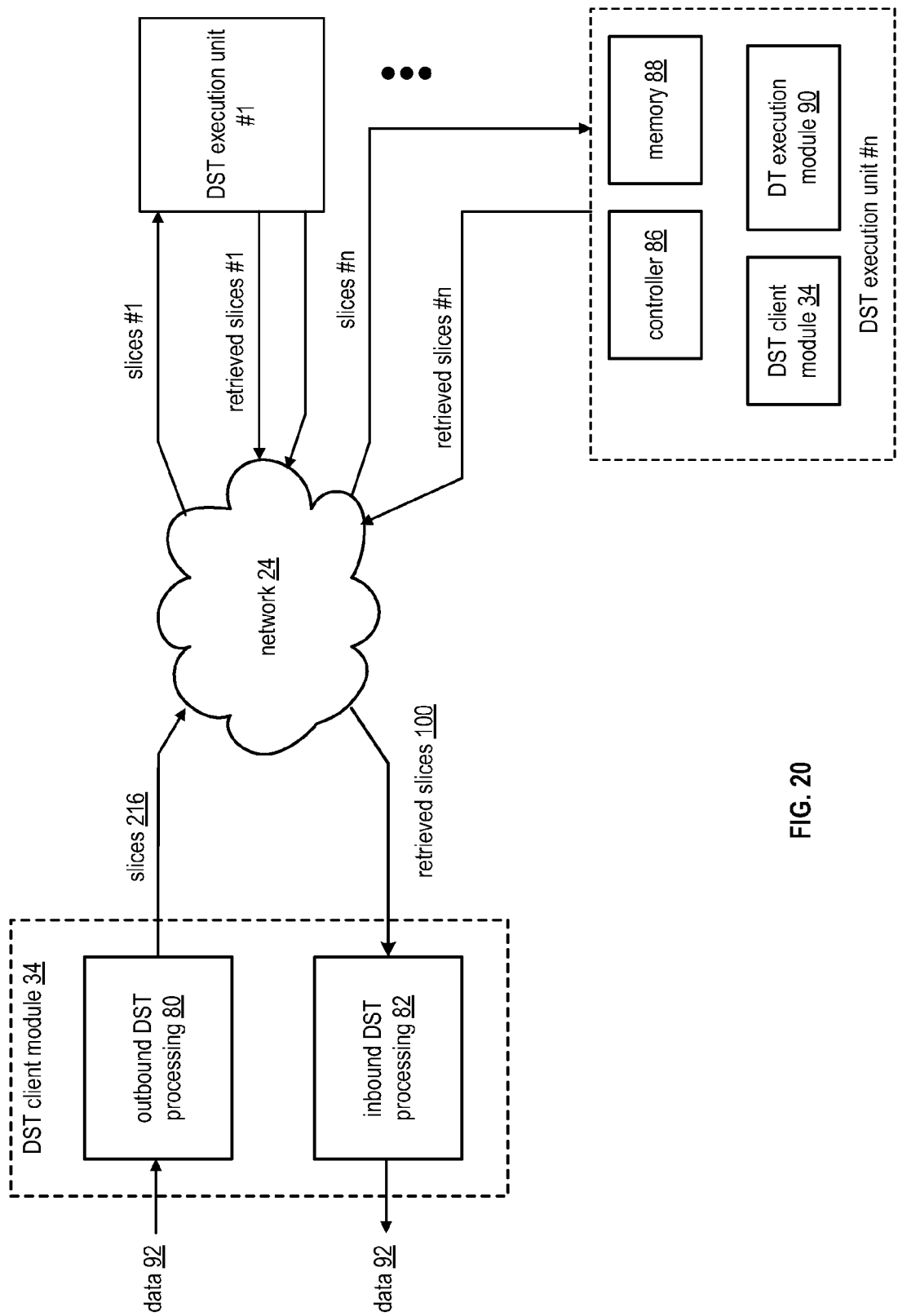
FIG. 20 is a diagram of an example of a distributed storage within the distributed computing system in accordance with the present invention.

FIG. 20 is a diagram of an example of a distributed storage and/or retrieval within the distributed computing system. The distributed computing system includes a plurality of distributed storage and/or task (DST) processing client modules 34 (one shown) coupled to a distributed storage and/or task processing network (DSTN) module, or multiple DSTN modules, via a network 24. The DST client module 34 includes an outbound DST processing section 80 and an inbound DST processing section 82. The DSTN module includes a plurality of DST execution units. Each DST execution unit includes a controller 86, memory 88, one or more distributed task (DT) execution modules 90, and a DST client module 34.

In an example of data storage, the DST client module 34 has data 92 that it desires to store in the DSTN module. The data 92 may be a file (e.g., video, audio, text, graphics, etc.), a data object, a data block, an update to a file, an update to a data block, etc. In this instance, the outbound DST processing module 80 converts the data 92 into encoded data slices 216 as will be further described with reference to FIGS. 21-23. The outbound DST processing module 80 sends, via the network 24, to the DST execution units for storage as further described with reference to FIG. 24.

In an example of data retrieval, the DST client module 34 issues a retrieve request to the DST execution units for the desired data 92. The retrieve request may address each DST executions units storing encoded data slices of the desired data, address a decode threshold number of DST execution units, address a read threshold number of DST execution units, or address some other number of DST execution units. In response to the request, each addressed DST execution unit retrieves its encoded data slices 100 of the desired data and sends them to the inbound DST processing section 82, via the network 24.

When, for each data segment, the inbound DST processing section 82 receives at least a decode threshold number of encoded data slices 100, it converts the encoded data slices 100 into a data segment. The inbound DST processing section 82 aggregates the data segments to produce the retrieved data 92.

Figure 21:
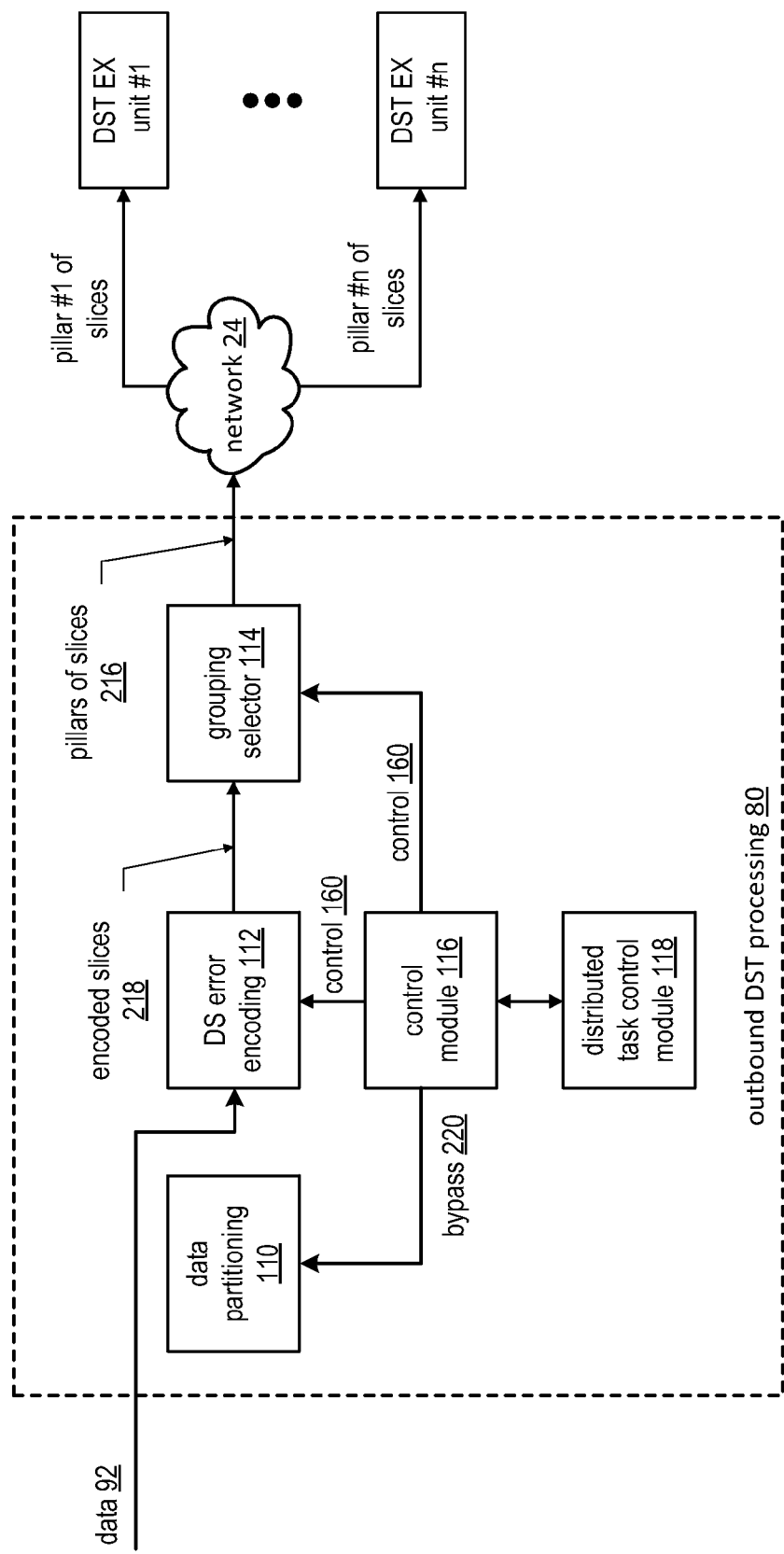
FIG. 21 is a schematic block diagram of an example of operation of outbound distributed storage and/or task (DST) processing for storing data in accordance with the present invention.

FIG. 21 is a schematic block diagram of an embodiment of an outbound distributed storage and/or task (DST) processing section 80 of a DST client module coupled to a distributed storage and task network (DSTN) module (e.g., a plurality of DST execution units) via a network 24. The outbound DST processing section 80 includes a data partitioning module 110, a dispersed storage (DS) error encoding module 112, a grouping selector module 114, a control module 116, and a distributed task control module 118.

In an example of operation, the data partitioning module 110 is by-passed such that data 92 is provided directly to the DS error encoding module 112. The control module 116 coordinates the by-passing of the data partitioning module 110 by outputting a bypass 220 message to the data partitioning module 110.

The DS error encoding module 112 receives the data 92 in a serial manner, a parallel manner, and/or a combination thereof. The DS error encoding module 112 DS error encodes the data in accordance with control information 160 from the control module 116 to produce encoded data slices 218. The DS error encoding includes segmenting the data 92 into data segments, segment security processing (e.g., encryption, compression, watermarking, integrity check (e.g., CRC, etc.)), error encoding, slicing, and/or per slice security processing (e.g., encryption, compression, watermarking, integrity check (e.g., CRC, etc.)). The control information 160 indicates which steps of the DS error encoding are active for the data 92 and, for active steps, indicates the parameters for the step. For example, the control information 160 indicates that the error encoding is active and includes error encoding parameters (e.g., pillar width, decode threshold, write threshold, read threshold, type of error encoding, etc.).

The grouping selector module 114 groups the encoded slices 218 of the data segments into pillars of slices 216. The number of pillars corresponds to the pillar width of the DS error encoding parameters. In this example, the distributed task control module 118 facilitates the storage request.

Figure 22:
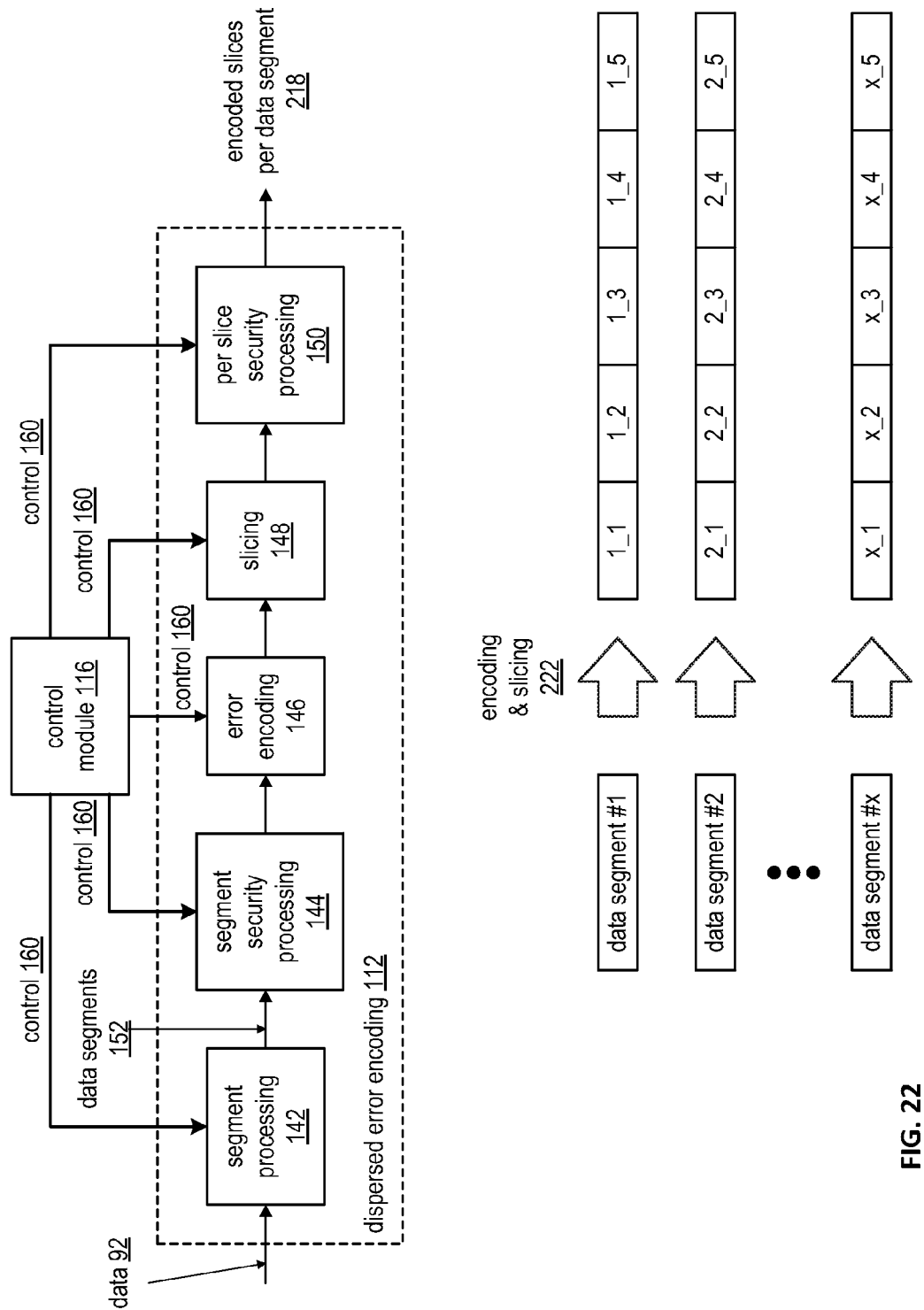
FIG. 22 is a schematic block diagram of an example of a dispersed error encoding for the example of FIG. 21 in accordance with the present invention.

FIG. 22 is a schematic block diagram of an example of a dispersed storage (DS) error encoding module 112 for the example of FIG. 21. The DS error encoding module 112 includes a segment processing module 142, a segment security processing module 144, an error encoding module 146, a slicing module 148, and a per slice security processing module 150. Each of these modules is coupled to a control module 116 to receive control information 160 therefrom.

In an example of operation, the segment processing module 142 receives data 92 and receives segmenting information as control information 160 from the control module 116. The segmenting information indicates how the segment processing module is to segment the data. For example, the segmenting information indicates the size of each data segment. The segment processing module 142 segments the data 92 into data segments 152 in accordance with the segmenting information.

The segment security processing module 144, when enabled by the control module 116, secures the data segments 152 based on segment security information received as control information 160 from the control module 116. The segment security information includes data compression, encryption, watermarking, integrity check (e.g., CRC, etc.), and/or any other type of digital security. For example, when the segment security processing module 144 is enabled, it compresses a data segment 152, encrypts the compressed data segment, and generates a CRC value for the encrypted data segment to produce a secure data segment. When the segment security processing module 144 is not enabled, it passes the data segments 152 to the error encoding module 146 or is bypassed such that the data segments 152 are provided to the error encoding module 146.

The error encoding module 146 encodes the secure data segments in accordance with error correction encoding parameters received as control information 160 from the control module 116. The error correction encoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction encoding parameters identify a specific error correction encoding scheme, specifies a pillar width of five, and specifies a decode threshold of three. From these parameters, the error encoding module 146 encodes a data segment to produce an encoded data segment.

The slicing module 148 slices the encoded data segment in accordance with a pillar width of the error correction encoding parameters. For example, if the pillar width is five, the slicing module slices an encoded data segment into a set of five encoded data slices. As such, for a plurality of data segments, the slicing module 148 outputs a plurality of sets of encoded data slices as shown within encoding and slicing function 222 as described.

The per slice security processing module 150, when enabled by the control module 116, secures each encoded data slice based on slice security information received as control information 160 from the control module 116. The slice security information includes data compression, encryption, watermarking, integrity check (e.g., CRC, etc.), and/or any other type of digital security. For example, when the per slice security processing module 150 is enabled, it may compress an encoded data slice, encrypt the compressed encoded data slice, and generate a CRC value for the encrypted encoded data slice to produce a secure encoded data slice tweaking. When the per slice security processing module 150 is not enabled, it passes the encoded data slices or is bypassed such that the encoded data slices 218 are the output of the DS error encoding module 112.

Figure 23:
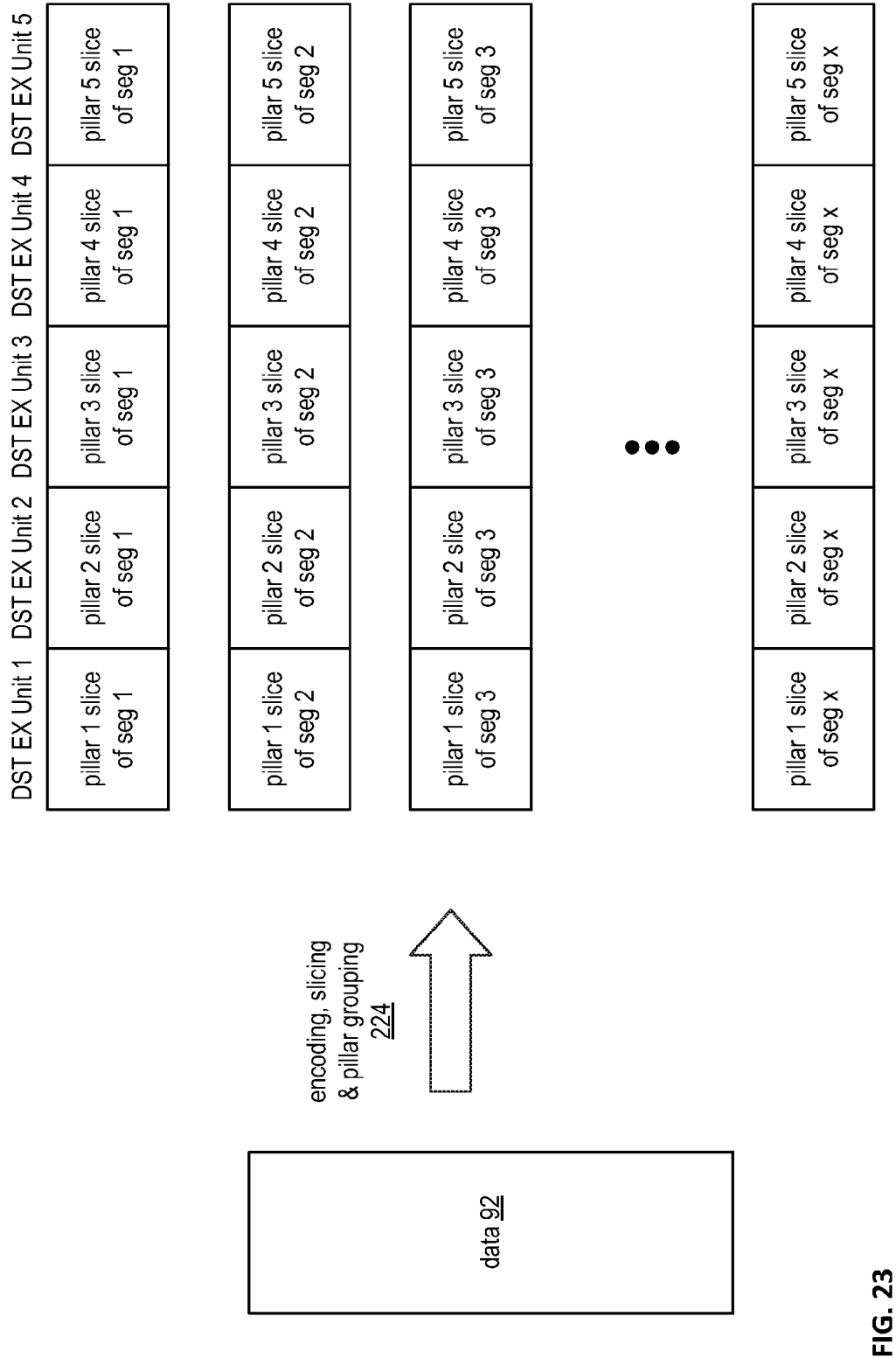
FIG. 23 is a diagram of an example of converting data into pillar slice groups for storage in accordance with the present invention.

FIG. 23 is a diagram of an example of converting data 92 into pillar slice groups utilizing encoding, slicing and pillar grouping function 224 for storage in memory of a distributed storage and task network (DSTN) module. As previously discussed the data 92 is encoded and sliced into a plurality of sets of encoded data slices; one set per data segment. The grouping selector module organizes the sets of encoded data slices into pillars of data slices. In this example, the DS error encoding parameters include a pillar width of 5 and a decode threshold of 3. As such, for each data segment, 5 encoded data slices are created.

The grouping selector module takes the first encoded data slice of each of the sets and forms a first pillar, which may be sent to the first DST execution unit. Similarly, the grouping selector module creates the second pillar from the second slices of the sets; the third pillar from the third slices of the sets; the fourth pillar from the fourth slices of the sets; and the fifth pillar from the fifth slices of the set.

FIG. 24 is a schematic block diagram of an embodiment of a distributed storage and/or task (DST) execution unit that includes an interface 169, a controller 86, memory 88, one or more distributed task (DT) execution modules 90, and a DST client module 34. A computing core 26 may be utilized to implement the one or more DT execution modules 90 and the DST client module 34. The memory 88 is of sufficient size to store a significant number of encoded data slices (e.g., thousands of slices to hundreds-of-millions of slices) and may include one or more hard drives and/or one or more solid-state memory devices (e.g., flash memory, DRAM, etc.).

In an example of storing a pillar of slices 216, the DST execution unit receives, via interface 169, a pillar of slices 216 (e.g., pillar #1 slices). The memory 88 stores the encoded data slices 216 of the pillar of slices in accordance with memory control information 174 it receives from the controller 86. The controller 86 (e.g., a processing module, a CPU, etc.) generates the memory control information 174 based on distributed storage information (e.g., user information (e.g., user ID, distributed storage permissions, data access permission, etc.), vault information (e.g., virtual memory assigned to user, user group, etc.), etc.). Similarly, when retrieving slices, the DST execution unit receives, via interface 169, a slice retrieval request. The memory 88 retrieves the slice in accordance with memory control information 174 it receives from the controller 86. The memory 88 outputs the slice 100, via the interface 169, to a requesting entity.

Figure 25:
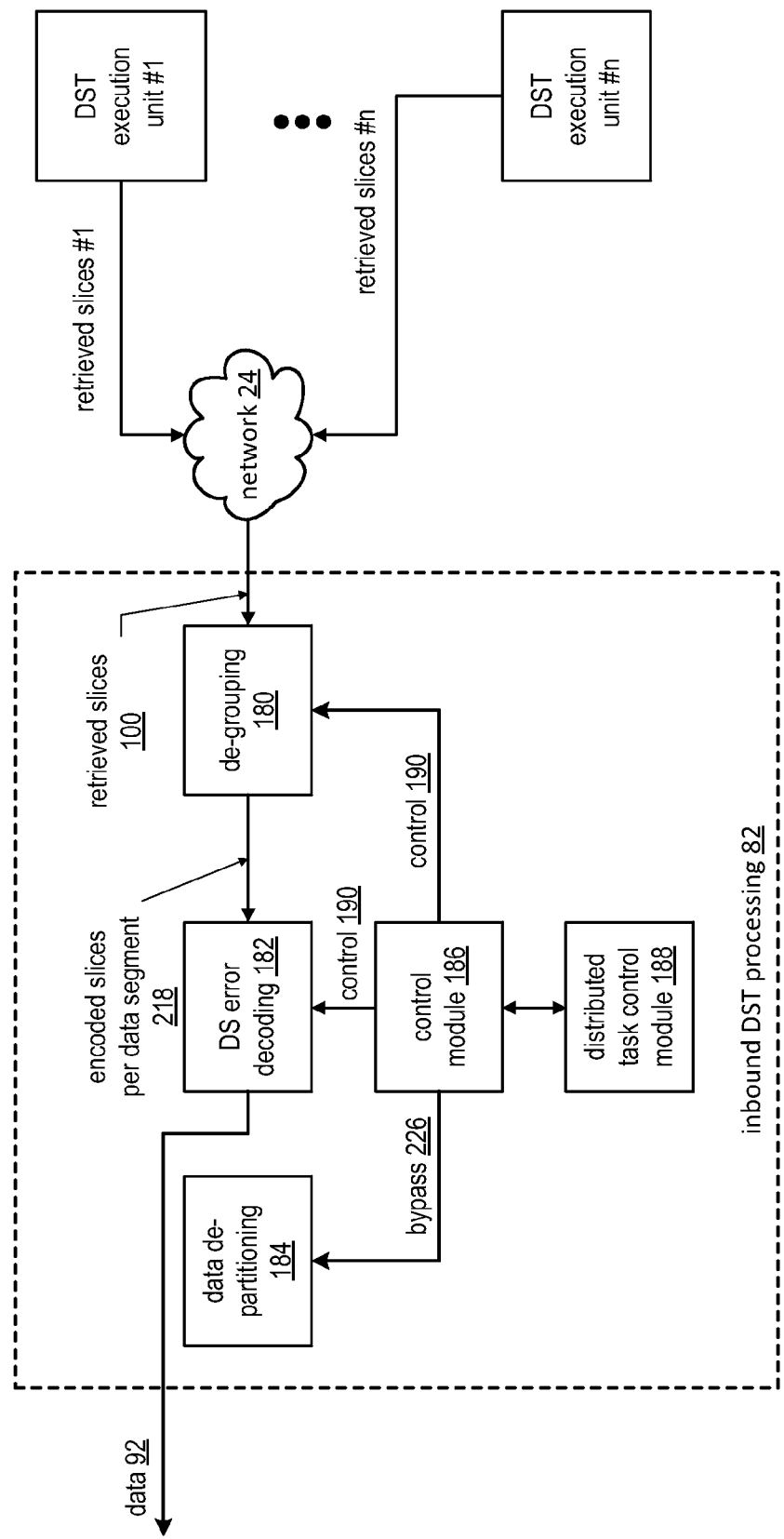
FIG. 25 is a schematic block diagram of an example of operation of inbound distributed storage and/or task (DST) processing for retrieving dispersed error encoded data in accordance with the present invention.

FIG. 25 is a schematic block diagram of an example of operation of an inbound distributed storage and/or task (DST) processing section 82 for retrieving dispersed error encoded data 92. The inbound DST processing section 82 includes a de-grouping module 180, a dispersed storage (DS) error decoding module 182, a data de-partitioning module 184, a control module 186, and a distributed task control module 188. Note that the control module 186 and/or the distributed task control module 188 may be separate modules from corresponding ones of an outbound DST processing section or may be the same modules.

In an example of operation, the inbound DST processing section 82 is retrieving stored data 92 from the DST execution units (i.e., the DSTN module). In this example, the DST execution units output encoded data slices corresponding to data retrieval requests from the distributed task control module 188. The de-grouping module 180 receives pillars of slices 100 and de-groups them in accordance with control information 190 from the control module 186 to produce sets of encoded data slices 218. The DS error decoding module 182 decodes, in accordance with the DS error encoding parameters received as control information 190 from the control module 186, each set of encoded data slices 218 to produce data segments, which are aggregated into retrieved data 92. The data de-partitioning module 184 is by-passed in this operational mode via a bypass signal 226 of control information 190 from the control module 186.

Figure 26:
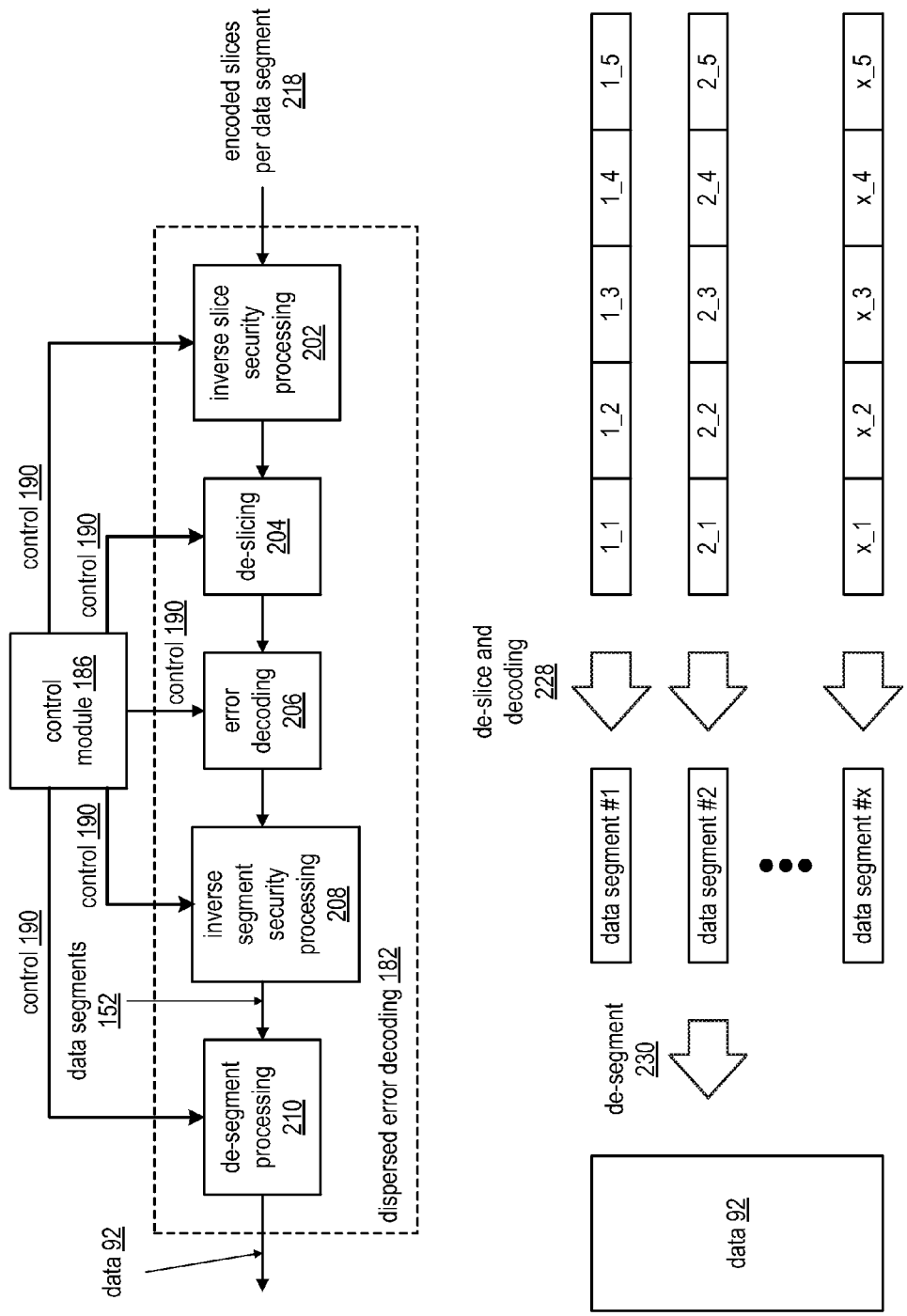
FIG. 26 is a schematic block diagram of an example of a dispersed error decoding for the example of FIG. 25 in accordance with the present invention.

FIG. 26 is a schematic block diagram of an embodiment of a dispersed storage (DS) error decoding module 182 of an inbound distributed storage and task (DST) processing section. The DS error decoding module 182 includes an inverse per slice security processing module 202, a de-slicing module 204, an error decoding module 206, an inverse segment security module 208, and a de-segmenting processing module 210. The dispersed error decoding module 182 is operable to de-slice and decode encoded slices per data segment 218 utilizing a de-slicing and decoding function 228 to produce a plurality of data segments that are de-segmented utilizing a de-segment function 230 to recover data 92.

In an example of operation, the inverse per slice security processing module 202, when enabled by the control module 186 via control information 190, unsecures each encoded data slice 218 based on slice de-security information (e.g., the compliment of the slice security information discussed with reference to FIG. 6) received as control information 190 from the control module 186. The slice de-security information includes data decompression, decryption, de-watermarking, integrity check (e.g., CRC verification, etc.), and/or any other type of digital security. For example, when the inverse per slice security processing module 202 is enabled, it verifies integrity information (e.g., a CRC value) of each encoded data slice 218, it decrypts each verified encoded data slice, and decompresses each decrypted encoded data slice to produce slice encoded data. When the inverse per slice security processing module 202 is not enabled, it passes the encoded data slices 218 as the sliced encoded data or is bypassed such that the retrieved encoded data slices 218 are provided as the sliced encoded data.

The de-slicing module 204 de-slices the sliced encoded data into encoded data segments in accordance with a pillar width of the error correction encoding parameters received as control information 190 from a control module 186. For example, if the pillar width is five, the de-slicing module de-slices a set of five encoded data slices into an encoded data segment. Alternatively, the encoded data segment may include just three encoded data slices (e.g., when the decode threshold is 3).

The error decoding module 206 decodes the encoded data segments in accordance with error correction decoding parameters received as control information 190 from the control module 186 to produce secure data segments. The error correction decoding parameters include identifying an error correction encoding scheme (e.g., forward error correction algorithm, a Reed-Solomon based algorithm, an information dispersal algorithm, etc.), a pillar width, a decode threshold, a read threshold, a write threshold, etc. For example, the error correction decoding parameters identify a specific error correction encoding scheme, specify a pillar width of five, and specify a decode threshold of three.

The inverse segment security processing module 208, when enabled by the control module 186, unsecures the secured data segments based on segment security information received as control information 190 from the control module 186. The segment security information includes data decompression, decryption, de-watermarking, integrity check (e.g., CRC, etc.) verification, and/or any other type of digital security. For example, when the inverse segment security processing module is enabled, it verifies integrity information (e.g., a CRC value) of each secure data segment, it decrypts each verified secured data segment, and decompresses each decrypted secure data segment to produce a data segment 152. When the inverse segment security processing module 208 is not enabled, it passes the decoded data segment 152 as the data segment or is bypassed. The de-segmenting processing module 210 aggregates the data segments 152 into the data 92 in accordance with control information 190 from the control module 186.

Figure 27:
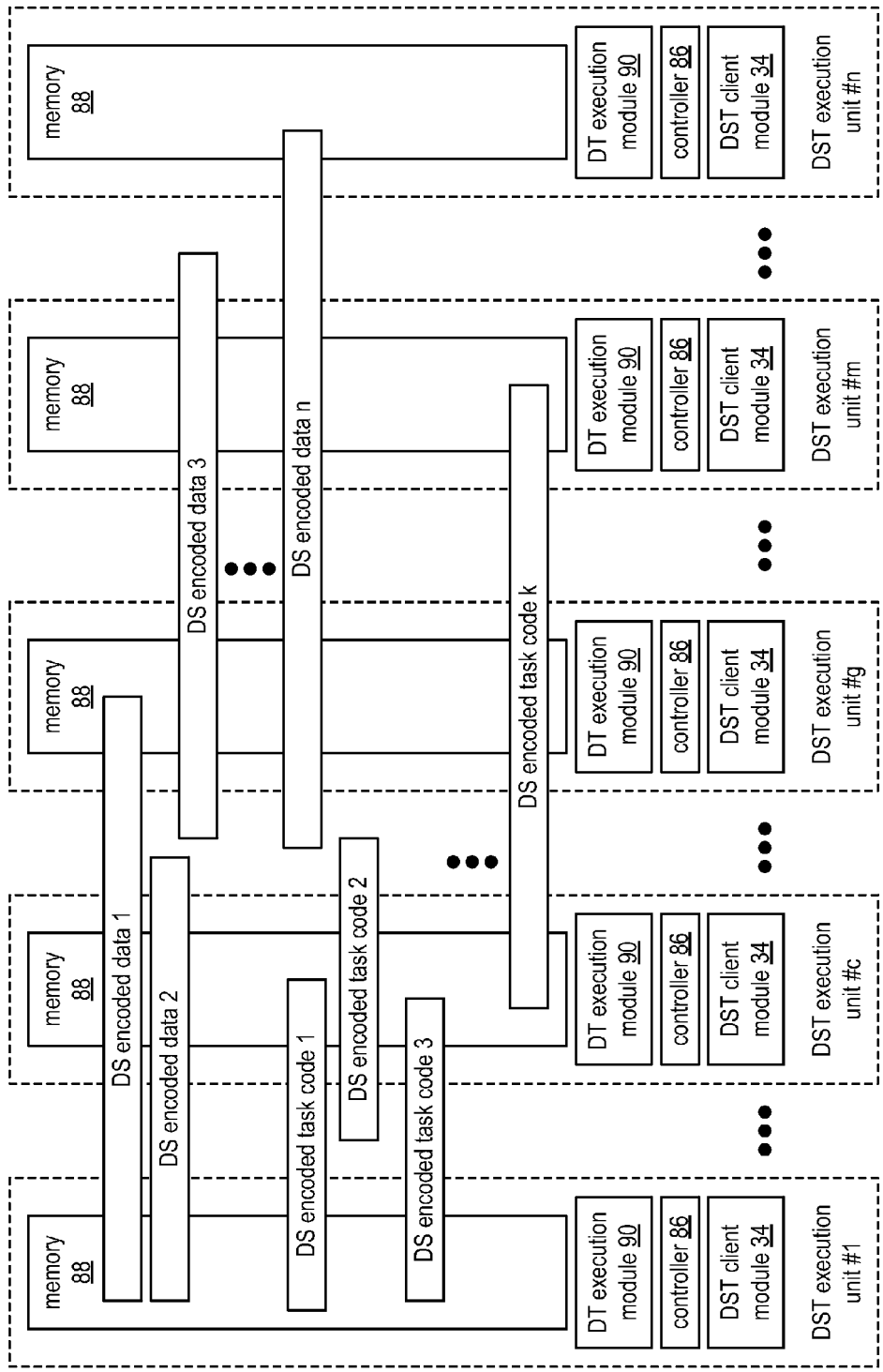
FIG. 27 is a schematic block diagram of an example of a distributed storage and task processing network (DSTN) module storing a plurality of data and a plurality of task codes in accordance with the present invention.

FIG. 27 is a schematic block diagram of an example of a distributed storage and task processing network (DSTN) module that includes a plurality of distributed storage and task (DST) execution units (#1 through #n, where, for example, n is an integer greater than or equal to three). Each of the DST execution units includes a DST client module 34, a controller 86, one or more DT (distributed task) execution modules 90, and memory 88.

In this example, the DSTN module stores, in the memory of the DST execution units, a plurality of DS (dispersed storage) encoded data (e.g., 1 through n, where n is an integer greater than or equal to two) and stores a plurality of DS encoded task codes (e.g., 1 through k, where k is an integer greater than or equal to two). The DS encoded data may be encoded in accordance with one or more examples described with reference to FIGS. 3-19 (e.g., organized in slice groupings) or encoded in accordance with one or more examples described with reference to FIGS. 20-26 (e.g., organized in pillar groups). The data that is encoded into the DS encoded data may be of any size and/or of any content. For example, the data may be one or more digital books, a copy of a company's emails, a large-scale Internet search, a video security file, one or more entertainment video files (e.g., television programs, movies, etc.), data files, and/or any other large amount of data (e.g., greater than a few Terra-Bytes).

The tasks that are encoded into the DS encoded task code may be a simple function (e.g., a mathematical function, a logic function, an identify function, a find function, a search engine function, a replace function, etc.), a complex function (e.g., compression, human and/or computer language translation, text-to-voice conversion, voice-to-text conversion, etc.), multiple simple and/or complex functions, one or more algorithms, one or more applications, etc. The tasks may be encoded into the DS encoded task code in accordance with one or more examples described with reference to FIGS. 3-19 (e.g., organized in slice groupings) or encoded in accordance with one or more examples described with reference to FIGS. 20-26 (e.g., organized in pillar groups).

In an example of operation, a DST client module of a user device or of a DST processing unit issues a DST request to the DSTN module. The DST request may include a request to retrieve stored data, or a portion thereof, may include a request to store data that is included with the DST request, may include a request to perform one or more tasks on stored data, may include a request to perform one or more tasks on data included with the DST request, etc. In the cases where the DST request includes a request to store data or to retrieve data, the client module and/or the DSTN module processes the request as previously discussed with reference to one or more of FIGS. 3-19 (e.g., slice groupings) and/or 20-26 (e.g., pillar groupings). In the case where the DST request includes a request to perform one or more tasks on data included with the DST request, the DST client module and/or the DSTN module process the DST request as previously discussed with reference to one or more of FIGS. 3-19.

In the case where the DST request includes a request to perform one or more tasks on stored data, the DST client module and/or the DSTN module processes the DST request as will be described with reference to one or more of FIGS. 28-39. In general, the DST client module identifies data and one or more tasks for the DSTN module to execute upon the identified data. The DST request may be for a one-time execution of the task or for an on-going execution of the task. As an example of the latter, as a company generates daily emails, the DST request may be to daily search new emails for inappropriate content and, if found, record the content, the email sender(s), the email recipient(s), email routing information, notify human resources of the identified email, etc.

Figure 28:
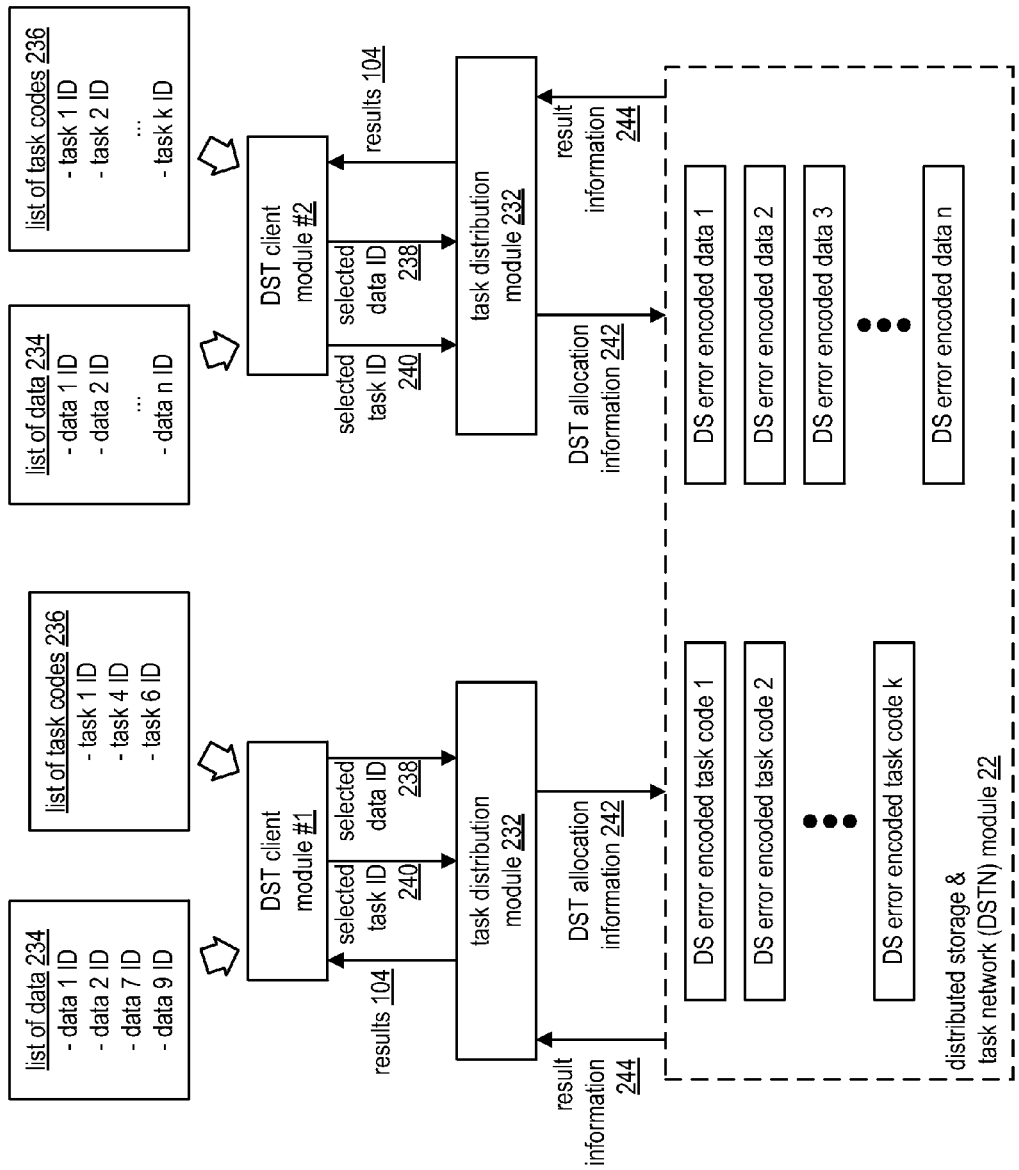
FIG. 28 is a schematic block diagram of an example of the distributed computing system performing tasks on stored data in accordance with the present invention.

FIG. 28 is a schematic block diagram of an example of a distributed computing system performing tasks on stored data. In this example, two distributed storage and task (DST) client modules 1-2 are shown: the first may be associated with a user device and the second may be associated with a DST processing unit or a high priority user device (e.g., high priority clearance user, system administrator, etc.). Each DST client module includes a list of stored data 234 and a list of tasks codes 236. The list of stored data 234 includes one or more entries of data identifying information, where each entry identifies data stored in the DSTN module 22. The data identifying information (e.g., data ID) includes one or more of a data file name, a data file directory listing, DSTN addressing information of the data, a data object identifier, etc. The list of tasks 236 includes one or more entries of task code identifying information, when each entry identifies task codes stored in the DSTN module 22. The task code identifying information (e.g., task ID) includes one or more of a task file name, a task file directory listing, DSTN addressing information of the task, another type of identifier to identify the task, etc.

As shown, the list of data 234 and the list of tasks 236 are each smaller in number of entries for the first DST client module than the corresponding lists of the second DST client module. This may occur because the user device associated with the first DST client module has fewer privileges in the distributed computing system than the device associated with the second DST client module. Alternatively, this may occur because the user device associated with the first DST client module serves fewer users than the device associated with the second DST client module and is restricted by the distributed computing system accordingly. As yet another alternative, this may occur through no restraints by the distributed computing system, it just occurred because the operator of the user device associated with the first DST client module has selected fewer data and/or fewer tasks than the operator of the device associated with the second DST client module.

In an example of operation, the first DST client module selects one or more data entries 238 and one or more tasks 240 from its respective lists (e.g., selected data ID and selected task ID). The first DST client module sends its selections to a task distribution module 232. The task distribution module 232 may be within a stand-alone device of the distributed computing system, may be within the user device that contains the first DST client module, or may be within the DSTN module 22.

Regardless of the task distribution module's location, it generates DST allocation information 242 from the selected task ID 240 and the selected data ID 238. The DST allocation information 242 includes data partitioning information, task execution information, and/or intermediate result information. The task distribution module 232 sends the DST allocation information 242 to the DSTN module 22. Note that one or more examples of the DST allocation information will be discussed with reference to one or more of FIGS. 29-39.

The DSTN module 22 interprets the DST allocation information 242 to identify the stored DS encoded data (e.g., DS error encoded data 2) and to identify the stored DS error encoded task code (e.g., DS error encoded task code 1). In addition, the DSTN module 22 interprets the DST allocation information 242 to determine how the data is to be partitioned and how the task is to be partitioned. The DSTN module 22 also determines whether the selected DS error encoded data 238 needs to be converted from pillar grouping to slice grouping. If so, the DSTN module 22 converts the selected DS error encoded data into slice groupings and stores the slice grouping DS error encoded data by overwriting the pillar grouping DS error encoded data or by storing it in a different location in the memory of the DSTN module 22 (i.e., does not overwrite the pillar grouping DS encoded data).

The DSTN module 22 partitions the data and the task as indicated in the DST allocation information 242 and sends the portions to selected DST execution units of the DSTN module 22. Each of the selected DST execution units performs its partial task(s) on its slice groupings to produce partial results. The DSTN module 22 collects the partial results from the selected DST execution units and provides them, as result information 244, to the task distribution module. The result information 244 may be the collected partial results, one or more final results as produced by the DSTN module 22 from processing the partial results in accordance with the DST allocation information 242, or one or more intermediate results as produced by the DSTN module 22 from processing the partial results in accordance with the DST allocation information 242.

The task distribution module 232 receives the result information 244 and provides one or more final results 104 therefrom to the first DST client module. The final result(s) 104 may be result information 244 or a result(s) of the task distribution module's processing of the result information 244.

In concurrence with processing the selected task of the first DST client module, the distributed computing system may process the selected task(s) of the second DST client module on the selected data(s) of the second DST client module. Alternatively, the distributed computing system may process the second DST client module's request subsequent to, or preceding, that of the first DST client module. Regardless of the ordering and/or parallel processing of the DST client module requests, the second DST client module provides its selected data 238 and selected task 240 to a task distribution module 232. If the task distribution module 232 is a separate device of the distributed computing system or within the DSTN module, the task distribution modules 232 coupled to the first and second DST client modules may be the same module. The task distribution module 232 processes the request of the second DST client module in a similar manner as it processed the request of the first DST client module.

Figure 29:
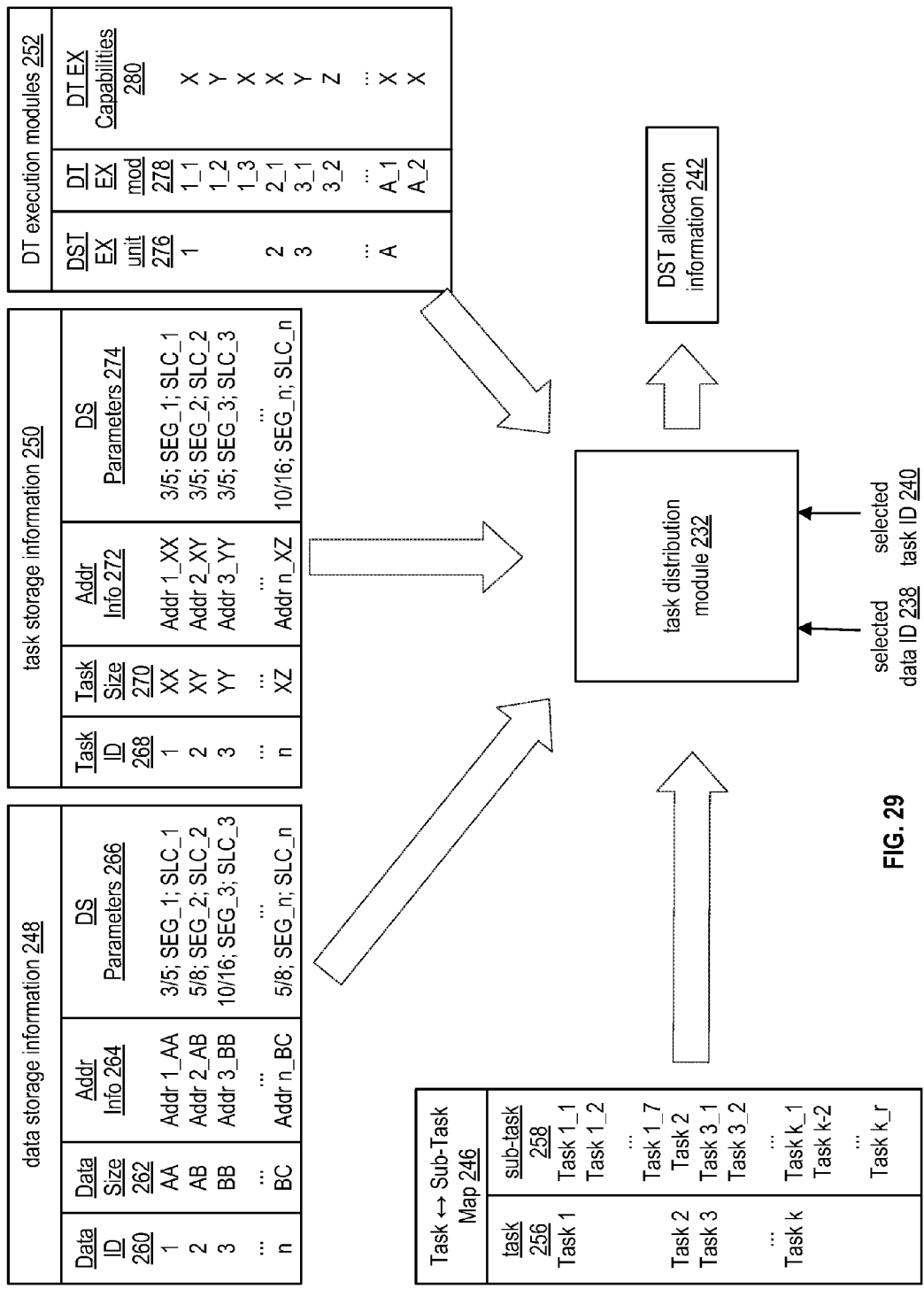
FIG. 29 is a schematic block diagram of an embodiment of a task distribution module facilitating the example of FIG. 28 in accordance with the present invention.

FIG. 29 is a schematic block diagram of an embodiment of a task distribution module 232 facilitating the example of FIG. 28. The task distribution module 232 includes a plurality of tables it uses to generate distributed storage and task (DST) allocation information 242 for selected data and selected tasks received from a DST client module. The tables include data storage information 248, task storage information 250, distributed task (DT) execution module information 252, and task⇔sub-task mapping information 246.

The data storage information table 248 includes a data identification (ID) field 260, a data size field 262, an addressing information field 264, distributed storage (DS) information 266, and may further include other information regarding the data, how it is stored, and/or how it can be processed. For example, DS encoded data #1 has a data ID of 1, a data size of AA (e.g., a byte size of a few terra-bytes or more), addressing information of Addr_1_AA, and DS parameters of 3/5; SEG_1; and SLC_1. In this example, the addressing information may be a virtual address corresponding to the virtual address of the first storage word (e.g., one or more bytes) of the data and information on how to calculate the other addresses, may be a range of virtual addresses for the storage words of the data, physical addresses of the first storage word or the storage words of the data, may be a list of slice names of the encoded data slices of the data, etc. The DS parameters may include identity of an error encoding scheme, decode threshold/pillar width (e.g., 3/5 for the first data entry), segment security information (e.g., SEG_1), per slice security information (e.g., SLC_1), and/or any other information regarding how the data was encoded into data slices.

The task storage information table 250 includes a task identification (ID) field 268, a task size field 270, an addressing information field 272, distributed storage (DS) information 274, and may further include other information regarding the task, how it is stored, and/or how it can be used to process data. For example, DS encoded task #2 has a task ID of 2, a task size of XY, addressing information of Addr_2_XY, and DS parameters of 3/5; SEG_2; and SLC_2. In this example, the addressing information may be a virtual address corresponding to the virtual address of the first storage word (e.g., one or more bytes) of the task and information on how to calculate the other addresses, may be a range of virtual addresses for the storage words of the task, physical addresses of the first storage word or the storage words of the task, may be a list of slices names of the encoded slices of the task code, etc. The DS parameters may include identity of an error encoding scheme, decode threshold/pillar width (e.g., 3/5 for the first data entry), segment security information (e.g., SEG_2), per slice security information (e.g., SLC_2), and/or any other information regarding how the task was encoded into encoded task slices. Note that the segment and/or the per-slice security information include a type of encryption (if enabled), a type of compression (if enabled), watermarking information (if enabled), and/or an integrity check scheme (if enabled).

The task⇔sub-task mapping information table 246 includes a task field 256 and a sub-task field 258. The task field 256 identifies a task stored in the memory of a distributed storage and task network (DSTN) module and the corresponding sub-task fields 258 indicates whether the task includes sub-tasks and, if so, how many and if any of the sub-tasks are ordered. In this example, the task⇔sub-task mapping information table 246 includes an entry for each task stored in memory of the DSTN module (e.g., task 1 through task k). In particular, this example indicates that task 1 includes 7 sub-tasks; task 2 does not include sub-tasks, and task k includes r number of sub-tasks (where r is an integer greater than or equal to two).

The DT execution module table 252 includes a DST execution unit ID field 276, a DT execution module ID field 278, and a DT execution module capabilities field 280. The DST execution unit ID field 276 includes the identity of DST units in the DSTN module. The DT execution module ID field 278 includes the identity of each DT execution unit in each DST unit. For example, DST unit 1 includes three DT executions modules (e.g., 1_1, 1_2, and 1_3). The DT execution capabilities field 280 includes identity of the capabilities of the corresponding DT execution unit. For example, DT execution module 1_1 includes capabilities X, where X includes one or more of MIPS capabilities, processing resources (e.g., quantity and capability of microprocessors, CPUs, digital signal processors, co-processor, microcontrollers, arithmetic logic circuitry, and/or any other analog and/or digital processing circuitry), availability of the processing resources, memory information (e.g., type, size, availability, etc.), and/or any information germane to executing one or more tasks.

From these tables, the task distribution module 232 generates the DST allocation information 242 to indicate where the data is stored, how to partition the data, where the task is stored, how to partition the task, which DT execution units should perform which partial task on which data partitions, where and how intermediate results are to be stored, etc. If multiple tasks are being performed on the same data or different data, the task distribution module factors such information into its generation of the DST allocation information.

Figure 30:
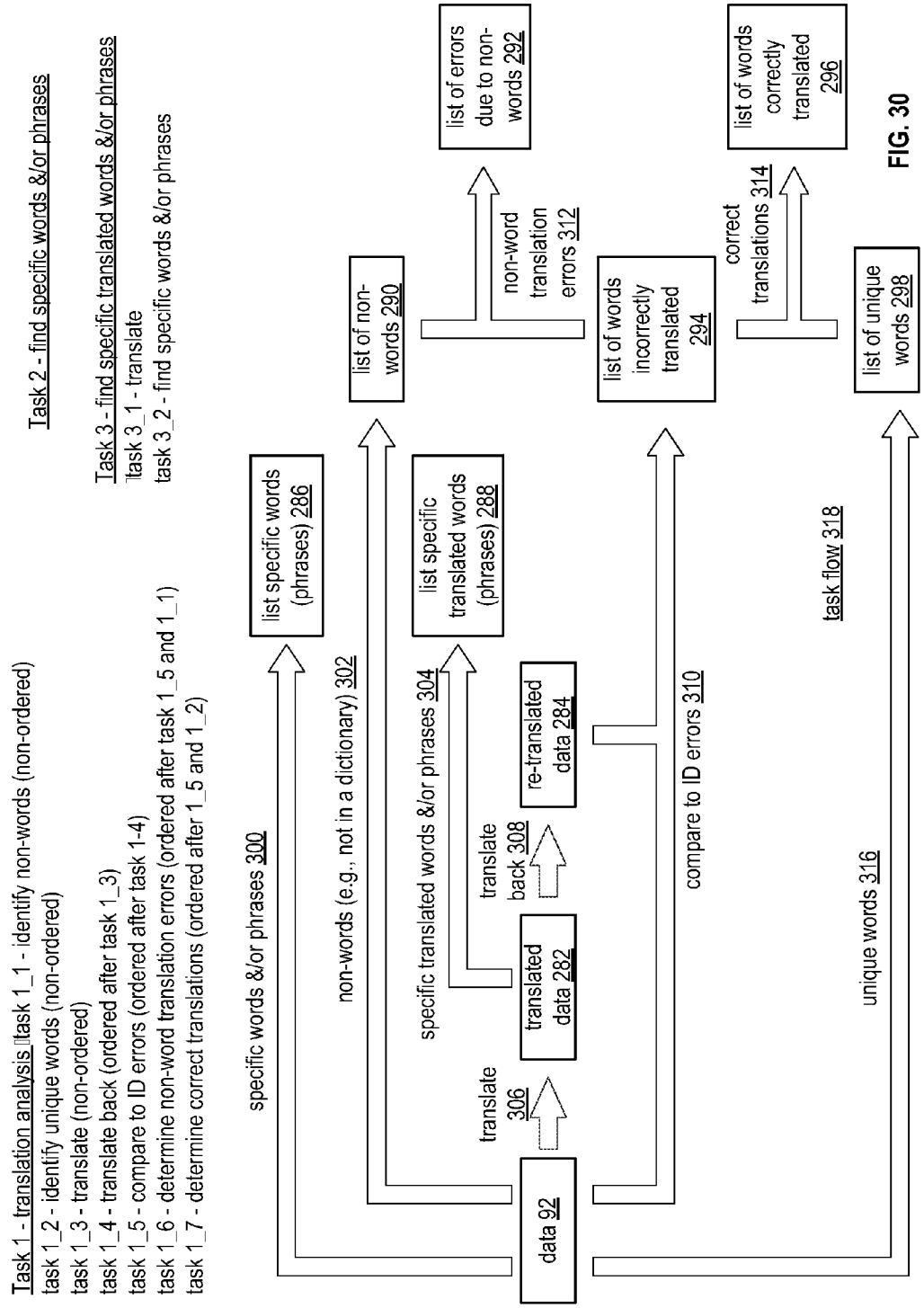
FIG. 30 is a diagram of a specific example of the distributed computing system performing tasks on stored data in accordance with the present invention.

FIG. 30 is a diagram of a specific example of a distributed computing system performing tasks on stored data as a task flow 318. In this example, selected data 92 is data 2 and selected tasks are tasks 1, 2, and 3. Task 1 corresponds to analyzing translation of data from one language to another (e.g., human language or computer language); task 2 corresponds to finding specific words and/or phrases in the data; and task 3 corresponds to finding specific translated words and/or phrases in translated data.

In this example, task 1 includes 7 sub-tasks: task 1_1 —identify non-words (non-ordered); task 1_2 —identify unique words (non-ordered); task 1_3 —translate (non-ordered); task 1_4 —translate back (ordered after task 1_3); task 1_5 —compare to ID errors (ordered after task 1-4); task 1_6 —determine non-word translation errors (ordered after task 1_5 and 1_1); and task 1_7 —determine correct translations (ordered after 1_5 and 1_2). The sub-task further indicates whether they are an ordered task (i.e., are dependent on the outcome of another task) or non-order (i.e., are independent of the outcome of another task). Task 2 does not include sub-tasks and task 3 includes two sub-tasks: task 3_1 translate; and task 3_2 find specific word or phrase in translated data.

In general, the three tasks collectively are selected to analyze data for translation accuracies, translation errors, translation anomalies, occurrence of specific words or phrases in the data, and occurrence of specific words or phrases on the translated data. Graphically, the data 92 is translated 306 into translated data 282; is analyzed for specific words and/or phrases 300 to produce a list of specific words and/or phrases 286; is analyzed for non-words 302 (e.g., not in a reference dictionary) to produce a list of non-words 290; and is analyzed for unique words 316 included in the data 92 (i.e., how many different words are included in the data) to produce a list of unique words 298. Each of these tasks is independent of each other and can therefore be processed in parallel if desired.

The translated data 282 is analyzed (e.g., sub-task 3_2) for specific translated words and/or phrases 304 to produce a list of specific translated words and/or phrases 288. The translated data 282 is translated back 308 (e.g., sub-task 1_4) into the language of the original data to produce re-translated data 284. These two tasks are dependent on the translate task (e.g., task 1_3) and thus must be ordered after the translation task, which may be in a pipelined ordering or a serial ordering. The re-translated data 284 is then compared 310 with the original data 92 to find words and/or phrases that did not translate (one way and/or the other) properly to produce a list of incorrectly translated words 294. As such, the comparing task (e.g., sub-task 1_5) 310 is ordered after the translation 306 and re-translation tasks 308 (e.g., sub-tasks 1_3 and 1_4).

The list of words incorrectly translated 294 is compared 312 to the list of non-words 290 to identify words that were not properly translated because the words are non-words to produce a list of errors due to non-words 292. In addition, the list of words incorrectly translated 294 is compared 314 to the list of unique words 298 to identify unique words that were properly translated to produce a list of correctly translated words 296. The comparison may also identify unique words that were not properly translated to produce a list of unique words that were not properly translated. Note that each list of words (e.g., specific words and/or phrases, non-words, unique words, translated words and/or phrases, etc.,) may include the word and/or phrase, how many times it is used, where in the data it is used, and/or any other information requested regarding a word and/or phrase.

Figure 31:
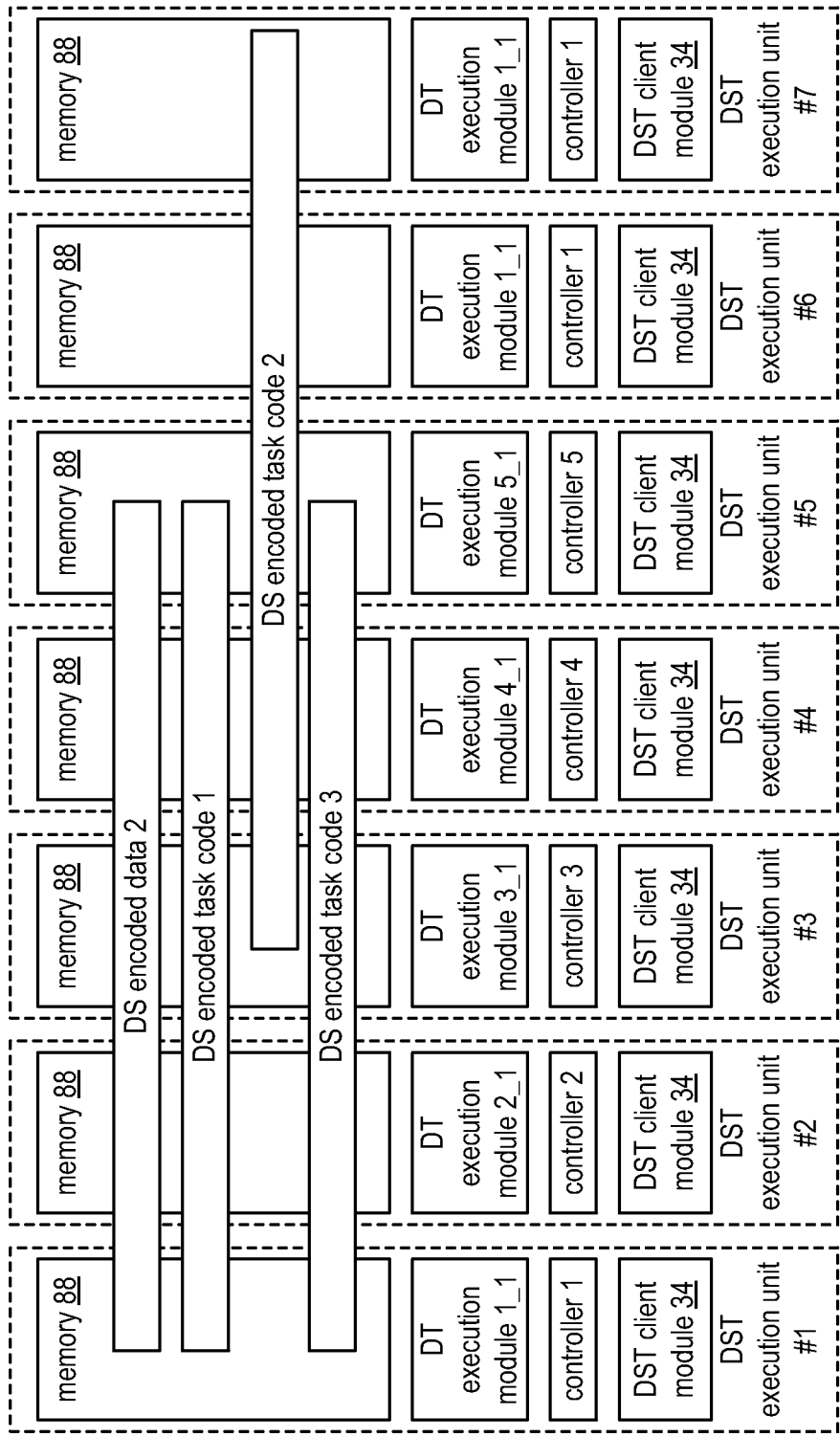
FIG. 31 is a schematic block diagram of an example of a distributed storage and task processing network (DSTN) module storing data and task codes for the example of FIG. 30 in accordance with the present invention.

FIG. 31 is a schematic block diagram of an example of a distributed storage and task processing network (DSTN) module storing data and task codes for the example of FIG. 30. As shown, DS encoded data 2 is stored as encoded data slices across the memory (e.g., stored in memories 88) of DST execution units 1-5; the DS encoded task code 1 (of task 1) and DS encoded task 3 are stored as encoded task slices across the memory of DST execution units 1-5; and DS encoded task code 2 (of task 2) is stored as encoded task slices across the memory of DST execution units 3-7. As indicated in the data storage information table and the task storage information table of FIG. 29, the respective data/task has DS parameters of 3/5 for their decode threshold/pillar width; hence spanning the memory of five DST execution units.

FIG. 32 is a diagram of an example of distributed storage and task (DST) allocation information 242 for the example of FIG. 30. The DST allocation information 242 includes data partitioning information 320, task execution information 322, and intermediate result information 324. The data partitioning information 320 includes the data identifier (ID), the number of partitions to split the data into, address information for each data partition, and whether the DS encoded data has to be transformed from pillar grouping to slice grouping. The task execution information 322 includes tabular information having a task identification field 326, a task ordering field 328, a data partition field ID 330, and a set of DT execution modules 332 to use for the distributed task processing per data partition. The intermediate result information 324 includes tabular information having a name ID field 334, an ID of the DST execution unit assigned to process the corresponding intermediate result 336, a scratch pad storage field 338, and an intermediate result storage field 340.

Continuing with the example of FIG. 30, where tasks 1-3 are to be distributedly performed on data 2, the data partitioning information includes the ID of data 2. In addition, the task distribution module determines whether the DS encoded data 2 is in the proper format for distributed computing (e.g., was stored as slice groupings). If not, the task distribution module indicates that the DS encoded data 2 format needs to be changed from the pillar grouping format to the slice grouping format, which will be done by the DSTN module. In addition, the task distribution module determines the number of partitions to divide the data into (e.g., 2_1 through 2_z) and addressing information for each partition.

The task distribution module generates an entry in the task execution information section for each sub-task to be performed. For example, task 1_1 (e.g., identify non-words on the data) has no task ordering (i.e., is independent of the results of other sub-tasks), is to be performed on data partitions 2_1 through 2_z by DT execution modules 1_1, 2_1, 3_1, 4_1, and 5_1. For instance, DT execution modules 1_1, 2_1, 3_1, 4_1, and 5_1 search for non-words in data partitions 2_1 through 2_z to produce task 1_1 intermediate results (R1-1, which is a list of non-words). Task 1_2 (e.g., identify unique words) has similar task execution information as task 1_1 to produce task 1_2 intermediate results (R1 -2, which is the list of unique words).

Task 1_3 (e.g., translate) includes task execution information as being non-ordered (i.e., is independent), having DT execution modules 1_1, 2_1, 3_1, 4_1, and 5_1 translate data partitions 2_1 through 2_4 and having DT execution modules 1_2, 2_2, 3_2, 4_2, and 5_2 translate data partitions 2_5 through 2_z to produce task 1_3 intermediate results (R1-3, which is the translated data). In this example, the data partitions are grouped, where different sets of DT execution modules perform a distributed sub-task (or task) on each data partition group, which allows for further parallel processing.

Task 1_4 (e.g., translate back) is ordered after task 1_3 and is to be executed on task 1_3 's intermediate result (e.g., R1-3_1) (e.g., the translated data). DT execution modules 1_1, 2_1, 3_1, 4_1, and 5_1 are allocated to translate back task 1_3 intermediate result partitions R1-3_1 through R1-3_4 and DT execution modules 1_2, 2_2, 6_1, 7_1, and 7_2 are allocated to translate back task 1_3 intermediate result partitions R1-3_5 through R1-3_z to produce task 1-4 intermediate results (R1-4, which is the translated back data).

Task 1_5 (e.g., compare data and translated data to identify translation errors) is ordered after task 1_4 and is to be executed on task 1_4's intermediate results (R4-1) and on the data. DT execution modules 1_1, 2_1, 3_1, 4_1, and 5_1 are allocated to compare the data partitions (2_1 through 2_z) with partitions of task 1-4 intermediate results partitions R1-4_1 through R1-4_z to produce task 1_5 intermediate results (R1-5, which is the list words translated incorrectly).

Task 1_6 (e.g., determine non-word translation errors) is ordered after tasks 1_1 and 1_5 and is to be executed on tasks 1_1's and 1_5's intermediate results (R1-1 and R1-5). DT execution modules 1_1, 2_1, 3_1, 4_1, and 5_1 are allocated to compare the partitions of task 1_1 intermediate results (R1-1_1 through R1-1_z) with partitions of task 1-5 intermediate results partitions (R1-5_1 through R1-5_z) to produce task 1_6 intermediate results (R1-6, which is the list translation errors due to non-words).

Task 1_7 (e.g., determine words correctly translated) is ordered after tasks 1_2 and 1_5 and is to be executed on tasks 1_2's and 1_5's intermediate results (R1-1 and R1-5). DT execution modules 1_2, 2_2, 3_2, 4_2, and 5_2 are allocated to compare the partitions of task 1_2 intermediate results (R1-2_1 through R1-2_z) with partitions of task 1-5 intermediate results partitions (R1-5_1 through R1-5_z) to produce task 1_7 intermediate results (R1-7, which is the list of correctly translated words).

Task 2 (e.g., find specific words and/or phrases) has no task ordering (i.e., is independent of the results of other sub-tasks), is to be performed on data partitions 2_1 through 2_z by DT execution modules 3_1, 4_1, 5_1, 6_1, and 7_1. For instance, DT execution modules 3_1, 4_1, 5_1, 6_1, and 7_1 search for specific words and/or phrases in data partitions 2_1 through 2_z to produce task 2 intermediate results (R2, which is a list of specific words and/or phrases).

Task 3_2 (e.g., find specific translated words and/or phrases) is ordered after task 1_3 (e.g., translate) is to be performed on partitions R1-3_1 through R1-3_z by DT execution modules 1_2, 2_2, 3_2, 4_2, and 5_2. For instance, DT execution modules 1_2, 2_2, 3_2, 4_2, and 5_2 search for specific translated words and/or phrases in the partitions of the translated data (R1-3_1 through R1- 3_z) to produce task 3_2 intermediate results (R3-2, which is a list of specific translated words and/or phrases).

For each task, the intermediate result information indicates which DST unit is responsible for overseeing execution of the task and, if needed, processing the partial results generated by the set of allocated DT execution units. In addition, the intermediate result information indicates a scratch pad memory for the task and where the corresponding intermediate results are to be stored. For example, for intermediate result R1-1 (the intermediate result of task 1_1), DST unit 1 is responsible for overseeing execution of the task 1_1 and coordinates storage of the intermediate result as encoded intermediate result slices stored in memory of DST execution units 1-5. In general, the scratch pad is for storing non-DS encoded intermediate results and the intermediate result storage is for storing DS encoded intermediate results.

FIGS. 33-38 are schematic block diagrams of the distributed storage and task network (DSTN) module performing the example of FIG. 30. In FIG. 33, the DSTN module accesses the data 92 and partitions it into a plurality of partitions 1-z in accordance with distributed storage and task network (DST) allocation information. For each data partition, the DSTN identifies a set of its DT (distributed task) execution modules 90 to perform the task (e.g., identify non-words (i.e., not in a reference dictionary) within the data partition) in accordance with the DST allocation information. From data partition to data partition, the set of DT execution modules 90 may be the same, different, or a combination thereof (e.g., some data partitions use the same set while other data partitions use different sets).

For the first data partition, the first set of DT execution modules (e.g., 1_1, 2_1, 3_1, 4_1, and 5_1 per the DST allocation information of FIG. 32) executes task 1_1 to produce a first partial result 102 of non-words found in the first data partition. The second set of DT execution modules (e.g., 1_1, 2_1, 3_1, 4_1, and 5_1 per the DST allocation information of FIG. 32) executes task 1_1 to produce a second partial result 102 of non-words found in the second data partition. The sets of DT execution modules (as per the DST allocation information) perform task 1_1 on the data partitions until the "z" set of DT execution modules performs task 1_1 on the "zth" data partition to produce a "zth" partial result 102 of non-words found in the "zth" data partition.

As indicated in the DST allocation information of FIG. 32, DST execution unit 1 is assigned to process the first through "zth" partial results to produce the first intermediate result (R1-1), which is a list of non-words found in the data. For instance, each set of DT execution modules 90 stores its respective partial result in the scratchpad memory of DST execution unit 1 (which is identified in the DST allocation or may be determined by DST execution unit 1). A processing module of DST execution 1 is engaged to aggregate the first through "zth" partial results to produce the first intermediate result (e.g., R1_1). The processing module stores the first intermediate result as non-DS error encoded data in the scratchpad memory or in another section of memory of DST execution unit 1.

DST execution unit 1 engages its DST client module to slice grouping based DS error encode the first intermediate result (e.g., the list of non-words). To begin the encoding, the DST client module determines whether the list of non-words is of a sufficient size to partition (e.g., greater than a Terra-Byte). If yes, it partitions the first intermediate result (R1-1) into a plurality of partitions (e.g., R1-1_1 through R1-1_m). If the first intermediate result is not of sufficient size to partition, it is not partitioned.

For each partition of the first intermediate result, or for the first intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 34, the DSTN module is performing task 1_2 (e.g., find unique words) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_2 in accordance with the DST allocation information. From data partition to data partition, the set of DT execution modules may be the same, different, or a combination thereof. For the data partitions, the allocated set of DT execution modules executes task 1_2 to produce a partial results (e.g., $1^{st}$ through "zth") of unique words found in the data partitions.

As indicated in the DST allocation information of FIG. 32, DST execution unit 1 is assigned to process the first through "zth" partial results 102 of task 1_2 to produce the second intermediate result (R1-2), which is a list of unique words found in the data 92. The processing module of DST execution 1 is engaged to aggregate the first through "zth" partial results of unique words to produce the second intermediate result. The processing module stores the second intermediate result as non-DS error encoded data in the scratchpad memory or in another section of memory of DST execution unit 1.

DST execution unit 1 engages its DST client module to slice grouping based DS error encode the second intermediate result (e.g., the list of non-words). To begin the encoding, the DST client module determines whether the list of unique words is of a sufficient size to partition (e.g., greater than a Terra-Byte). If yes, it partitions the second intermediate result (R1-2) into a plurality of partitions (e.g., R1-2_1 through R1-2_m). If the second intermediate result is not of sufficient size to partition, it is not partitioned.

For each partition of the second intermediate result, or for the second intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5).

In FIG. 35, the DSTN module is performing task 1_3 (e.g., translate) on the data 92. To begin, the DSTN module accesses the data 92 and partitions it into a plurality of partitions 1-z in accordance with the DST allocation information or it may use the data partitions of task 1_1 if the partitioning is the same. For each data partition, the DSTN identifies a set of its DT execution modules to perform task 1_3 in accordance with the DST allocation information (e.g., DT execution modules 1_1, 2_1, 3_1, 4_1, and 5_1 translate data partitions 2_1 through 2_4 and DT execution modules 1_2, 2_2, 3_2, 4_2, and 5_2 translate data partitions 2_5 through 2_z). For the data partitions, the allocated set of DT execution modules 90 executes task 1_3 to produce partial results 102 (e.g., $1^{st}$ through "zth") of translated data.

As indicated in the DST allocation information of FIG. 32, DST execution unit 2 is assigned to process the first through "zth" partial results of task 1_3 to produce the third intermediate result (R1-3), which is translated data. The processing module of DST execution 2 is engaged to aggregate the first through "zth" partial results of translated data to produce the third intermediate result. The processing module stores the third intermediate result as non-DS error encoded data in the scratchpad memory or in another section of memory of DST execution unit 2.

DST execution unit 2 engages its DST client module to slice grouping based DS error encode the third intermediate result (e.g., translated data). To begin the encoding, the DST client module partitions the third intermediate result (R1-3) into a plurality of partitions (e.g., R1-3_1 through R1-3_y). For each partition of the third intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is further shown in FIG. 35, the DSTN module is performing task 1_4 (e.g., retranslate) on the translated data of the third intermediate result. To begin, the DSTN module accesses the translated data (from the scratchpad memory or from the intermediate result memory and decodes it) and partitions it into a plurality of partitions in accordance with the DST allocation information. For each partition of the third intermediate result, the DSTN identifies a set of its DT execution modules 90 to perform task 1_4 in accordance with the DST allocation information (e.g., DT execution modules 1_1, 2_1, 3_1, 4_1, and 5_1 are allocated to translate back partitions R1-3_1 through R1-3_4 and DT execution modules 1_2, 2_2, 6_1, 7_1, and 7_2 are allocated to translate back partitions R1-3_5 through R1-3_z). For the partitions, the allocated set of DT execution modules executes task 1_4 to produce partial results 102 (e.g., 1st through "zth") of re-translated data.

As indicated in the DST allocation information of FIG. 32, DST execution unit 3 is assigned to process the first through "zth" partial results of task 1_4 to produce the fourth intermediate result (R1-4), which is retranslated data. The processing module of DST execution 3 is engaged to aggregate the first through "zth" partial results of retranslated data to produce the fourth intermediate result. The processing module stores the fourth intermediate result as non-DS error encoded data in the scratchpad memory or in another section of memory of DST execution unit 3.

DST execution unit 3 engages its DST client module to slice grouping based DS error encode the fourth intermediate result (e.g., retranslated data). To begin the encoding, the DST client module partitions the fourth intermediate result (R1-4) into a plurality of partitions (e.g., R1-4_1 through R1-4_z). For each partition of the fourth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

Figure 36:
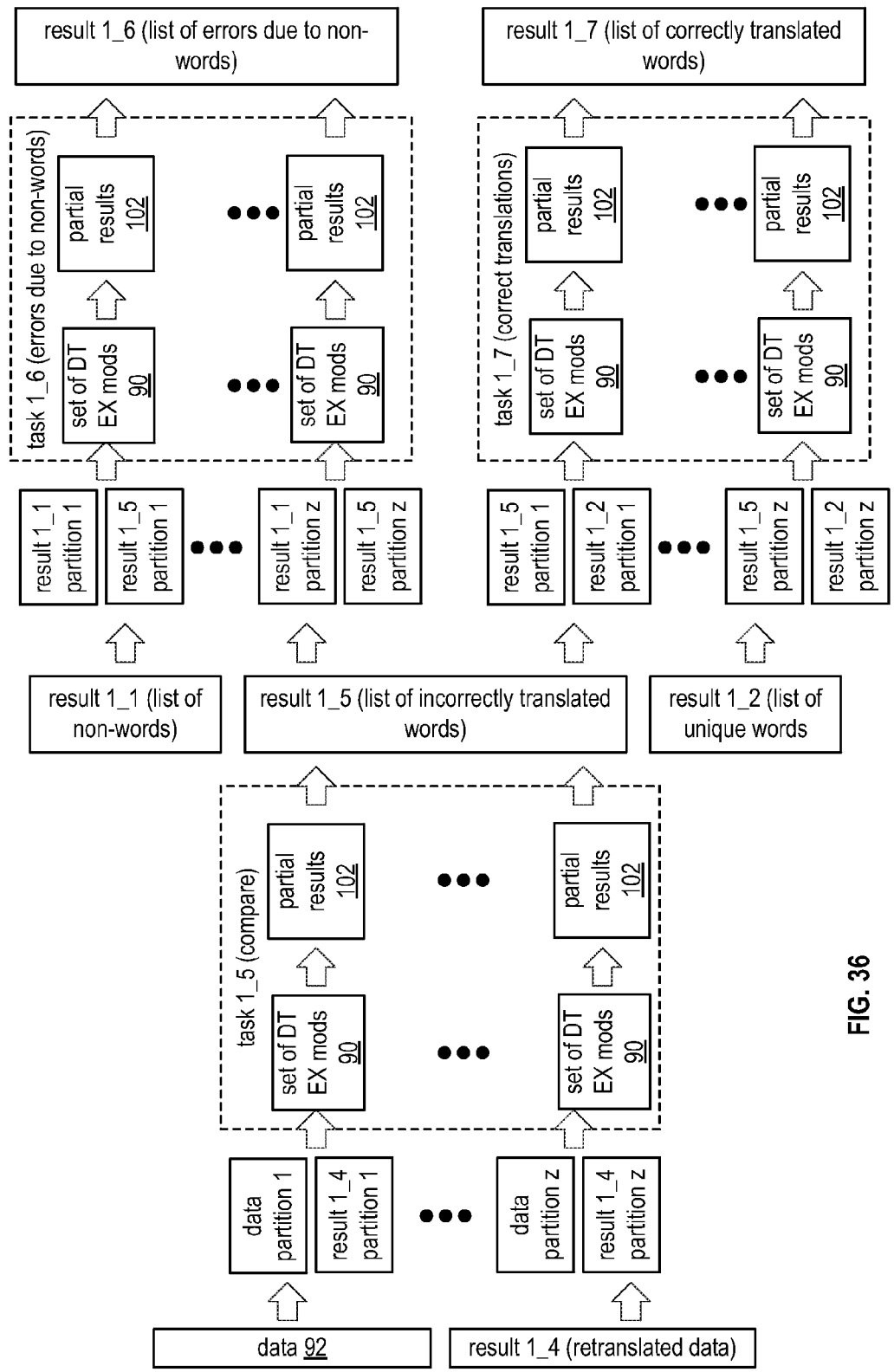

In FIG. 36, a distributed storage and task network (DSTN) module is performing task 1_5 (e.g., compare) on data 92 and retranslated data of FIG. 35. To begin, the DSTN module accesses the data 92 and partitions it into a plurality of partitions in accordance with the DST allocation information or it may use the data partitions of task 1_1 if the partitioning is the same. The DSTN module also accesses the retranslated data from the scratchpad memory, or from the intermediate result memory and decodes it, and partitions it into a plurality of partitions in accordance with the DST allocation information. The number of partitions of the retranslated data corresponds to the number of partitions of the data.

For each pair of partitions (e.g., data partition 1 and retranslated data partition 1), the DSTN identifies a set of its DT execution modules 90 to perform task 1_5 in accordance with the DST allocation information (e.g., DT execution modules 1_1, 2_1, 3_1, 4_1, and 5_1). For each pair of partitions, the allocated set of DT execution modules executes task 1_5 to produce partial results 102 (e.g., 1$^{st}$ through "zth") of a list of incorrectly translated words and/or phrases.

As indicated in the DST allocation information of FIG. 32, DST execution unit 1 is assigned to process the first through "zth" partial results of task 1_5 to produce the fifth intermediate result (R1-5), which is the list of incorrectly translated words and/or phrases. In particular, the processing module of DST execution 1 is engaged to aggregate the first through "zth" partial results of the list of incorrectly translated words and/or phrases to produce the fifth intermediate result. The processing module stores the fifth intermediate result as non-DS error encoded data in the scratchpad memory or in another section of memory of DST execution unit 1.

DST execution unit 1 engages its DST client module to slice grouping based DS error encode the fifth intermediate result. To begin the encoding, the DST client module partitions the fifth intermediate result (R1-5) into a plurality of partitions (e.g., R1-5_1 through R1-5_z). For each partition of the fifth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-5 per the DST allocation information).

As is further shown in FIG. 36, the DSTN module is performing task 1_6 (e.g., translation errors due to non-words) on the list of incorrectly translated words and/or phrases (e.g., the fifth intermediate result R1-5) and the list of non-words (e.g., the first intermediate result R1-1). To begin, the DSTN module accesses the lists and partitions them into a corresponding number of partitions.

For each pair of partitions (e.g., partition R1-1_1 and partition R1-5_1), the DSTN identifies a set of its DT execution modules 90 to perform task 1_6 in accordance with the DST allocation information (e.g., DT execution modules 1_1, 2_1, 3_1, 4_1, and 5_1). For each pair of partitions, the allocated set of DT execution modules executes task 1_6 to produce partial results 102 (e.g., 1$^{st}$ through "zth") of a list of incorrectly translated words and/or phrases due to non-words.

As indicated in the DST allocation information of FIG. 32, DST execution unit 2 is assigned to process the first through "zth" partial results of task 1_6 to produce the sixth intermediate result (R1-6), which is the list of incorrectly translated words and/or phrases due to non-words. In particular, the processing module of DST execution 2 is engaged to aggregate the first through "zth" partial results of the list of incorrectly translated words and/or phrases due to non-words to produce the sixth intermediate result. The processing module stores the sixth intermediate result as non-DS error encoded data in the scratchpad memory or in another section of memory of DST execution unit 2.

DST execution unit 2 engages its DST client module to slice grouping based DS error encode the sixth intermediate result. To begin the encoding, the DST client module partitions the sixth intermediate result (R1-6) into a plurality of partitions (e.g., R1-6_1 through R1-6_z). For each partition of the sixth intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 2-6 per the DST allocation information).

As is still further shown in FIG. 36, the DSTN module is performing task 1_7 (e.g., correctly translated words and/or phrases) on the list of incorrectly translated words and/or phrases (e.g., the fifth intermediate result R1-5) and the list of unique words (e.g., the second intermediate result R1-2). To begin, the DSTN module accesses the lists and partitions them into a corresponding number of partitions.

For each pair of partitions (e.g., partition R1-2_1 and partition R1-5_1), the DSTN identifies a set of its DT execution modules 90 to perform task 1_7 in accordance with the DST allocation information (e.g., DT execution modules 1_2, 2_2, 3_2, 4_2, and 5_2). For each pair of partitions, the allocated set of DT execution modules executes task 1_7 to produce partial results 102 (e.g., 1$^{st}$ through "zth") of a list of correctly translated words and/or phrases.

As indicated in the DST allocation information of FIG. 32, DST execution unit 3 is assigned to process the first through "zth" partial results of task 1_7 to produce the seventh intermediate result (R1-7), which is the list of correctly translated words and/or phrases. In particular, the processing module of DST execution 3 is engaged to aggregate the first through "zth" partial results of the list of correctly translated words and/or phrases to produce the seventh intermediate result. The processing module stores the seventh intermediate result as non-DS error encoded data in the scratchpad memory or in another section of memory of DST execution unit 3.

DST execution unit 3 engages its DST client module to slice grouping based DS error encode the seventh intermediate result. To begin the encoding, the DST client module partitions the seventh intermediate result (R1-7) into a plurality of partitions (e.g., R1-7_1 through R1-7_z). For each partition of the seventh intermediate result, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 3-7 per the DST allocation information).

In FIG. 37, the distributed storage and task network (DSTN) module is performing task 2 (e.g., find specific words and/or phrases) on the data 92. To begin, the DSTN module accesses the data and partitions it into a plurality of partitions 1-z in accordance with the DST allocation information or it may use the data partitions of task 1_1 if the partitioning is the same. For each data partition, the DSTN identifies a set of its DT execution modules 90 to perform task 2 in accordance with the DST allocation information. From data partition to data partition, the set of DT execution modules may be the same, different, or a combination thereof. For the data partitions, the allocated set of DT execution modules executes task 2 to produce partial results 102 (e.g., 1$^{st}$ through "zth") of specific words and/or phrases found in the data partitions.

As indicated in the DST allocation information of FIG. 32, DST execution unit 7 is assigned to process the first through "zth" partial results of task 2 to produce task 2 intermediate result (R2), which is a list of specific words and/or phrases found in the data. The processing module of DST execution 7 is engaged to aggregate the first through "zth" partial results of specific words and/or phrases to produce the task 2 intermediate result. The processing module stores the task 2 intermediate result as non-DS error encoded data in the scratchpad memory or in another section of memory of DST execution unit 7.

DST execution unit 7 engages its DST client module to slice grouping based DS error encode the task 2 intermediate result. To begin the encoding, the DST client module determines whether the list of specific words and/or phrases is of a sufficient size to partition (e.g., greater than a Terra-Byte). If yes, it partitions the task 2 intermediate result (R2) into a plurality of partitions (e.g., R2_1 through R2—m). If the task 2 intermediate result is not of sufficient size to partition, it is not partitioned.

For each partition of the task 2 intermediate result, or for the task 2 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, and 7).

In FIG. 38, the distributed storage and task network (DSTN) module is performing task 3 (e.g., find specific translated words and/or phrases) on the translated data (R1-3). To begin, the DSTN module accesses the translated data (from the scratchpad memory or from the intermediate result memory and decodes it) and partitions it into a plurality of partitions in accordance with the DST allocation information. For each partition, the DSTN identifies a set of its DT execution modules to perform task 3 in accordance with the DST allocation information. From partition to partition, the set of DT execution modules may be the same, different, or a combination thereof. For the partitions, the allocated set of DT execution modules 90 executes task 3 to produce partial results 102 (e.g., $1^{st}$ through "zth") of specific translated words and/or phrases found in the data partitions.

As indicated in the DST allocation information of FIG. 32, DST execution unit 5 is assigned to process the first through "zth" partial results of task 3 to produce task 3 intermediate result (R3), which is a list of specific translated words and/or phrases found in the translated data. In particular, the processing module of DST execution 5 is engaged to aggregate the first through "zth" partial results of specific translated words and/or phrases to produce the task 3 intermediate result. The processing module stores the task 3 intermediate result as non-DS error encoded data in the scratchpad memory or in another section of memory of DST execution unit 7.

DST execution unit 5 engages its DST client module to slice grouping based DS error encode the task 3 intermediate result. To begin the encoding, the DST client module determines whether the list of specific translated words and/or phrases is of a sufficient size to partition (e.g., greater than a Terra-Byte). If yes, it partitions the task 3 intermediate result (R3) into a plurality of partitions (e.g., R3_1 through R3_m). If the task 3 intermediate result is not of sufficient size to partition, it is not partitioned.

For each partition of the task 3 intermediate result, or for the task 3 intermediate results, the DST client module uses the DS error encoding parameters of the data (e.g., DS parameters of data 2, which includes 3/5 decode threshold/pillar width ratio) to produce slice groupings. The slice groupings are stored in the intermediate result memory (e.g., allocated memory in the memories of DST execution units 1-4, 5, and 7).

FIG. 39 is a diagram of an example of combining result information into final results 104 for the example of FIG. 30. In this example, the result information includes the list of specific words and/or phrases found in the data (task 2 intermediate result), the list of specific translated words and/or phrases found in the data (task 3 intermediate result), the list of non-words found in the data (task 1 first intermediate result R1-1), the list of unique words found in the data (task 1 second intermediate result R1-2), the list of translation errors due to non-words (task 1 sixth intermediate result R1-6), and the list of correctly translated words and/or phrases (task 1 seventh intermediate result R1-7). The task distribution module provides the result information to the requesting DST client module as the results 104.

Figure 40A:
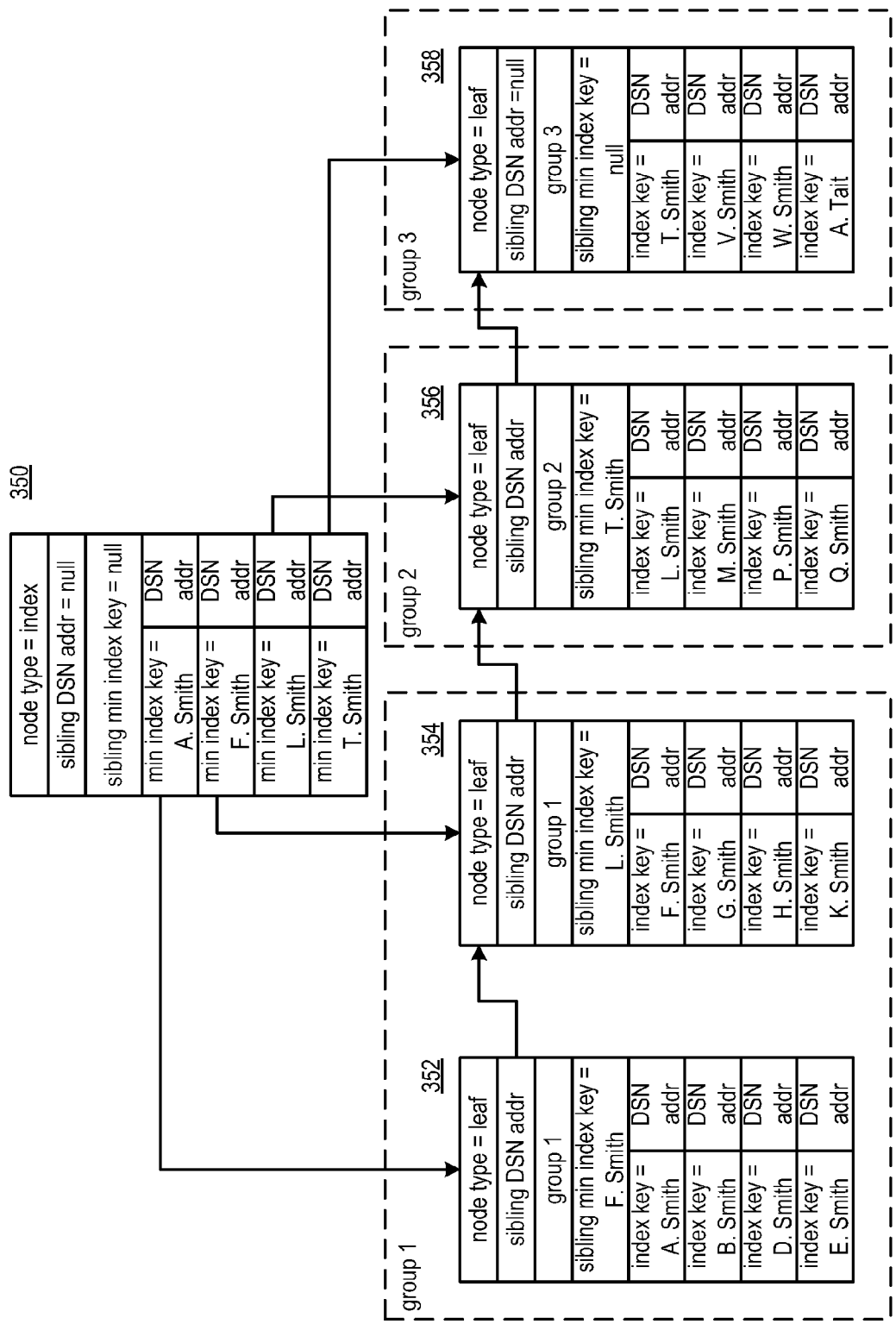
FIG. 40A is a diagram of an embodiment of a structure of a dispersed hierarchical index in accordance with the present invention.

FIG. 40A is a diagram of an embodiment of a structure of a dispersed hierarchical index portion that includes an index node 350 and a plurality of leaf nodes 352, 354, 356, and 358. The index node 350 includes one or more of a node type entry indicating an index node type in a node type field, a null sibling dispersed storage network (DSN) address entry in a sibling DSN address field, a null entry sibling minimum index key entry in a sibling minimum index key field, and a plurality of child node entries in a plurality of child node fields, where each child node field includes a minimum index key field and a DSN address field associated with a corresponding child node. Each leaf node 352-358 includes one or more of a node type entry indicating a leaf node in a node type field, a sibling DSN address entry in a sibling DSN address field, a group entry in a resource group field, a sibling minimum index key entry in a sibling minimum index key field, and a plurality of data object entries in a plurality of data object fields, where each data object field includes an index key field and a corresponding DSN address field.

Each of the plurality of leaf nodes 352-358 are associated with one or more resource groups, where a resource group includes one or more dispersed storage network (DSN) resource elements (e.g., a dispersed storage (DS) processing unit, a DS unit, a set of DS units, a DS module, etc.). For example, resource group 1 includes an association with leaf nodes 352-354, resource group 2 includes an association with leaf node 356, and resource group 3 includes an association with leaf node 358. Each of the plurality of leaf nodes 352-358 are child nodes with respect to the index node 350. Leaf node 354 is a sibling node to leaf node 352, leaf node 356 is a sibling node to leaf node 354, leaf node 358 is a sibling node to leaf node 356, and leaf node 358 has no sibling node.

The plurality of leaf nodes 352-358 includes a corresponding plurality of data object index keys that are ordered in accordance with ordering of attributes of an attribute category where each data object index key of the plurality of data object index keys uniquely identifies one of a plurality of data objects stored in the DSN in accordance with the attribute category. For example, the plurality of leaf nodes 352-358 includes a plurality of data object index keys that includes names of a portion of a phonebook where the plurality of object keys are ordered in accordance with an alphabetical ordering of an alphabetical attribute category. For instance, leaf node 352 includes index keys for phonebook names A. Smith through E. Smith, leaf node 354 includes index keys for phonebook names F. Smith through K. Smith, leaf node 356 includes index keys for phonebook names L. Smith through Q. Smith, and leaf node 358 includes index keys for phonebook names T. Smith through A. Tait. The data object index key identifies the one of the plurality of data objects by an associated DSN address that corresponds to a storage location for the one of the plurality of data objects within a DSN. For example, the associated DSN address is utilized to generate a plurality of sets of slice names associated with a plurality of sets of encoded data slices, where the one of the plurality of data objects is encoded using a dispersed storage error coding function to produce the plurality of sets of encoded data slices.

The dispersed index enables generation of a data index list that identifies data objects having one or more common attributes of an attribute category where indexing of the plurality of data objects is organized in accordance with the ordering of attributes of the attribute category. For example, generation of a data index list includes identifying data objects associated with data object index keys G. Smith, H. Smith, K. Smith, L. Smith, and M. Smith when the one or more common attributes includes identifying data objects associated with data object index keys starting with G. Smith and ending with M. Smith and the attribute category includes alphabetized names. As another example, generation of a data index list includes identifying data objects associated with data object index keys Q. Smith, T. Smith, V. Smith, W. Smith, and A. Tait when the one or more common attributes includes identifying data objects associated with data object index keys starting with Q. Smith and higher (e.g., in an ascending alphabetized ordering) and the attribute category includes alphabetized names. As yet another example, generation of a data index list includes identifying data objects associated with data object index keys F. Smith, E. Smith, D. Smith, B. Smith, and A. Smith when the one or more common attributes includes identifying data objects associated with data object index keys starting with F. Smith and lower (e.g., in a descending alphabetized ordering) and the attribute category includes alphabetized names.

In an example of operation, a request is received to retrieve a data object associated with an index key value of G. Smith. The hierarchical ordered index structure that maps the indexing of the plurality of data objects is searched to identify data object level leaf node 354 of the index structure that includes a data object index key (e.g., G. Smith) corresponding to the data object. A resource group 1 entry corresponding to leaf node 354 is extracted from leaf node 354. The request is forwarded to an access module resource (e.g., a DS processing unit) that corresponds to resource group 1 to facilitate retrieving the data object.

Figure 40B:
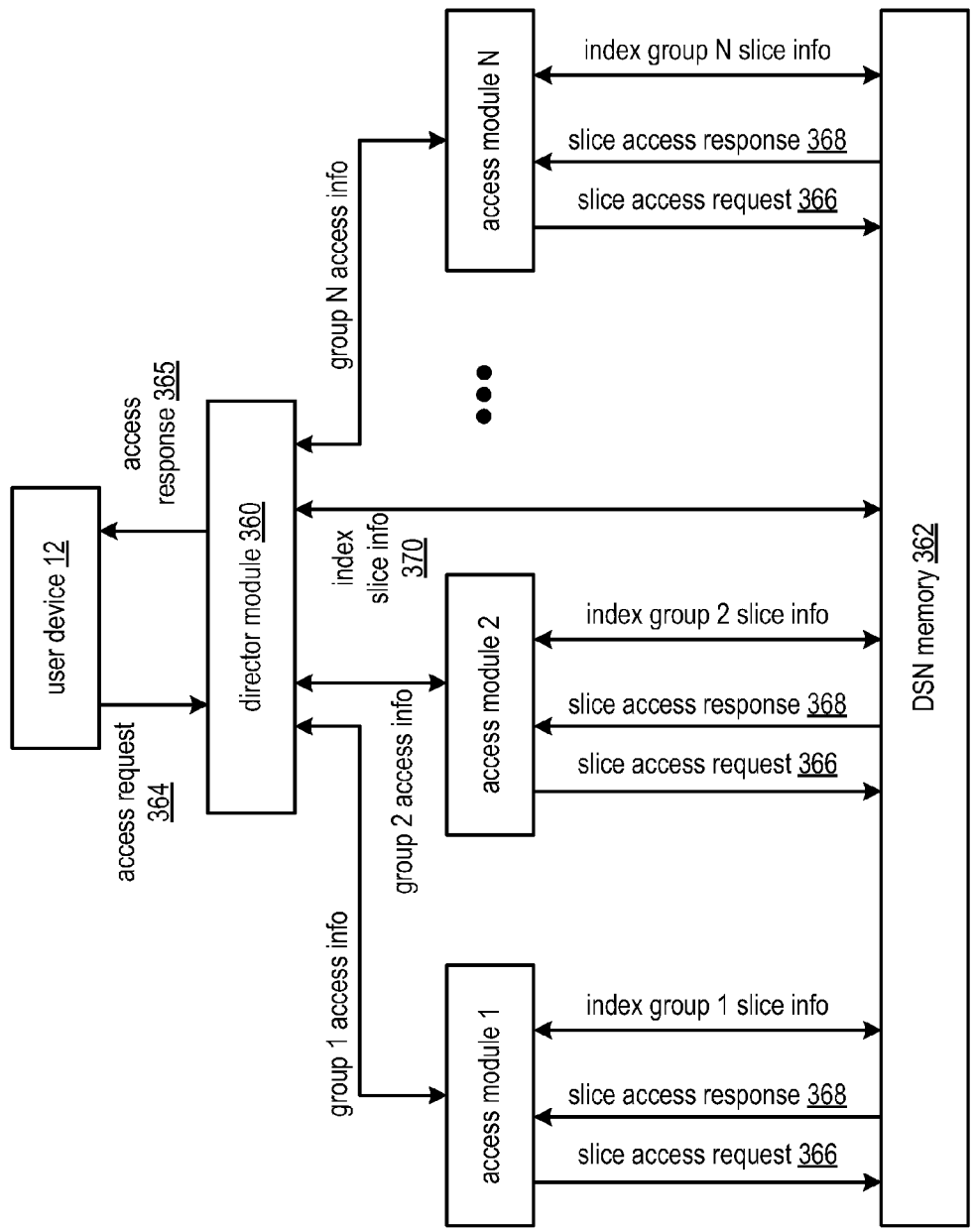
FIG. 40B is a schematic block diagram of an embodiment of a dispersed storage network (DSN) system in accordance with the present invention.

FIG. 40B is a schematic block diagram of an embodiment of a dispersed storage network (DSN) system that includes the user device 12 of FIG. 1, at least one director module 360, a plurality of N access modules, and a dispersed storage network (DSN) memory 362. The director module 360 may be implemented by at least one of the user device 12, an access module, a processing module, the distributed storage and task (DST) processing unit 16 of FIG. 1, and a dispersed storage (DS) processing unit. Each access module may be implemented by at least one of a processing module, a user device, the DST processing unit 16 of FIG. 1, and a DS processing unit.

An example of operation, the user device 12 issues an access request 364 (e.g., write, read) to the director module 360, where the request includes an object name. The director module 360 searches a dispersed hierarchical index stored as one or more sets of encoded index slices in the DSN memory 362 based on the object name to identify a resource group. For example, the director module exchanges index slice information 370 with the DSN memory 362 to identify and retrieve slices of one or more nodes of the dispersed hierarchical index based on a searchable attribute associated with the object name. The director module 360 identifies an access module of the plurality of access modules associated with the identified resource group. The director module 360 issues group access information to the identified access module, where the group access information includes the access request 364. For instance, one of, group 1 access information is sent to access module 1, group 2 access information is sent to access module 2, through group N access information is sent to access module N.

The access module issues slice access requests 366 (e.g., write slice requests, read slice requests) to the DSN memory 362 based on the group access information and receives slice access responses 368 (e.g., write slice responses, read slice responses) from the DSN memory in response to the requests. The access module may update the dispersed hierarchical index by exchanging index group slice information with the DSN memory (e.g., index group 1 slice information is associated with access module 1, index group 2 slice information is associated with access module 2, through group index N slice information is associated with access module N). For example, when writing data, the index group slice information includes write slice requests that includes new encoded index slices associated with a leaf node associated with a data object of the object name (e.g., adding a data object entry to the leaf node that includes an index key associated with the data object and a DSN address utilized to store the data object in the DSN).

Next, the access module sends group access information to the director module 360, where the group access information includes a response based on the slice access responses 368 (e.g., a write acknowledgment, the data object when the data object has been read). The director module 360 issues an access response 365 to the user device 12 based on the group access information received from the access module (e.g., forwards the response generated by the access module).

Figure 40C:
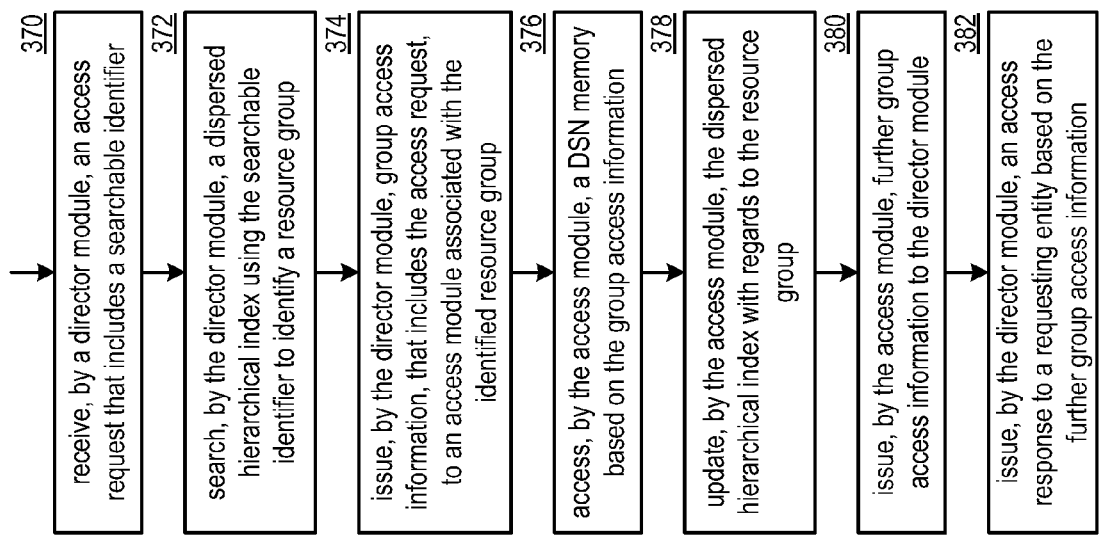
FIG. 40C is a flowchart illustrating an example of processing an access request in accordance with the present invention.

FIG. 40C is a flowchart illustrating an example of processing an access request. The method begins at step 370 where a director module receives an access request that includes a searchable identifier. The searchable identifier includes at least one of an object name, a data type, a user identifier, a data owner identifier, and a data attribute. The method continues at step 372 where the director module searches a dispersed hierarchical index using the searchable identifier to identify a resource group. The dispersed hierarchical index may be stored in one or more of a local memory associated with the director module and a dispersed storage network (DSN) memory. The searching includes identifying a leaf node associated with the searchable identifier (e.g., best match in accordance with a searching approach) and extracting a resource group identifier from the identified leaf node.

The method continues at step 374 where the director module issues group access information to an access module associated with the identified resource group, where the group access information includes the access request. The issuing includes identifying the access module based on the identified resource group (e.g., initiating a query, accessing a list, receiving an identifier of the access module), generating the group access information to include one or more of the access request, contents of the leaf node associated with the searchable identifier, and a DSN address associated with a data object for access, and sending the group access information to the identified access module. The method continues at step 376 where the access module accesses the DSN memory based on the group access information. For example, the access module issues slice access requests to the DSN memory using the DSN address associated with the data object for access, receives slice access responses from the DSN memory, and generates a response based on the slice access responses.

The method continues at step 378 where the access module updates the dispersed hierarchical index with regards to the resource group. The updating includes determining whether to update the dispersed hierarchical index based on the access request and updating the dispersed hierarchical index when the access module determines to perform the update. For example, the access module determines to update the dispersed hierarchical index when the access request includes at least one of a write request and a delete request. For instance, when the access request includes the delete request, the access module updates the dispersed hierarchical index to delete an entry of the leaf node corresponding to the data object, where the entry corresponds to the data object. As another instance, when the access request includes the write request, the access module updates the dispersed hierarchical index to add an entry to the leaf node corresponding to the data object, where the entry corresponds to the data object.

The method continues at step 380 where the access module issues further group access information to the director module. The issuing includes generating the further group access information to include the response based on the slice access responses and sending the further group access information to the director module. The method continues at step 382 where the director module issues an access response to a requesting entity based on the further group access information. The issuing includes generating the access response to include the response based on the slice access responses and sending the access response to the requesting entity.

Figure 41A:
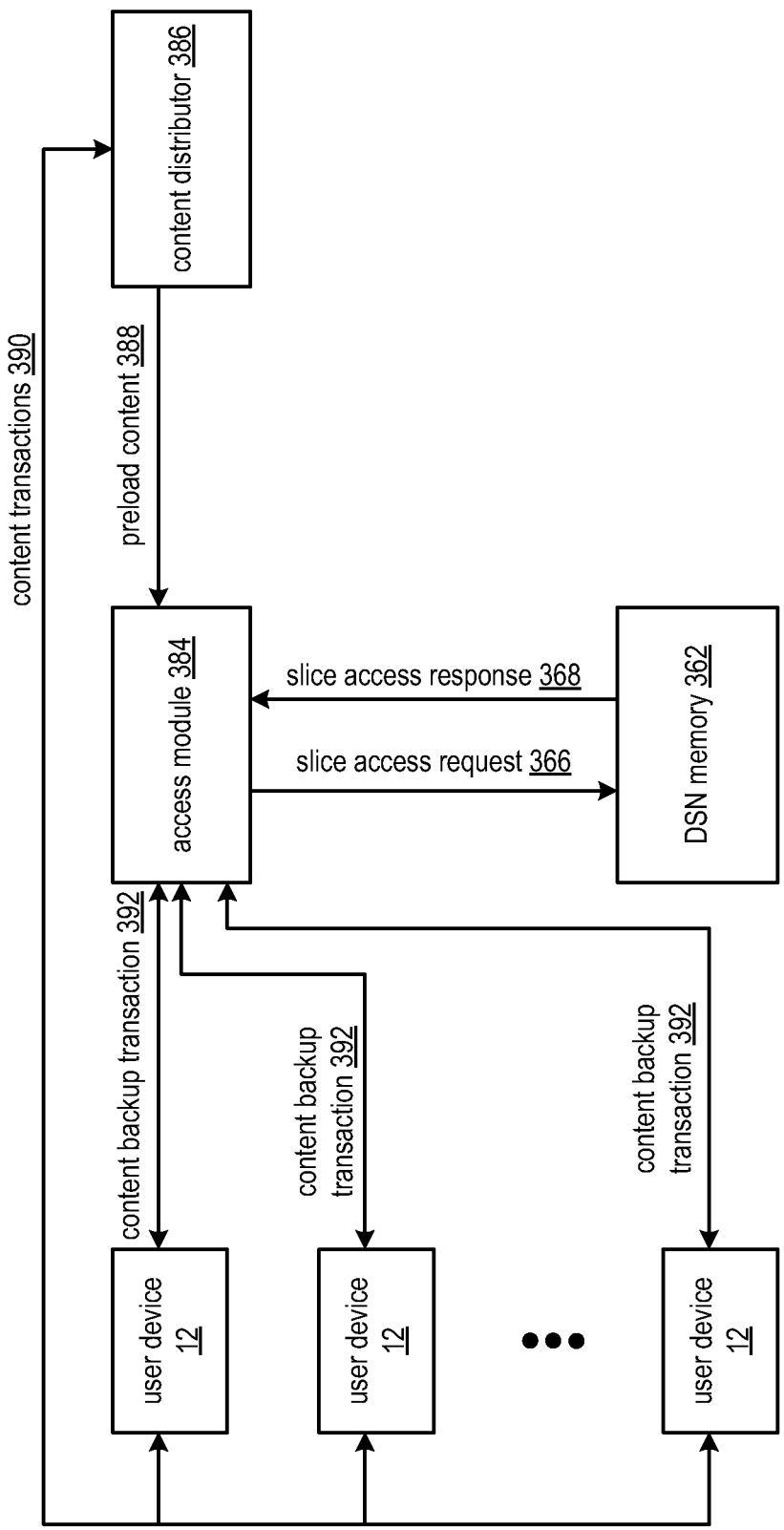
FIG. 41A is a schematic block diagram of another embodiment of a dispersed storage network (DSN) system in accordance with the present invention.

FIG. 41A is a schematic block diagram of another embodiment of a dispersed storage network (DSN) system that includes a plurality of user devices 12 of FIG. 1, an access module 384, the DSN memory 362 of FIG. 40B, and at least one content distributor 386. The system functions to distribute content to one or more of the plurality of user devices 12. For example, the content distributor 386 sends content directly to the one or more of the plurality of user devices 12. As another example, the content distributor 386 sends the content via the access module 384 to the one or more of the plurality of user devices 12.

The content may include one or more of movies, music, books, copyrighted material, data files, and any type of content for controlled access (e.g., license agreement, purchase). When the content distributor 386 sends the content to the one or more of the plurality of user devices 12, the content distributor 386 and a user device 12 exchange content transactions 390. The content transactions 390 includes at least one of a list content request, a list content response, a request to acquire content, and acquired content for download. For example, the user device 12 issues a request to purchase content to the content distributor 386 and the content distributor 386 sends content of the request to purchase content directly to the user device 12.

In an example of operation, the content distributor 386 sends preload content 388 to the access module 384 from time to time, where the preload content 388 includes one or more selections of content distributed by the content distributor 386. For example, the content distributor 386 sends a new movie as the preload content 388 to the access module 384 when the new movie becomes available.

A user device 12 of the plurality of user devices may, from time to time, initiate a backup process with the access module 384 to backup content stored by the user device 12 using the DSN memory 362 as a backup storage facility. The backup process includes a series of steps. In a first step, the access module 384 receives the preload content 388 from at least one content distributor 386. In a second step, the access module 384 generates one or more content identifiers for the preload content 388 to update a content list. In a third step, the access module 384 encodes the preload content 388 using a dispersed storage error coding function to produce one or more pluralities of sets of encoded data slices. In a fourth step, the access module 384 stores the one or more pluralities of sets of encoded data slices in the DSN memory 362. The storing includes issuing slice access requests 366 to the DSN memory 362, where the slice access requests 366 includes the one or more pluralities of sets of encoded data slices. The access module 384 may receive slice access responses 368 indicating status of the storing from the DSN memory 362.

In a fifth step, the access module 384 receives a content backup transaction message 392 from the user device 12, where the content backup transaction message 392 includes a store content request and a content identifier. In a sixth step, the access module 384 determines whether the content identifier is included in the content list. When the content identifier is not included in the content list, in a seventh step, the access module 384 issues another content backup transaction message 392 to the user device 12, where the other content backup message 392 issued to the user device 12 includes a store content response indicating to send the content to the access module 384. In an eighth step, the access module 384 receives the content from the user device 12 (e.g., in yet another content backup transaction message). In a ninth step, the access module 384 facilitates storage of the content in the DSN memory 362 (e.g., the access module encodes the content using the dispersed storage error coding function to produce a plurality of sets of encoded content slices, issues one or more sets of slice access requests 366 to the DSN memory 362 where the one or more sets of slice access requests 366 includes the plurality of sets of encoded content slices). In a tenth step, the access module 384 adds the content identifier to the content list.

Alternatively, after the sixth step, when the content identifier is included in the content list, in an alternate seventh step, the access module 384 issues the other content backup transaction message 392 to the user device 12, where the content backup transaction message 392 issued to the user device 12 includes an alternate store content response indicating to not send the content to the access module 384. In another alternative to acquire content, the content distributor 386 issues another content transaction response to the user device 12 that includes a DSN identifier associated with storage of the content in the DSN memory 362 when the content distributor 386 receives a corresponding content transaction 390 from the user device 12 to purchase the content. Next, the user device 12 issues yet another content backup transaction message 392 to the access module 384 that includes a content restore request, where the content restore request includes the DSN identifier associated with storage of the content. The user device 12 may issue yet another content backup transaction message 392 to the access module 384 when previously stored content within the user device has been lost and recovery is desired. The access module 384 recovers the content from the DSN memory 362 using the DSN identifier (e.g., issuing slice access request 366 that includes read slice requests, receiving slice access responses 368 that includes read slice responses, and decoding received slices to reproduce the content) and sends the content to the user device via a still further content backup transaction message 392. Alternatively, or in addition to, the content backup transactions messages 392 and content transactions 390 from the user device 12 may be subject to an authorization verification to verify that the user device 12 is authorized to hold the content based on an authorization level granted by a corresponding content distributor 386.

Figure 41B:
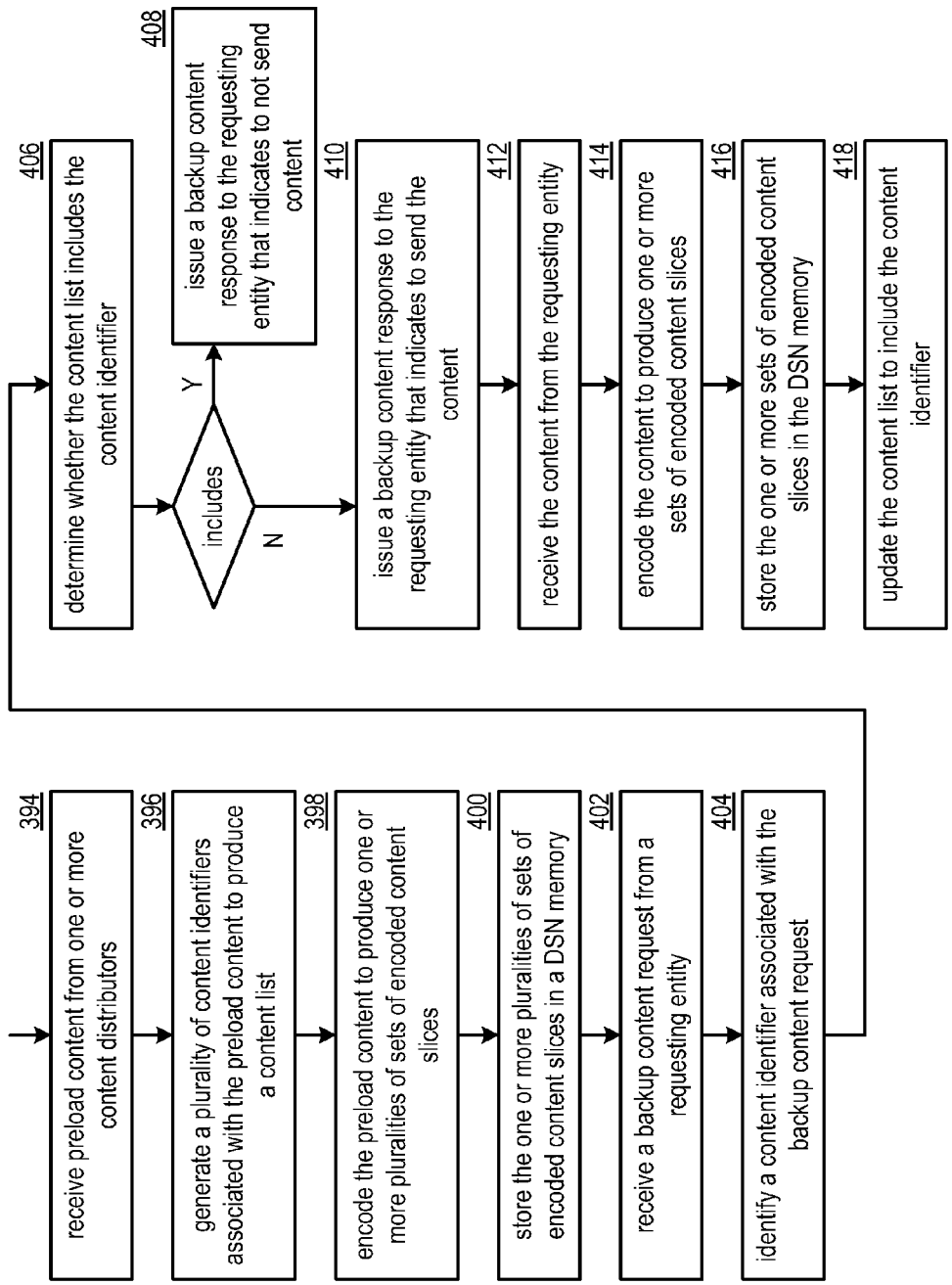
FIG. 41B is a flowchart illustrating an example of backing up data in accordance with the present invention.

FIG. 41B is a flowchart illustrating an example of backing up data. The method begins at step 394 where a processing module (e.g., an access module) receives preload content from one or more content distributors. The receiving includes at least one of receiving an unsolicited content distribution message and receiving a solicited content distribution message based on types of content backup from user devices that has not been preloaded directly from the one or more content distributors. The method continues at step 396 where the processing module generates a plurality of content identifiers associated with the preload content to produce a content list. The generating includes at least one of receiving the content identifier and performing a deterministic function on at least a portion of the content to produce the content identifier. The method continues at step 398 where the processing module encodes the preload content using a dispersed storage error coding function to produce one or more pluralities of sets of encoded content slices. The method continues at step 400 where the processing module stores the one or more pluralities of sets of encoded content slices in a dispersed storage network (DSN) memory.

The method continues at step 402 where the processing module receives a backup content request from a requesting entity (e.g., a user device). The method continues at step 404 where the processing module identifies a content identifier associated with the backup content request. The identifying includes at least one of receiving the content identifier and instructing the requesting entity to perform the deterministic function on the content to produce the content identifier and send the content identifier to the processing module. The method continues at step 406 where the processing module determines whether the content list includes the content identifier. The method branches to step 410 when the content list does not include the content identifier. The method continues to step 408 when the content list includes the content identifier. The method continues at step 408 where the processing module issues a backup content response to the requesting entity that indicates to not send the content when the content list includes the content identifier.

The method continues at step 410 where the processing module issues a backup content response to the requesting entity that indicates to send the content when the content list does not include the content identifier. The indicator may further include instructions to encode the content before sending. The method continues at step 412 where the processing module receives the content from the requesting entity. The method continues at step 414 where the processing module encodes the content using the dispersed storage error coding function to produce one or more sets of encoded content slices when the content has not previously been encoded. The method continues at step 416 where the processing module stores the one or more sets of encoded content slices in the DSN memory (e.g., issue one or more sets of write slice requests that includes the one or more sets of encoded content slices). The method continues at step 418 where the processing module updates the content list to include the content identifier. The updating includes one or more of adding the content identifier to the content list of produce an updated content list and storing the updated content list in one or more of a local memory and the DSN memory.

In an example of content retrieval, the requesting entity issues a retrieve content request (e.g., a restore request) to the processing module that includes a content identifier. The processing module recovers the requested content from the DSN memory (e.g., issue one or more sets of read slice requests) based on the content identifier and sends the recovered content to the requesting entity.

Figure 42A:
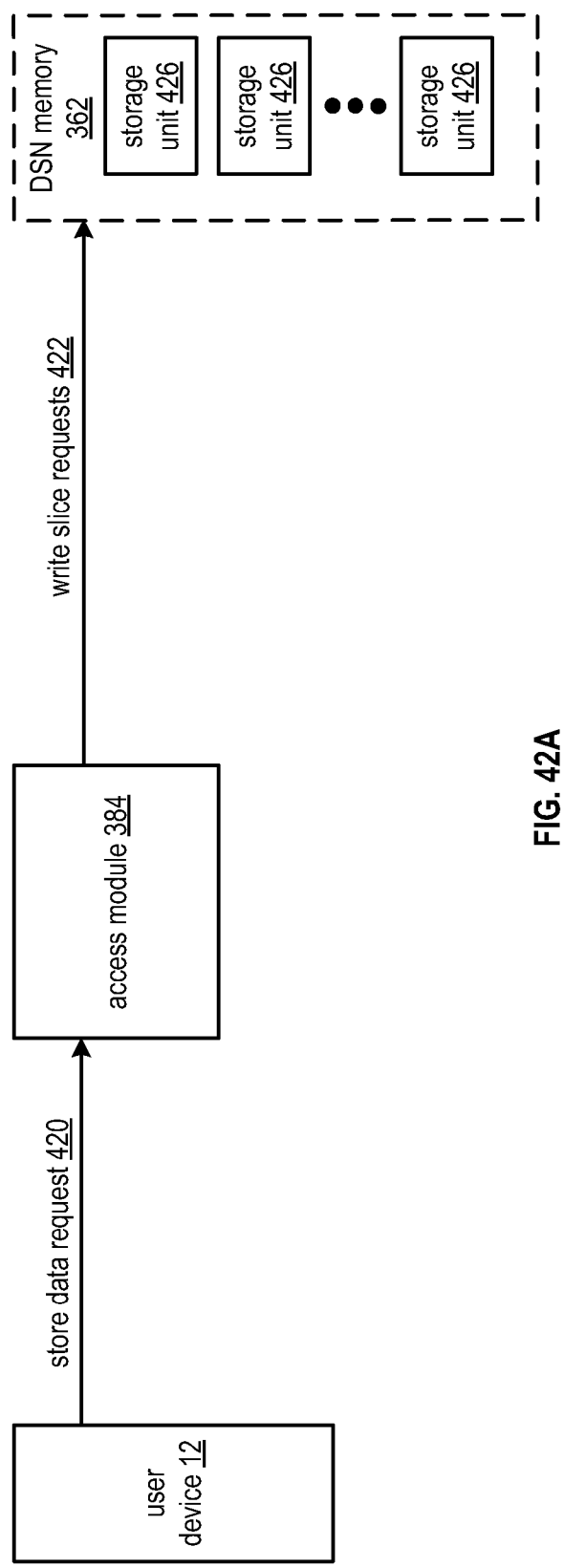
FIG. 42A is a schematic block diagram of another embodiment of a dispersed storage network (DSN) system in accordance with the present invention.

FIG. 42A is a schematic block diagram of another embodiment of a dispersed storage network (DSN) system that includes at least one user device 12 of FIG. 1, at least one access module 384 of FIG. 41A, and the DSN memory 362 of FIG. 40B. The DSN memory 362 includes a plurality of storage units 426. A storage unit 426 may be implemented utilizing the distribute storage and task (DST) execution unit 36 of FIG. 1.

The system is operable to store data from the user device 12 in the DSN memory 362 in accordance with a payment-for-storage scheme. The payment-for-storage scheme includes a processing module (e.g., of one or more of the access module 384 and a storage unit 426 of the plurality of storage units) receiving a storage request (e.g., a store data request 420, a write slice request 422) from a requesting entity (e.g., from the user device 12, from the access module 384), where the storage request includes a storage payment credit and at least one of a data object for storage in the DSN memory 362 and an encoded data slice for storage in the storage unit 426. The storage request may further include a requesting entity identifier and a data owner identifier. The storage payment credit includes at least one of pre-paid payment card information, electronic money information, pre-paid debit card information, credit account information, credit card information, third-party payer information, billing account information, and any electronic payment mechanism to represent storage payment credits.

The processing module determines a storage time period based on the storage payment credit and a storage policy function. The storage policy function includes storage time information (e.g., how long to store, what action to take when time of storage has expired) based on one or more of a payer identity, a type of data for storage, an amount of data for storage, a data identifier of the data for storage, a vault identifier associated with the data for storage, volume discount information, an amount of data previously stored indicator, a credit rating, and a storage time formula. For example, the processing module determines to store the data for one month when the storage payment credit is one dollar and the storage policy function indicates that one month of storage time is allowed for one dollar of payment. As another example, the processing module determines to store the data indefinitely when the storage payment credit is greater than or equal to a minimum storage credit required for infinite storage.

The processing module facilitates storage for the storage request for the storage time period. The processing module detects whether the time period has expired. When the time period has expired, the processing module performs one or more steps of a variety of steps in accordance with the storage policy function. A first of the variety of steps includes facilitating permanent deletion (e.g., of a slice, of a set of slices, of a plurality of sets of slices). A second of the variety of steps includes facilitating changing a reliability performance level (e.g., deleting one or more slices of a set of slices leaving at least a decode threshold number of slices of the set of slices intact). A third of the variety of steps includes facilitating blocking access (e.g., inhibiting reading) to one or more slices. A fourth of the variety of steps includes extending the time period when receiving additional storage payment credit. The receiving may include prompting a payer for the additional storage payment credit.

Figure 42B:
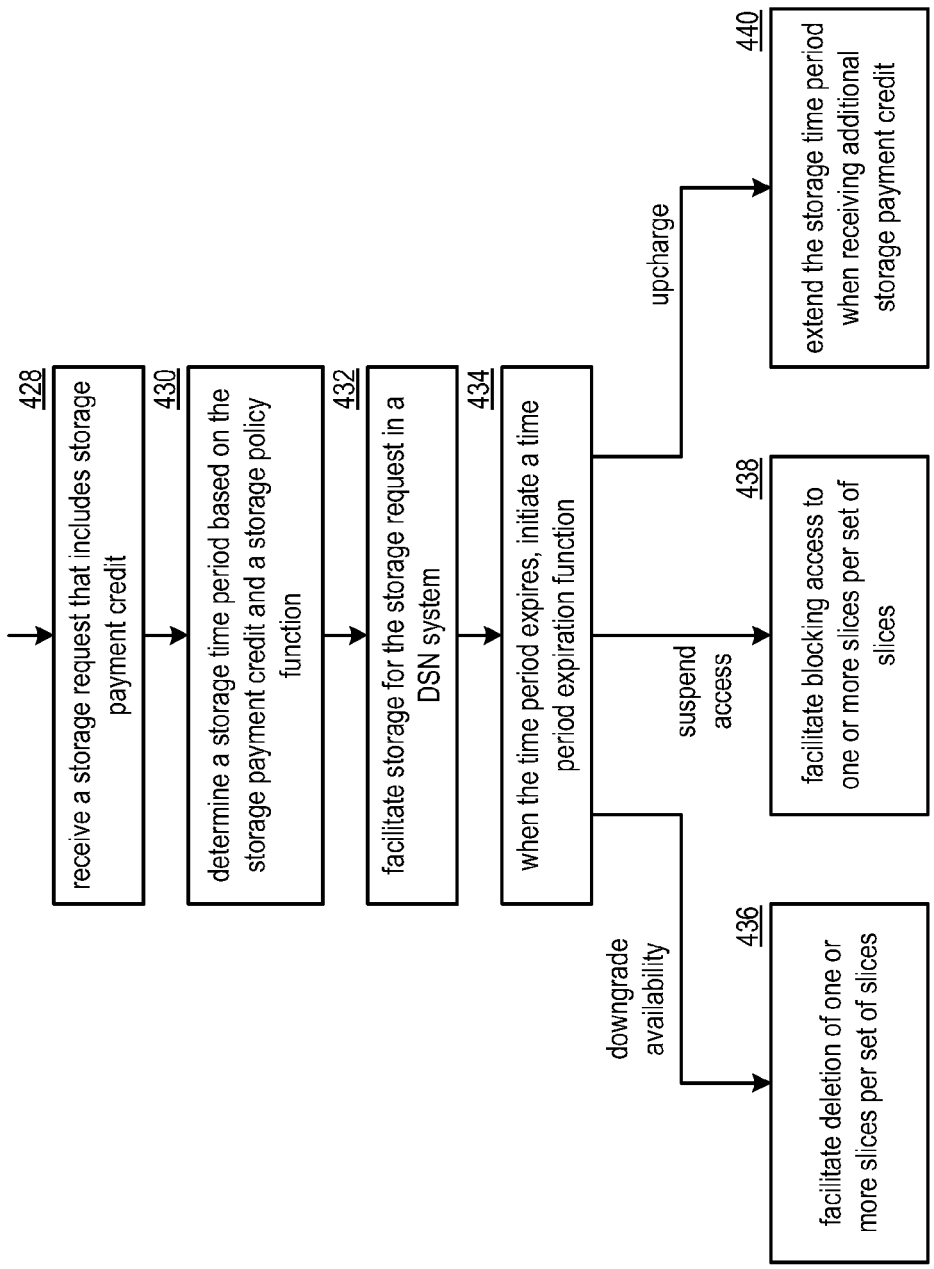
FIG. 42B is a flowchart illustrating an example of storing data in accordance with the present invention.

FIG. 42B is a flowchart illustrating an example of storing data. The method begins at step 428 where a processing module (e.g., of an access module, of a storage unit) receives a storage request that includes storage payment credit. The method continues at step 430 where the processing module determines a storage time period based on the storage payment credit and a storage policy function. The method continues at step 432 where the processing module facilitates storage for the storage request in a dispersed storage network (DSN) system. When storing a data object, the facilitating includes encoding a data object of the request to produce a plurality of sets of slices and issuing write slice requests to the DSN to include the plurality of sets of slices and the storage time period in accordance with the storage policy function.

When storing a slice, the facilitating includes storing the slice in a local memory in accordance with the storage time period.

The method continues at step 434 where the processing module determines whether the time period expires and when the time period expires, the processing module initiates a time period expiration function in accordance with the storage policy function. When the time period function includes downgrading availability (e.g., to provide lowered performance of write availability and/or recovery reliability), the method continues to step 436 where the processing module facilitates deletion of one or more slices per set of slices of the plurality of sets of slices. For example, the processing module deletes all slices of the data object. As another example, the processing module deletes all slices of one or more sets of slices of the data object.

When the time period function includes suspending access, the method continues to step 438 where the processing module facilitates blocking access to one or more slices per set of slices. The facilitating includes at least one of rejecting read requests for slice names affiliated with the one or more slices per set of slices and flagging the one or more slices per set of slices as unavailable. When the time period function includes up charging, the method continues to step 440 where the processing module facilitates extending the storage time period when receiving additional storage payment credit. The scanning includes issuing an additional storage payment credit request to one or more of a requesting entity, a payer, and a data owner, receiving the additional storage payment credit, and extending the storage time period based on the received additional storage payment credit and in accordance with the storage policy function.

FIGS. 43A-43D are schematic block diagrams of an embodiment of a dispersed storage (DS) unit set 442 and associated dispersal parameters 444, 446, 448, and 450 illustrating a rebuilding sequence example where the DS unit set 442 includes a set of DS units 1-8. Each DS unit may be implemented utilizing the distribute storage and task (DST) execution unit 36 of FIG. 1.

Figure 43A:
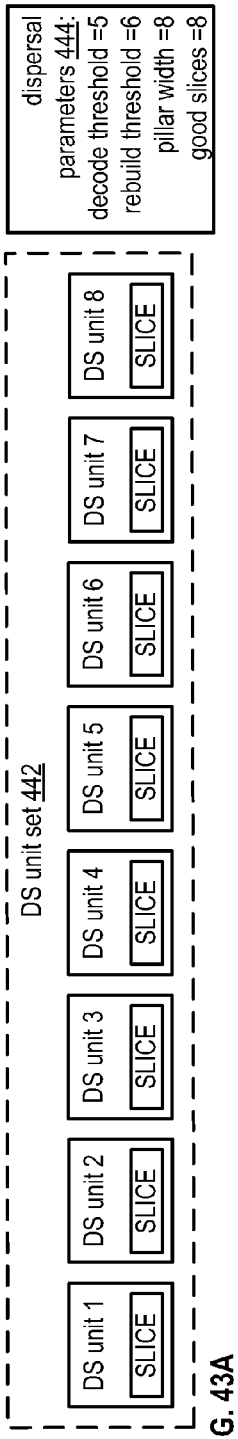
FIGS. 43A-43D are schematic block diagrams of an embodiment of a dispersed storage (DS) unit set and associated dispersal parameters illustrating a rebuilding sequence example in accordance with the present invention.

FIG. 43A illustrates a data segment that has been encoded to produce a set of slices that are stored in the set of DS units 1-8. Associated dispersal parameters 444 includes a decode threshold of 5, a rebuild threshold of 6, a pillar width of 8, and all eight slices of the set of slices are good (e.g., available with valid integrity). As such, a minimum of 5 slices are required to recover the data segment by decoding any combination of a decode threshold number of slices of the set of slices. The rebuild threshold indicates a number of good slices threshold (e.g., when the number of good slices is less than or equal to the rebuilt threshold number) where a rebuilding process is activated to rebuild one or more slices associated with one or more storage errors.

Figure 43B:
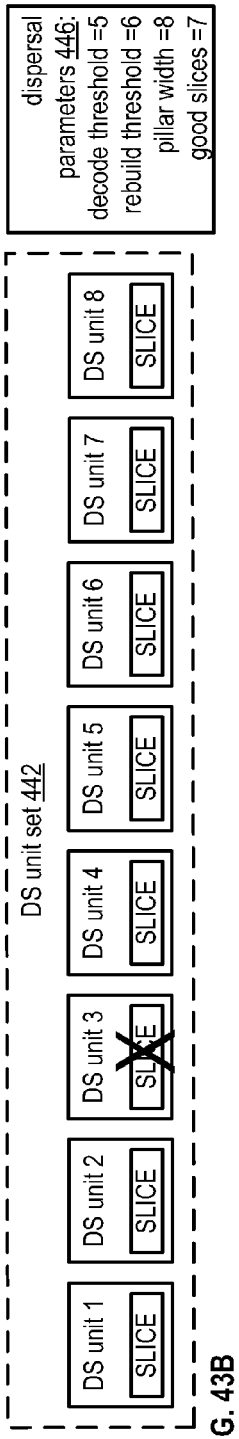

FIG. 43B illustrates a storage error associated with a third slice of the set of slices thus lowering the number of good slices to 7 from 8. A determination is made as to whether the number of good slices is less than or equal to the rebuild threshold of the dispersal parameters 446. Rebuilding is not initiated yet since the number of good slices (e.g., 7) is greater than the rebuild threshold (e.g., 6).

Figure 43C:
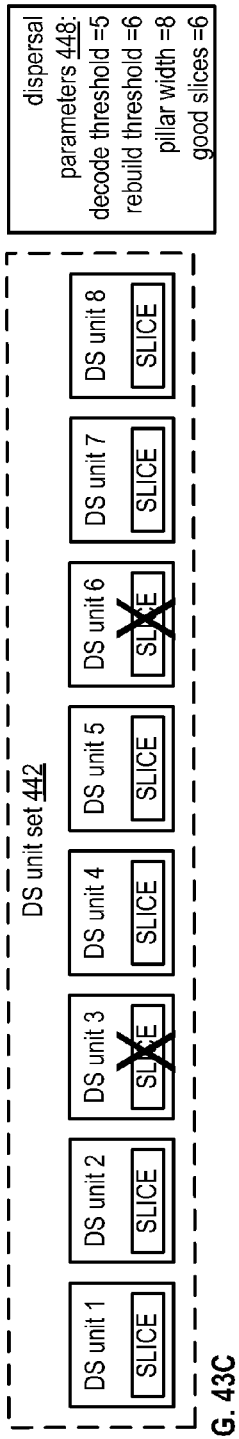

FIG. 43C illustrates when another storage error is detected, where the other storage error is associated with a sixth slice of the set of slices lowering the number of good slices to 6 from 8. A determination is made as to whether the number of good slices is less than or equal to the rebuilt threshold of the dispersal parameters 448. Rebuilding is initiated since the number of good slices (e.g., 6) is equal to the rebuild threshold (e.g., 6).

Figure 43D:
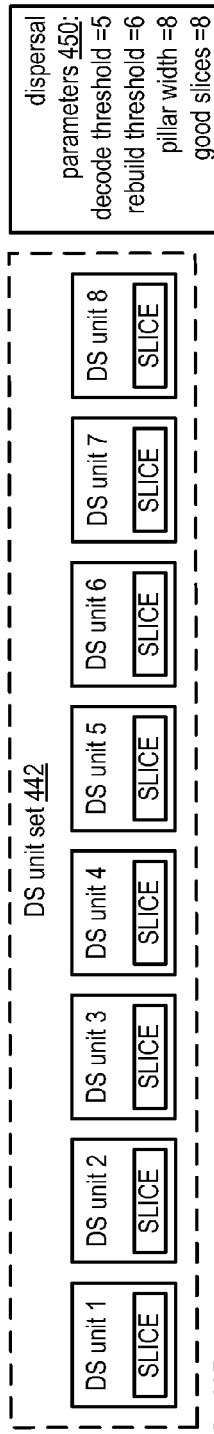

FIG. 43D illustrates resolving the storage errors associated with the third slice and the sixth slice such that all eight slices of the set of slices are good slices after rebuilding in accordance with the dispersal parameters 450. Alternatively, the rebuilding may be initiated when a number of storage errors of the set of slices is greater than or equal to an alternate rebuild threshold when the rebuild threshold is represented as a number of storage errors threshold. For example, the rebuilding is initiated when the number of storage errors is 2 when the alternate rebuild threshold is 2 storage errors.

Figure 43E:
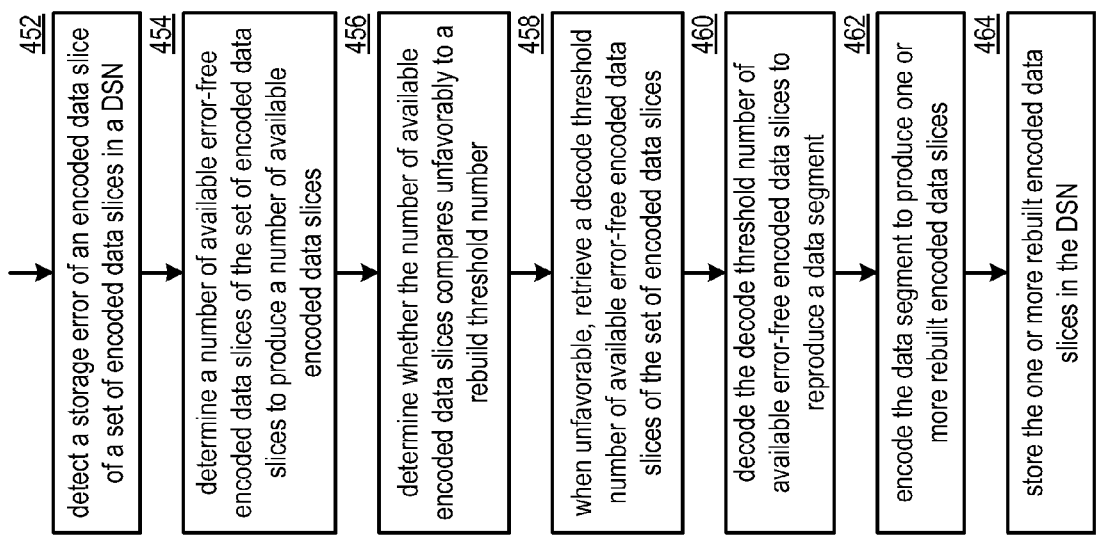
FIG. 43E is a flowchart illustrating an example of rebuilding an encoded data slice in accordance with the present invention.

FIG. 43E is a flowchart illustrating an example of rebuilding an encoded data slice. The method begins at step 452 where a processing module (e.g., of an access module) detects a storage error of an encoded data slice of a set of encoded data slices in a dispersed storage network (DSN). The storage error includes at least one of a missing encoded data slice and an integrity value of the encoded data slice comparing unfavorably to a stored integrity value for the encoded data slice. The detecting includes one or more of receiving an error message and performing a slice scanning function (e.g., issue list requests to a set of storage units, receive a set of list responses, compare the list responses to identify the storage error). The method continues at step 454 where the processing module determines a number of available error-free encoded data slices of the set of encoded data slices to produce a number of available encoded data slices. The determining includes one or more of initiating a slice integrity query, comparing slice scanning results, and receiving an error message.

The method continues at step 456 where the processing module determines whether the number of available encoded data slices compares unfavorably to a rebuild threshold number. The processing module determines that the comparison is unfavorable when the number of available encoded data slices is less than or equal to the rebuild threshold number. When the comparison is unfavorable, the method continues at step 458 where the processing module retrieves a decode threshold number of available error-free encoded data slices of the set of encoded data slices. The retrieving includes issuing at least a decode threshold number of read slice requests to a corresponding at least a decode threshold number of storage units of the set of storage units and receiving the decode threshold number of available error-free encoded data slices.

The method continues at step 460 where the processing module decodes the decode threshold number of available error-free encoded data slices to reproduce a data segment. The decoding includes decoding the decode threshold number of available error-free encoded data slices using a dispersed storage error coding function to reproduce the data segment. The method continues at step 462 where the processing module encodes the data segment to produce one or more rebuilt encoded data slices. The encoding includes encoding the data segment using the dispersed storage error coding function to produce the one or more rebuilt encoded data slices. The method continues at step 464 where the processing module stores the one or more rebuilt encoded data slices in the DSN. The storing includes, for each rebuilt encoded data slice, issuing a write slice request to a corresponding storage unit of the set of storage units.

FIGS. 44A, C, D are schematic block diagrams of another embodiment of a dispersed storage network (DSN) illustrating an example of adjusting dispersed storage network traffic due to rebuilding. The DSN includes a plurality of distributed storage and task (DST) client modules A-Z, the network 24 of FIG. 1, the distributed storage and task network (DSTN) module 22 of FIG. 1, a performance module 470, and a rebuilding module 472. The DST client modules A-Z may be implemented using the DST client module 34 of FIG. 1. The DSTN module 22 includes a set of DST execution units 1-8. Each DST execution unit may be implemented utilizing the DST execution unit 36 of FIG. 1. Alternatively, the DSTN module 22 includes any number of sets of DST execution unit sets. Hereafter, the DST execution units 1-8 may be referred to interchangeably as storage units 1-8. The performance module 470 and the rebuilding module 472 may be implemented utilizing one or more of the DST client module 34 of FIG. 1, the DST execution unit 36 of FIG. 1, a server, a user device, the distributed storage and task network (DSTN) managing unit 18 of FIG. 1, and the DST integrity processing unit 20 of FIG. 1.

A computer readable storage medium of the DSN includes one or more memory sections. Each memory section stores operational instructions. Each of the DST client modules A-Z, the DST execution units 1-8, a performance module 470, and the rebuilding module 472 includes one or more processing modules of one or more computing devices of the DSN. The one or more processing modules execute the operational instructions stored by the one or more memory sections. As a specific example, a first memory section stores operational instructions that are executed by the one or more processing modules of the performance module 470 to cause the one or more computing devices to perform functions of the performance module 470. As another specific example, a second memory section stores operational instructions that are executed by the one or more processing modules of the performance module 470 to cause the one or more computing devices to perform further functions of the performance module 470. As yet another specific example, the second memory section stores operational instructions that are executed by the one or more processing modules of the rebuilding module 472 to cause the one or more computing devices to perform functions of the rebuilding module 472. As a still further specific example, a third memory section stores operational instructions that are executed by the one or more processing modules of the rebuilding module 472 to cause the one or more computing devices to perform further functions of the rebuilding module 472. As yet a still further specific example, one or more of the first, second, and third memory sections stores operational instructions that are executed by the one or more processing modules of one or more of the DST execution units 1-8 to cause the one or more computing devices to perform any function associated with the performance module 470 and/or the rebuilding module 472.

The DSN is operable to access data stored in the DSTN module 22, to adjust DSN traffic levels, and to rebuild the stored data. As a specific example of accessing the data, the DST client modules A-Z exchanges, via the network 24, access messages A-Z to the DSTN module 22 as DSTN messages 1-8. Each access message includes one or more of a write slice request, a write slice response, a read slice request, a read slice response, a list slice request, a list slice response, a delete slice request, a delete slice response, and network traffic information 478. Each DSTN message includes one or more of the access messages, the network traffic information 478, and rebuilding messages 476. For example, DST client module A dispersed storage error encodes the data in accordance with dispersal parameters 474 to produce a plurality of sets of encoded data slices, where a set of encoded data slices includes encoded data slices 1-1, 1-2, 1-3, through 1-8; generates a set of access messages A that includes a set of DSTN messages 1-8, where the set of DSTN messages 1-8 includes a set of write slice requests and where the set of write slice requests includes the plurality of sets of encoded data slices; and sends, via the network 24, the set of write slice requests to the set of DST execution units 1-8. The set of DST execution units 1-8 stores the plurality of sets of encoded data slices in local memory that is associated with the DST execution units 1-8.

The dispersal parameters 474 includes one or more of a decode threshold, a rebuild threshold, a pillar width, and may further indicate a number of good encoded data slices of a set of encoded data slices. Each set of encoded data slices includes the pillar width number of encoded data slices. A data segment that was encoded to produce a set of encoded data slices may be recovered when at least the decode threshold number of encoded data slices (e.g., good encoded data slices) are available from the set of encoded data slices. The rebuild threshold is greater than or equal to the decode threshold and less than or equal to the pillar width minus 1.

As a specific example of rebuilding the data, the rebuilding module 472 exchanges the rebuilding messages 476 with the set of DST execution units 1-8. The rebuilding messages 476 includes one or more of a list slice message (e.g., a list slice request, a list slice response, a list slice digest request, a list slice digest response), a read slice message (e.g., a read slice request, a read slice response), and a write rebuilt slice message (e.g., a write slice request, a write slice response). For the example, the rebuilding module 472 issues, via the network 24, rebuilding messages 476 that includes a set of DSTN messages 1-8 that includes a set of list slice requests 1-8 to the set of DST execution units 1-8; receives rebuilding messages 476 that includes other DSTN messages 1-8 that includes a set of list slice responses; and identifies an encoded data slice for rebuilding by detecting a storage error based on at least some of the set of list slice responses. For instance, the rebuilding module 472 compares list slice responses from the set of DST execution units 1-8 and identifies encoded data slice 1-3 as the encoded data slice for rebuilding when the list slice response 3 from the DST execution unit 3 indicates that encoded data slice 1-3 is missing and/or corrupted.

Having identified the encoded data slice for rebuilding, the rebuilding module 472 indicates encoded data slice 1-3 as a flagged encoded data slice for rebuilding. The indicating includes one or more of updating a local list of flagged encoded data slices; issuing a rebuilding request to another rebuilding module, where the rebuilding request identifies encoded data slice 1-3 as the flagged encoded data slice; and facilitating initiation of rebuilding of one or more flagged encoded data slices of a common set of encoded data slices based on rebuilding criteria.

The rebuilding criteria includes one or more of the rebuilding threshold, which triggers a rebuilding process for one of the flagged encoded data slices; a wait time for a storage unit storing a flagged encoded data slice to come back online (e.g., detection hysteresis); and a rebuilding queue priority of the flagged encoded data slices. For example, the rebuilding module 472 initiates the rebuilding when a number of available encoded data slices of the common set of encoded data slices is less than or equal to the rebuilding threshold. For instance, the rebuilding module does not initiate the rebuilding when the number of available encoded data slices of the common set of encoded data slices is 7 and the rebuild threshold is 6. As another instance, the rebuilding module initiates the rebuilding when the number of available encoded data slices of the common set of encoded data slices is 6 and the rebuild threshold is 6.

The network traffic information 478 includes an indicator of a level of network traffic of the DSN. The network traffic of the DSN includes a portion of the network traffic due to the rebuilding of the flagged encoded data slices and a portion due to the accessing of the data. The indicators of the portion of the network traffic due to the rebuilding of the flagged encoded data slices based on the exchanging of the rebuilding messages 476 includes one or more of a rebuilding message latency level, a rebuilding message request volume level, a system level rebuilding message response latency (e.g., DST client module C receives a request to rebuild the data object), a system level rebuilding message volume level, and storage error information (e.g., statistics associated with a failure of writing and/or reading). The indicators of the portion of the network traffic due to the accessing of the data based on the exchanging of the access messages A-Z includes one or more of a data access request latency level, a data access request volume level, a system level access request response latency level (e.g., latency of processing a request to store data where the request is received by DST client module Z), and a system level access request volume level (e.g., volume of all requests to access data received by the DST client modules A-Z).

FIG. 44A illustrates initial steps of the example of the adjusting of the DSN traffic due to rebuilding where the performance module 470 monitors the network traffic within the DSN. The monitoring of the network traffic includes one or more of monitoring the latency in responding to the data access requests, monitoring the volume of the data access request, monitoring latency in responding to the system level access request, and monitoring the volume of the system level access requests. As a specific example, the performance module 470 issues, via the network 24, a network traffic information request to the DST client modules A-Z and the set of DST execution units 1-8 and receives the network traffic information 478 from at least some of the DST client modules A-Z and the set of DST execution units 1-8.

Having monitored the network traffic within the DSN, the performance module 470 adjusts the portion of the network traffic due to the rebuilding network traffic when the network traffic compares unfavorably to a desired network traffic function. The desired network traffic function includes one or more of a threshold level of an indicator of the network traffic and a trigger point of a curve of the indicators of the network traffic. When the network traffic compares unfavorably to the desired network traffic function, the performance module 470 reduces the portion of the network traffic due to the rebuilding flagged encoded data slices by at least one of changing the rebuilding criteria for the flagged encoded data slices and changing rebuilding network traffic protocols. The comparing of the network traffic to the desired network traffic function is discussed in greater detail with reference to FIG. 44B.

FIG. 44B is a timing diagram illustrating an example of adjusting rebuilding network traffic, where the desired network traffic function includes the curve versus time 486. As a specific example, the desired network traffic function includes a maximum desired data access latency level 480 to which a curve of data access latency 482 is compared. A curve trigger point is reached when an unfavorable comparison to the curve of the desired network traffic function occurs. For instance, the data access latency 482 reaches the maximum desired data access latency level 480.

When the curve trigger point is reached, the portion of the network traffic due to the rebuilding of the flagged encoded data slices is reduced. For instance, the rebuilding threshold is reduced when the curve trigger point is detected at time t1. When the data access latency 482 continues to climb, the performance module 470 of FIG. 44A increasingly changes the at least one of the rebuilding criteria and the rebuilding network traffic protocols as the network traffic increases the unfavorable comparison to the curve of the desired network traffic function.

After reducing the portion of the network traffic due to rebuilding the flagged encoded data slices, the performance module 470 continues to monitor the network traffic within the DSN. When the network traffic compares favorably to the desired network traffic function, the performance module 470 shall undo the changing of the at least one of the rebuilding criteria and the rebuilding network traffic 484 protocols. For example, when the data access latency 482 is detected to fall below the maximum desired data access latency level 480 at time t2, the performance module 470 allows the portion of the network traffic associated with the rebuilding of the flagged encoded data slices to rise. For instance, the performance module 470 increases the rebuilding threshold. When the network traffic continues to compare unfavorably to the desired network traffic function, the performance module 470 further reduces the portion of the network traffic due to the rebuilding of the flagged encoded data slices by at least one of further changing the rebuilding criteria and further changing the rebuilding network traffic protocols.

FIG. 44C illustrates further steps of the example of the adjusting of the DSN traffic due to rebuilding. As a specific example, the performance module 470 generates rebuilding information 490 when the network traffic compares unfavorably to the desired network traffic function and the performance module 470 reduces the portion of the network traffic due to the rebuilding flagged encoded data slices by the at least one of the changing the rebuilding criteria for the flagged encoded data slices and the changing of the rebuilding network traffic protocols. The rebuilding information 490 includes one or more of the rebuilding criteria, the rebuilding network traffic protocols, and the dispersal parameters 488. Having generated the rebuilding information 490, the performance module 470 sends, via the network 24, the rebuilding information 490 to one or more of the rebuilding module 472 and the set of DST execution units 1-8.

As a specific example of the changing the rebuilding criteria, the performance module 470 decreases the rebuilding threshold (e.g., the rebuilding threshold triggers the rebuilding process for one of the flagged encoded data slices) such that more encoded data slices of a common set of encoded data slices are simultaneously rebuilt thus lowering the portion of the network traffic associated with the rebuilding of the flagged encoded data slices. As another specific example, the performance module 470 increases a wait time for a DST execution unit storing a flagged encoded data slice of the flagged encoded data slices to come back on line. As yet another example, the performance module 470 adjusts rebuild queue priorities of the flagged encoded data slices. For instance, the performance module 470 increases priority of rebuilding for a particular flagged encoded data slice and lowers priority of rebuilding for another particular flagged encoded data slice based on an association of encoded data slices and priorities.

After reducing the portion of the network traffic due to rebuilding flagged encoded data slices (e.g., by lowering the rebuild threshold), the performance module 470 continues to monitor the network traffic within the DSN. When the network traffic compares favorably to the desired network traffic function, the performance module 470 undoes the changing of the at least one of the rebuilding criteria and the rebuilding network traffic protocols. For example, the performance module 470 raises the rebuild threshold after lowering the rebuild threshold. For instance, the performance module 470 raises the rebuild threshold from 6 to 7. When the network traffic continues to compare unfavorably to the desired network traffic function, the performance module 470 further reduces the portion of the network traffic due to the rebuilding of the flagged encoded data slices by at least one of further changing the rebuilding criteria and further changing the rebuilding network traffic protocols. The changing of the rebuilding network traffic protocols is discussed in greater detail with reference to FIG. 44D.

FIG. 44D illustrates final steps of the example of the adjusting of the DSN traffic due to rebuilding. As an example of the rebuilding of the flagged encoded data slices, for the flagged encoded data slice 1-3 of the corresponding set of encoded data slices 1-1 through 1-8, the rebuilding module 472 receives, via the network 24, read slice responses 494 from at least some of the set of DST execution units 1-8 in response to read slice requests, where the read slice responses 494 includes at least some of read slice responses 1, 2, 5, 6, and 7 from DST execution units 1, 2, 5, 6, and 7. Having received the read slice responses 494, the rebuilding module 472 dispersed storage error decodes a decode threshold number of encoded data slices from the received read slice responses 494 in accordance with the dispersal parameters 492 to reproduce a data segment corresponding to the set of encoded data slices 1-1 through 1-8.

Having reproduced the data segment, the rebuilding module 472 dispersed storage error encodes the reproduced data segment to produce a rebuilt set of encoded data slices 1-1 through 1-8 that includes a rebuilt encoded data slice 3. Having produced the rebuilt encoded data slice 1-3, the rebuilding module 472 issues, via the network 24, a write rebuilt slice request 3 to the DST execution unit 3, where the write rebuilt slice request 3 includes the rebuilt encoded data slice 1-3. The DST execution unit 3 stores the rebuilt encoded data slice 1-3.

As a specific example of the adjusting of the DSN traffic by changing the rebuilding network traffic protocols, the rebuilding module 472 bundles rebuilding requests to a storage unit for multiple ones of the flagged encoded data slices. The rebuilding requests includes one or more of the read slice requests and the write rebuilt slice request. For instance, the rebuilding module 472 issues a single write rebuilt slice request to the DST execution unit 3 when the flagged encoded data slices includes the encoded data slice 1-3 and another encoded data slice x-3 of another set of encoded data slices, where the single write rebuilt slice request includes the rebuilt encoded data slice 1-3 and a rebuilt encoded data slice x-3.

As another specific example of the adjusting of the DSN traffic by changing the rebuilding network traffic protocols, the rebuilding module 472 serializes transmission of a set of rebuilding requests to storage units regarding one of the flagged encoded data slices. For instance, the rebuilding module 472 generates a set of read slice requests to read the set of encoded data slices 1-1 through 1-8 and issues, serially with respect to time, each of the read slice requests to the set of DST execution units 1-8 (e.g., except for DST execution unit 3).

As yet another specific example of the adjusting of the DSN traffic by changing the rebuilding network traffic protocols, the rebuilding module 472 assigns an individual response timeslot to each of multiple storage units for individually responding to a rebuild request regarding one or more of the flagged encoded data slices. For example, the rebuilding module 472 generates the set of read slice requests to include a timeslot identifier such that each of the DST execution units issues a corresponding read slice response within an assigned timeslot associated with a timeslot identifier.

FIG. 44E is a flowchart illustrating an example of adjusting dispersed storage network (DSN) traffic due to rebuilding. The method begins at step 500 where a processing module (e.g., of a performance module of a DSN, of a rebuilding module of the DSN) monitors network traffic within the DSN. As a specific example, the processing module monitors latency in responding to data access requests (e.g., for typical data access, for access with regards to rebuilding). As another specific example, the processing module monitors volume of the data access requests. As yet another specific example, the processing module monitors latency in responding to system level access requests. As a still further specific example, the processing module monitors volume of the system level access requests.

When the network traffic compares unfavorably to a desired network traffic function, the method continues at step 502 where the processing module reduces a portion of the network traffic due to rebuilding flagged encoded data slices by at least one of changing rebuilding criteria for the flagged encoded data slices and changing rebuilding network traffic protocols. As a specific example of the changing the rebuilding criteria, the processing module decreases a rebuilding threshold which triggers a rebuilding process for one of the flagged encoded data slices. As another specific example, the processing module increases a wait time for a storage unit storing a flagged encoded data slice of the flagged encoded data slices to come back on line. As yet another specific example, the processing module adjusts rebuild queue priorities of the flagged encoded data slices.

As a specific example of the changing the rebuilding network traffic protocols, the processing module bundles rebuilding requests to a storage unit for multiple ones of the flagged encoded data slices. As another specific example, the processing module serializes transmission of a set of rebuilding requests to storage units regarding one of the flagged encoded data slices. As yet another specific example, the processing module assigns an individual response timeslot to each of multiple storage units for individually responding to a rebuild request regarding one or more of the flagged encoded data slices.

After reducing the portion of the network traffic due to rebuilding flagged encoded data slices, the method continues at step 504 where the processing module continues monitoring the network traffic within the DSN. When the network traffic compares favorably to the desired network traffic function, the method continues at step 506 where the processing module undoes the changing of the at least one of the rebuilding criteria and the rebuilding network traffic protocols.

When the network traffic continues to compare unfavorably to the desired network traffic function, the method continues at step 508 where the processing module further reduces the portion of the network traffic due to the rebuilding of the flagged encoded data slices by at least one of further changing the rebuilding criteria and further changing the rebuilding network traffic protocols. As a specific example, the desired network traffic function includes a curve and the processing module increasingly changes the at least one of the rebuilding criteria and the rebuilding network traffic protocols as the network traffic increases the unfavorable comparison to the curve of the desired network traffic function. For example, the processing module further reduces the rebuilding threshold.

FIG. 45A is a schematic block diagram of another embodiment of a dispersed storage network (DSN) system that includes the user device 12 of FIG. 1, the access module 384 of FIG. 41A, and the dispersed storage network (DSN) memory 362 of FIG. 40A. The DSN memory 362 includes a plurality of sites 1-S, where each site includes one or more storage units 426 of FIG. 42A. Storage units 426 of the plurality of sites form a set of storage units for storage of one or more sets of encoded data slices, where a data segment is encoded using a dispersed storage error coding function to produce the one or more sets of encoded data slices. Access performance between the access module 384 and each site of the plurality of sites 1-S may vary from site to site based on one or more of network loading, network connectivity capabilities, network availability, network connectivity costs, distance between the access module and the site, storage unit performance capability, and storage unit loading.

The system is operable to encode data using the dispersed storage error coding function in accordance with dispersed storage error coding function parameters, where a parameter multiple of baseline parameters are utilized as the dispersed storage error coding function parameters. The dispersed storage error coding function parameters includes at least a pillar width number and a decode threshold number. For example, the system encodes data using dispersed storage error coding function parameters that includes a pillar width of 45 and a decode threshold of 30 when baseline parameters includes a baseline pillar width of 15 and a baseline decode threshold number of 10 and a parameter multiple is 3. As another example, the system encodes the data using dispersed storage error coding function parameters that includes a pillar width of 15 and a decode threshold of 10 when baseline parameters includes the baseline pillar width of 15 and the baseline decode threshold number of 10 and a parameter multiple is 1.

System storage and retrieval performance may be enhanced by accessing more encoded data slices via storage units associated with better performance than other storage units. For example, enhanced performance may be provided when accessing encoded data slices using one or more storage units at site 1 rather than using one or more storage units at site 3 when access performance between the access module and site 1 is superior (e.g., faster access) to access performance between the access module and site 3. For instance, the access module accesses three slices per storage unit of the one or more storage units at site 1 when the parameter multiple is 3.

In an example of operation of the access module 384 when storing the data, the access module 384 receives a data access request 520 from the user device 12, where the data access request 520 includes the data. The access module 384 selects the set of storage units. The access module 384 identifies a baseline pillar width and a baseline decode threshold. The identifying includes at least one of performing a lookup based on an identifier associated with one or more of the user device 12, the data access request 520, and a vault identifier. The access module 384 determines estimated performance of each storage unit 426 of the set of storage units (e.g., initiating a test, issuing a query, performing a lookup).

The access module 384 determines the parameter multiple based on one or more of the estimated performance, the baseline pillar width, and the baseline decode threshold. The access module 384 multiplies the parameter multiple by each of the baseline pillar width and the baseline decode threshold to produce a pillar width and a decode threshold respectively. The access module 384 encodes the data using the dispersed storage error coding function and in accordance with the pillar width and the decode threshold to produce a plurality of sets of encoded data slices.

The access module 304 facilitates storing the plurality of sets of encoded data slices in the set of storage units, where each storage unit 426 receives a parameter multiple number of encoded data slices for each set of encoded data slices of the plurality of sets of encoded data slices. The facilitating includes generating a slice access request 366 for each storage unit 426 of the set of storage units, where slice access requests 366 includes write slice requests that includes, for each storage unit, the parameter multiple number of encoded data slices. The access module 384 stores the parameter multiplier in one or more of a vault, a directory, a local memory, and a dispersed hierarchical index. The access module 384 may issue a data access response 522 to the user device 12 that indicates confirmation of storage of the data.

In an example of operation of the access module 384 when retrieving the data, the access module 384 receives another data access request 520 from the user device 12 that includes a data retrieval request for the data. The access module 384 recovers the parameter multiple and retrieves the baseline decode threshold number and the baseline pillar width. The access module 384 reproduces the pillar width number and the decode threshold number by multiplying the recovered parameter multiple by the retrieved baseline pillar width number and the baseline decode threshold number. The access module 384 identifies the set of storage units. The access module 384 determines an updated estimated performance of the set of storage units.

The access module 384 selects one or more storage units 426 of the set of storage units based on the updated estimated performance of the set of storage units and the recovered parameter multiple. For example, the access module 384 selects storage units associated with best estimated performance of the set of storage units such that a parameter multiple number of encoded data slices are to be retrieved from each of the selected storage units to produce at least a decode threshold number of retrieved encoded data slices.

The access module 384 facilitates recovering the decode threshold number of retrieved encoded data slices from the selected storage units. For example, the access module generates slice access requests 366 for each storage unit of the selected storage units to request retrieval of the parameter multiple number of encoded data slices. The access module 384 issues the slice access requests 366 to the selected storage units. The access module 384 receives a slice access responses 368 from the selected storage units to recover the decode threshold number of retrieved encoded data slices. The access module 384 decodes the decode threshold number of retrieved encoded data slices to reproduce a data segment of the data. The retrieval continues to reproduce each data segment of a plurality of data segments of the data.

FIG. 45B is a flowchart illustrating an example of accessing data. The method begins at step 524 where a processing module (e.g., of an access module) receives data for storage in a dispersed storage network (DSN). The receiving may further include receiving one or more of a data identifier, a data owner identifier, a requesting entity identifier, a DSN address, baseline parameters, and a data type indicator. The method continues at step 526 where the processing module selects a set of storage units. The selecting may be based on one or more of a lookup, the data owner identifier, a vault identifier, the requesting entity identifier, and the data type indicator. The method continues at step 528 where the processing module identifies a baseline pillar width and a baseline decode threshold. The identifying may be based on one or more of a lookup, the data owner identifier, the vault ID, the requesting entity ID, and the data type indicator. The method continues at step 530 where the processing module determines estimated performance of the set of storage units. The determining may include one or more of receiving, performing a lookup, initiating a query, initiating a test, accessing a historical record, and retrieving a predetermination.

The method continues at step 532 where the processing module determines a parameter multiple based on the estimated performance and the baseline pillar width and the baseline decode threshold. The determining is based on optimizing expected access performance such that a decode threshold number of encoded data slices can be retrieved from selected storage units of the DSN with favorable performance. Alternatively, the determining is based on optimizing expected access performance such that at least a write threshold number of encoded data slices can be stored to the set of storage units of the DSN with favorable performance.

The method continues at step 534 where the processing module multiplies the parameter multiple by each of the baseline pillar width and the baseline decode threshold to produce a pillar width and a decode threshold respectively. The method continues at step 536 where the processing module encodes the data using a dispersed storage error coding function in accordance with the pillar width and the decode threshold to produce a plurality of sets of encoded data slices. The method continues at step 538 where the processing module facilitates storage of the plurality of sets of encoded data slices in the set of storage units. The facilitating includes issuing write slice requests to each storage unit of the set of storage units, where each storage unit receives a parameter multiple number of encoded data slices. The method continues at step 540 where the processing module stores the parameter multiple. The storing includes one or more of storing the parameter multiple in a local memory, a vault, a directory, and in a hierarchical dispersed index.

When retrieving the data, the method continues at step 542 where the processing module receives a retrieval request for the data. The method continues at step 544 where the processing module reproduces the pillar width and the decode threshold based on the parameter multiple. The reproducing includes retrieving the baseline decode threshold and the baseline pillar width, recovering the parameter multiple, and multiplying the parameter multiple by the baseline decode threshold and the baseline pillar width to reproduce the decode threshold and the pillar width. The method continues at step 546 where the processing module identifies the set of storage units (e.g., receive identifiers, performing a lookup based on a data identifier). The method continues at step 548 where the processing module determines estimated performance of the set of storage units.

The method continues at step 550 where the processing module selects one or more storage units of the set of storage units based on the estimated performance, the parameter multiple, and the decode threshold. For example, the processing module starts with best-performing storage units to retrieve a parameter multiple number of encoded data slices from each storage unit until a decode threshold number of encoded data slices can be retrieved. The method continues at step 552 where the processing module recovers the decode threshold number of encoded data slices from the selected one or more storage units. The recovering includes issuing read slice requests, receiving read slice responses, where the read slice responses from the storage unit includes a parameter multiple number of encoded data slices. The method continues at step 554 where the processing module decodes the decode threshold number of encoded data slices using the dispersed storage error coding function to reproduce the data (e.g., a data segment of a plurality of data segments of the data).

FIG. 46A is a schematic block diagram of another embodiment of a dispersed storage network (DSN) system that includes an authorizing module 556, the access module 384 of FIG. 41A, and the storage unit 426 of FIG. 42A. Alternatively, or in addition to, the system may include one or more of a plurality of authorizing modules 556, a plurality of access modules 384, a set of storage units 426, and a plurality of storage units 426. The authorizing module 556 may be implemented utilizing one or more of another access module 384, the access module 384, a dispersed storage (DS) processing unit, the distributed storage and task (DST) processing unit 16 of FIG. 1, a DS processing module, and a DSN managing unit.

The system functions to temporarily authorize the access module 384 (e.g., as a delegate) to access the storage unit 426 based on utilization of a token 562 provided by the authorizing module 556. In an example of operation, the authorizing module 556 determines to acquire the token 562 for the access module 384 as the delegate. The determining may be based on at least one of a predetermination, a lookup, receiving a request (e.g., receiving a token request from the access module), and receiving an error message. The authorizing module 556 issues a generate token request 558 to the storage unit 426, where the generate token request 558 includes one or more of a delegate identifier, an identifier of the authorizing module, a token valid timeframe, a number of uses, one or more allowed request types, one or more allowed DSN address ranges, and any other allowable access constraints. Alternatively, or in addition to, the authorizing module 556 issues a generate token request 558 to each of the set of storage units.

The storage unit 426 validates the generate token request 558. The validating includes comparing the generate token request 558 to an authorization record associated with the authorizing module (e.g., an access control list) to determine whether the authorizing module is authorized to perform storage unit access described by the generate token request 558. When the storage unit 426 determines that the generate token request 558 is authorized, the storage unit 426 issues a generate token response 560 to the authorizing module 556, where the generate token response 560 includes one or more of the token 562 (e.g., a long random string), the delegate identifier, the authorizing module identifier, the valid timeframe, the number of uses, the allowed request types, the allowed DSN address ranges, and the other allowed constraints. The storage unit 426 stores the generate token response 560 in a local memory for subsequent utilization during an access request from the delegate. The storage unit 426 initializes and stores a number of uses remaining, where the number of uses remaining is initially set to the number of uses from the request.

The authorizing module 556 sends the token 562 to the access module 384. The sending includes identifying the access module 384 based on the delegate identifier. The access module 384 issues a process request with token request 564 to the storage unit 426, where the process request with token request 564 includes the token 562. The storage unit 426 validates the process request with token request 564 based on a stored representation of the token 562 and the token of the request. The validating includes one or more of determining whether the process request with token request 564 compares favorably to the stored representation of the token, determining that the delegate identifier substantially matches an identifier of the access module, determining that a current time frame matches a time frame of the token, determining that an access type of the request substantially matches an allowed access type of the token, and that a number of uses remaining associated with the stored representation of the token is greater than zero.

When valid, the storage unit 426 decrements the number of uses remaining and processes the request type of the request (e.g., performs a write slice operation, performs a read slice operation, performs a delete slice operation, etc.). The storage unit issues a process request with token response 566 to the access module 384 based on the processing of the request type (e.g., issuing includes including a write acknowledgment for a write request, including an encoded data slice for a read request, etc.) The storage unit 426 deletes the stored representation of the token when the decrementing the number of uses remaining from 1 to 0. When not valid, the storage unit 426 issues a process request with token response 566 to the access module 384 that indicates that the process request with token request 564 is rejected.

FIG. 46B is a flowchart illustrating an example of authorizing access. The method begins at step 568 where an authorizing module determines to acquire a token. The determining may be based on one or more of receiving a request, a predetermination, receiving an error message, and detecting a system loading level greater than a system loading threshold. The method continues at step 570 where the authorizing module generates a generate token request. The generating includes identifying a delegate access module and determining parameters of the generate token request. The determining may be based on one or more of a token request from the delegate access module, a predetermination, a historical request transaction record, a task list, and a system loading level. The method continues at step 572 where the authorizing module sends the generate token request to one or more storage units. The sending includes identifying the one or more storage units based on the generate token request (e.g., identifying which storage units are required for access by the delicate access module).

The method continues at step 574 where a storage unit of the one or more storage units authorizes the generate token request. The authorizing includes determining whether the authorizing module is allowed to perform request types in accordance with constraints of the token request. When authorized, the method continues at step 576 where the storage unit issues a generate token response to the authorizing module, where the generate token response includes a token. The issuing includes generating the token in accordance with the generate token request. Alternatively, or in addition to, the storage unit stores the token locally as a representation of the token and initializes a number of uses remaining indicator to be equivalent to a number of uses of the generate token request.

The method continues at step 578 where the authorizing module sends a corresponding token for each of the one or more storage units to the delegate access module. The method continues at step 580 where the delegate access module issues, for each of the one or more storage units, a process request with token request to the storage unit, where the process request with token request includes a corresponding token associated with the storage unit (e.g., received from the storage unit of the one or more storage units).

The method continues at step 582 where the storage unit authorizes the process request with token request. When authorized, the method continues at step 584 where the storage unit performs the process requests to produce a result. Alternatively, or in addition to, the storage unit decrements the number of uses remaining. The method continues at step 586 where the storage unit issues a process request with token response to the delegate access module based on the result. The method continues at step 588 where the storage unit deletes a locally stored copy of the token when the locally stored copy of the token has expired. The delete includes detecting that the locally stored copy of the token has expired by at least one of determining that a current time is beyond a time frame allowable by the token and determining that a number of uses remaining is zero.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for execution by one or more processing modules of one or more computing devices of a dispersed storage network (DSN), the method comprises:
   monitoring network traffic within the DSN; and
   when the network traffic compares unfavorably to a desired network traffic function, reducing a portion of the network traffic due to rebuilding flagged encoded data slices by at least one of changing rebuilding criteria for the flagged encoded data slices and changing rebuilding network traffic protocols.

2. The method of claim 1, wherein the monitoring the network traffic comprises one or more of:
   monitoring latency in responding to data access requests;
   monitoring volume of the data access requests;
   monitoring latency in responding to system level access requests; and
   monitoring volume of the system level access requests.

3. The method of claim 1 further comprises:
   the desired network traffic function including a curve; and
   increasingly changing the at least one of the rebuilding criteria and the rebuilding network traffic protocols as the network traffic increases the unfavorable comparison to the curve of the desired network traffic function.

4. The method of claim 1, wherein the changing the rebuilding criteria comprises one or more of:
   decreasing a rebuilding threshold which triggers a rebuilding process for one of the flagged encoded data slices;
   increasing a wait time for a storage unit storing a flagged encoded data slice of the flagged encoded data slices to come back on line; and
   adjusting rebuild queue priorities of the flagged encoded data slices.

5. The method of claim 1, wherein the changing the rebuilding network traffic protocols comprises one or more of:
   bundling rebuilding requests to a storage unit for multiple ones of the flagged encoded data slices;
   serializing transmission of a set of rebuilding requests to storage units regarding one of the flagged encoded data slices; and
   assigning an individual response timeslot to each of multiple storage units for individually responding to a rebuild request regarding one or more the flagged encoded data slices.

6. The method of claim 1 further comprises:
   after the reducing the portion of the network traffic due to the rebuilding flagged encoded data slices:
   continue the monitoring the network traffic within the DSN;
   when the network traffic compares favorably to the desired network traffic function, undoing the changing of the at least one of the rebuilding criteria and the rebuilding network traffic protocols; and when the network traffic continues to compare unfavorably to the desired network traffic function, further reducing the portion of the network traffic due to the rebuilding of the flagged encoded data slices by at least one of further changing the rebuilding criteria and further changing the rebuilding network traffic protocols.

7. A dispersed storage (DS) module of a dispersed storage network (DSN), the DS module comprises:
a first module, when operable within a computing device, causes the computing device to:
monitor network traffic within the DSN; and
a second module, when operable within the computing device, causes the computing device to:
when the network traffic compares unfavorably to a desired network traffic function, reduce a portion of the network traffic due to rebuilding flagged encoded data slices by at least one of changing rebuilding criteria for the flagged encoded data slices and changing rebuilding network traffic protocols.

8. The DS module of claim 7, wherein the first module functions to cause the computing device to monitor the network traffic by one or more of:
monitoring latency in responding to data access requests;
monitoring volume of the data access requests;
monitoring latency in responding to system level access requests; and
monitoring volume of the system level access requests.

9. The DS module of claim 7 further comprises:
the desired network traffic function includes a curve; and
the second module further functions to cause the computing device to:
increasingly change the at least one of the rebuilding criteria and the rebuilding network traffic protocols as the network traffic increases the unfavorable comparison to the curve of the desired network traffic function.

10. The DS module of claim 7, wherein the second module functions to cause the computing device to change the rebuilding criteria by one or more of:
decreasing a rebuilding threshold which triggers a rebuilding process for one of the flagged encoded data slices;
increasing a wait time for a storage unit storing a flagged encoded data slice of the flagged encoded data slices to come back on line; and
adjusting rebuild queue priorities of the flagged encoded data slices.

11. The DS module of claim 7, wherein the second module functions to cause the computing device to change the rebuilding network traffic protocols by one or more of:
bundling rebuilding requests to a storage unit for multiple ones of the flagged encoded data slices;
serializing transmission of a set of rebuilding requests to storage units regarding one of the flagged encoded data slices; and
assigning an individual response timeslot to each of multiple storage units for individually responding to a rebuild request regarding one or more the flagged encoded data slices.

12. The DS module of claim 7 further comprises:
the second module further functions to cause the computing device to:
after reducing the portion of the network traffic due to the rebuilding flagged encoded data slices:
continue to monitor the network traffic within the DSN;
when the network traffic compares favorably to the desired network traffic function, undo the changing of the at least one of the rebuilding criteria and the rebuilding network traffic protocols; and
when the network traffic continues to compare unfavorably to the desired network traffic function, further reduce the portion of the network traffic due to the rebuilding of the flagged encoded data slices by at least one of further changing the rebuilding criteria and further changing the rebuilding network traffic protocols.

13. A computer readable storage medium comprises:
a first memory section that stores operational instructions that, when executed by one or more processing modules of one or more computing devices of a dispersed storage network (DSN), causes the one or more computing devices to:
monitor network traffic within the DSN; and
a second memory section that stores operational instructions that, when executed by the one or more processing modules of the one or more computing devices of the DSN, causes the one or more computing devices to:
when the network traffic compares unfavorably to a desired network traffic function, reduce a portion of the network traffic due to rebuilding flagged encoded data slices by at least one of changing rebuilding criteria for the flagged encoded data slices and changing rebuilding network traffic protocols.

14. The computer readable storage medium of claim 13, wherein the one or more processing modules functions to execute the operational instructions stored by the first memory section to cause the one or more computing devices of the DSN to monitor the network traffic by one or more of:
monitoring latency in responding to data access requests;
monitoring volume of the data access requests;
monitoring latency in responding to system level access requests; and
monitoring volume of the system level access requests.

15. The computer readable storage medium of claim 13 further comprises:
the desired network traffic function includes a curve; and
the second memory section stores further operational instructions that, when executed by the one or more processing modules, causes the one or more computing devices of the DSN to:
increasingly change the at least one of the rebuilding criteria and the rebuilding network traffic protocols as the network traffic increases the unfavorable comparison to the curve of the desired network traffic function.

16. The computer readable storage medium of claim 13, wherein the one or more processing modules functions to execute the operational instructions stored by the second memory section to cause the one or more computing devices of the DSN to change the rebuilding criteria by one or more of:
decreasing a rebuilding threshold which triggers a rebuilding process for one of the flagged encoded data slices;
increasing a wait time for a storage unit storing a flagged encoded data slice of the flagged encoded data slices to come back on line; and
adjusting rebuild queue priorities of the flagged encoded data slices.

17. The computer readable storage medium of claim 13, wherein the one or more processing modules functions to execute the operational instructions stored by the second memory section to cause the one or more computing devices of the DSN to change the rebuilding network traffic protocols by one or more of:

bundling rebuilding requests to a storage unit for multiple ones of the flagged encoded data slices;

serializing transmission of a set of rebuilding requests to storage units regarding one of the flagged encoded data slices; and assigning an individual response timeslot to each of multiple storage units for individually responding to a rebuild request regarding one or more the flagged encoded data slices.

18. The computer readable storage medium of claim 13 further comprises:

the second memory section stores further operational instructions that, when executed by the one or more processing modules, causes the one or more computing devices of the DSN to:

after reducing the portion of the network traffic due to the rebuilding flagged encoded data slices:

continue to monitor the network traffic within the DSN;

when the network traffic compares favorably to the desired network traffic function, undo the changing of the at least one of the rebuilding criteria and the rebuilding network traffic protocols; and when the network traffic continues to compare unfavorably to the desired network traffic function, further reduce the portion of the network traffic due to the rebuilding of the flagged encoded data slices by at least one of further changing the rebuilding criteria and further changing the rebuilding network traffic protocols.

\* \* \* \* \*